United States Patent
Yang et al.

(10) Patent No.: US 12,185,125 B2
(45) Date of Patent: Dec. 31, 2024

(54) 60 GHZ BEAM MANAGEMENT FOR WIRELESS LOCAL AREA NETWORKS (WLANS)

(71) Applicant: QUALCOMM Incorporated, San Diego, CA (US)

(72) Inventors: Lin Yang, San Diego, CA (US); Bin Tian, San Diego, CA (US); Alecsander Petru Eitan, Haifa (IL); Youhan Kim, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 333 days.

(21) Appl. No.: 17/746,623

(22) Filed: May 17, 2022

(65) Prior Publication Data
US 2023/0379725 A1  Nov. 23, 2023

(51) Int. Cl.
*H04W 16/28* (2009.01)
*H04B 7/0417* (2017.01)
*H04B 7/06* (2006.01)

(52) U.S. Cl.
CPC .......... *H04W 16/28* (2013.01); *H04B 7/0417* (2013.01); *H04B 7/0617* (2013.01); *H04B 7/0695* (2013.01)

(58) Field of Classification Search
CPC ....... H04W 16/28; H04B 7/02; H04B 7/0408; H04B 7/0417; H04B 7/0491;
(Continued)

(56) References Cited

U.S. PATENT DOCUMENTS

| | | | | |
|---|---|---|---|---|
| 2011/0080898 A1* | 4/2011 | Cordeiro | ........... | H04W 72/0446 370/338 |
| 2013/0044695 A1* | 2/2013 | Xu | ........ | H04B 7/0619 370/329 |

(Continued)

FOREIGN PATENT DOCUMENTS

| | | | | |
|---|---|---|---|---|
| CA | 2753199 A1 * | 8/2010 | ............... | H01Q 3/26 |
| CA | 3067186 A1 * | 11/2019 | ........... | H04B 7/0417 |

(Continued)

OTHER PUBLICATIONS

International Search Report and Written Opinion—PCT/US2023/066429—ISA/EPO—Oct. 20, 2023.

(Continued)

*Primary Examiner* — Kevin D Mew
(74) *Attorney, Agent, or Firm* — Kevin M. Donnelly; Holland & Hart LLP

(57) ABSTRACT

This disclosure provides methods, devices and systems for increasing carrier frequencies for wireless communications in wireless local area networks. Some implementations more specifically relate to beamforming training operations that support wireless communications on carrier frequencies above 7 GHz. In some aspects, a beamforming initiator may initiate a beamforming training operation by transmitting a number (N) of beamforming training (BFT) packets in N TX beam directions, respectively, on a carrier frequency above 7 GHz. The beamforming responder receives one or more of the BFT packets and provides feedback to the beamforming initiator indicating the TX beam direction associated with the BFT packet having the highest received signal power. In some aspects, the beamforming responder may train its RX antennas for RX beamforming concurrently while the beamforming initiator trains its TX antennas. In some other (Continued)

aspects, the beamforming responder may train its RX antennas after the beamforming initiator trains its TX antennas.

30 Claims, 28 Drawing Sheets

(58) Field of Classification Search
CPC .. H04B 7/0613; H04B 7/0617; H04B 7/0619; H04B 7/0621; H04B 7/0634; H04B 7/0695
See application file for complete search history.

(56) References Cited

U.S. PATENT DOCUMENTS

| | | | |
|---|---|---|---|
| 2016/0021548 A1* | 1/2016 | Raghavan | H04B 7/046 370/329 |
| 2016/0044711 A1 | 2/2016 | Lou et al. | |
| 2017/0331577 A1* | 11/2017 | Parkvall | H04L 5/1469 |
| 2018/0063693 A1* | 3/2018 | Chakraborty | H04W 8/005 |
| 2019/0115961 A1* | 4/2019 | Kedem | H04B 1/48 |
| 2019/0319693 A1 | 10/2019 | Ciochina et al. | |
| 2021/0058936 A1* | 2/2021 | Gordaychik | H04W 72/23 |
| 2022/0368437 A1* | 11/2022 | Abedini | H04L 5/14 |

FOREIGN PATENT DOCUMENTS

| | | | | |
|---|---|---|---|---|
| EP | 3806345 A1 | 4/2021 | | |
| WO | WO-2009102124 A2 * | 8/2009 | | H04B 7/0491 |
| WO | WO-2017156315 A1 * | 9/2017 | | H04B 17/12 |
| WO | WO-2018017840 A1 * | 1/2018 | | H04B 7/0617 |
| WO | WO-2018112402 A1 * | 6/2018 | | |
| WO | WO-2019055831 A1 * | 3/2019 | | H04J 11/0069 |

OTHER PUBLICATIONS

Zhou P., et al., "IEEE 802.11ay Based mm Wave WLANs: Design Challenges and Solutions", IEEE Communications Surveys & Tutorials, Cornell University Library, 201 Olin Library Cornell University Ithaca, NY14853, Mar. 21, 2018, pp. 1-27, XP080861500, p. 6, Section C: Difference between channel bonding and channel aggregation figure 4, Section V, p. 9-11, Figures 10, 13.
Partial International Search Report—PCT/US2023/066429—ISA/EPO—Aug. 11, 2023.

* cited by examiner

60 GHZ BEAM MANAGEMENT FOR WIRELESS LOCAL AREA NETWORKS (WLANS)

TECHNICAL FIELD

This disclosure relates generally to wireless communication, and more specifically, to 60 GHz beam management techniques for wireless local area networks (WLANs).

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

Many existing WLAN communication protocols are designed for wireless communications on carrier frequencies below 7 GHz (such as in the 2.4 GHz, 5 GHz, or 6 GHz frequency bands). However, new WLAN communication protocols are being developed to enable enhanced WLAN communication features (such as higher throughput and wider bandwidth) that require even higher carrier frequencies (such as in the 45 GHz or 60 GHz frequency bands). Wireless communications on higher carrier frequencies may suffer from greater phase noise and greater path loss compared to wireless communications on lower carrier frequencies. Thus, as new WLAN communication protocols enable enhanced features, new packet designs and modes of operation are needed to support wireless communications on carrier frequencies above 7 GHz.

SUMMARY

The systems, methods and devices of this disclosure each have several innovative aspects, no single one of which is solely responsible for the desirable attributes disclosed herein.

One innovative aspect of the subject matter described in this disclosure can be implemented as a method of wireless communication. The method may be performed by a wireless communication device and may include transmitting a number (N) of beamforming training (BFT) packets in N transmit (TX) beam directions, respectively, on a first wireless communication link, where each of the N BFT packets includes a physical layer (PHY) preamble that carries respective beam management information indicating the TX beam direction in which the BFT packet is transmitted; receiving, from the responding device, first feedback associated with a first TX beam direction of the N TX beam directions; and transmitting a physical layer convergence protocol (PLCP) protocol data unit (PPDU), on the first wireless communication link, in the first TX beam direction.

In some aspects, the method may further include associating with the responding device over a second wireless communication link, where the N BFT packets are transmitted on the first wireless communication link based on associating with the responding device over the second wireless communication link. In some implementations, the first wireless communication link may operate at a carrier frequency above 7 GHz and the second wireless communication link may operate at a carrier frequency below 7 GHz.

In some implementations, each of the N BFT packets may consist of only the PHY preamble. In some implementations, the beam management information may include at least one of a PPDU type, a training direction, a beam tracking request, the number N of BFT packets, a number of the BFT packets remaining to be transmitted, a TX sector identifier (ID) or TX antenna ID associated with the TX beam direction in which the BFT packet is transmitted, or a number of receive (RX) sectors or RX antennas associated with the wireless communication device. In some aspects, the first feedback may be carried in a PHY preamble of a PPDU. In some implementations, the first feedback may include the TX sector ID or the TX antenna ID indicated by the BFT packet transmitted in the first TX beam direction, a signal-to-noise ratio (SNR) report, or a number of RX sectors or RX antennas associated with the responding device.

In some aspects, the method may further include retransmitting the N BFT packets in the N TX beam directions, respectively, on the first wireless communication link based on a number (M) of RX sectors associated with the responding device. In such aspects, each of the N BFT packets may be transmitted M times in the respective TX beam direction. In some aspects, the method may further include receiving, on the first wireless communication link, a number (K) of BFT packets each carrying beam management information indicating a respective beam direction associated with the received BFT packet; measuring a signal power of each of the K received BFT packets; and transmitting, to the responding device, second feedback associated with the received BFT packet having the highest signal power among the measured signal powers. In such aspects, the first feedback may be carried in the K received BFT packets.

In some aspects, the method may further include receiving one or more training signals on the first wireless communication link, where each of the one or more training signals is received via a plurality of antennas tuned in a respective RX beam direction; measuring a power of each of the one or more received training signals; and receiving a PPDU from the responding device via the plurality of antennas tuned in the RX beam direction in which the training signal having the highest signal power, among the measured signal powers, is received. In some implementations, each of the plurality of training signals may represent a respective PPDU. In some other implementations, each of the plurality of training signals may represent a respective training (TRN) field of the same PPDU.

Another innovative aspect of the subject matter described in this disclosure can be implemented in a wireless communication device. In some implementations, the wireless communication device may include at least one memory and at least one processor communicatively coupled with the at least one memory and configured to cause the wireless communication device to perform operations including transmitting a number (N) of BFT packets in N TX beam directions, respectively, each of the N BFT packets including a PHY preamble that carries respective beam management information indicating the TX beam direction in which the BFT packet is transmitted; receiving, from the responding device, feedback associated with a first TX beam direction of the N TX beam directions; and transmitting a PPDU in the first TX beam direction.

Another innovative aspect of the subject matter described in this disclosure can be implemented as a method of wireless communication. The method may be performed by a wireless communication device and may include receiving a number (N) of BFT packets on a first wireless communication link, where each of the N BFT packets includes a PHY preamble that carries beam management information indicating a respective beam direction associated with the received BFT packet; measuring a signal power of each of the received BFT packets; transmitting, to the initiating device, first feedback associated with the received BFT packet having the highest signal power among the measured signal powers; and receiving a PPDU on the first wireless communication link based on the first feedback.

In some aspects, the method may further include associating with the initiating device over a second wireless communication link, where the N BFT packets are received on the first wireless communication link based on associating with the initiating device over the second wireless communication link. In some implementations, the first wireless communication link may operate at a carrier frequency above 7 GHz and the second wireless communication link may operate at a carrier frequency below 7 GHz.

In some implementations, each of the N BFT packets may consist of only the PHY preamble. In some implementations, the beam management information may include at least one of a PPDU type, a training direction, a beam tracking request, a number of BFT packets being transmitted by the initiating device, a number of the BFT packets remaining to be transmitted, a TX sector ID or TX antenna ID associated with the beam direction, or a number of RX sectors or RX antennas associated with the initiating device. In some aspects, the first feedback may be carried in a PHY preamble of a PPDU. In some implementations, the first feedback may include the TX sector ID or the TX antenna ID indicated by the received BFT packet having the highest signal power, an SNR report, or a number of RX sectors or RX antennas associated with the wireless communication device.

In some aspects, the N BFT packets may be received via a plurality of antennas tuned in a number (M) of RX beam directions. In some implementations, at least one of the N BFT packets is received multiple times based on tuning the plurality of antennas in multiple RX beam directions, respectively, of the M RX beam directions. In some aspects, the method may further include transmitting a number (K) of BFT packets in K TX beam directions, respectively, on the first wireless communication link; receiving, from the initiating device, second feedback associated with a first TX beam direction of the K TX beam directions; and transmitting a PPDU, on the first wireless communication link, in the first TX beam direction. In some implementations, the first feedback may be carried in the K transmitted BFT packets.

In some aspects, the method may further include receiving one or more training signals on the first wireless communication link, where each of the one or more training signals is received via a plurality of antennas tuned in a respective RX beam direction; measuring a signal power of each of the one or more received training signals; and receiving a PPDU from the initiating device via the plurality of antennas tuned in the RX beam direction in which the training signal having the highest signal power, among the measured signal powers, is received. In some implementations, each of the plurality of training signals may represent a respective PPDU. In some other implementations, each of the plurality of training signals may represent a respective TRN field of the same PPDU.

Another innovative aspect of the subject matter described in this disclosure can be implemented in a wireless communication device. In some implementations, the wireless communication device may include at least one memory and at least one processor communicatively coupled with the at least one memory and configured to cause the wireless communication device to perform operations including receiving a number (N) of BFT packets each including a PHY preamble that carries beam management information indicating a respective beam direction associated with the received BFT packet; measuring a signal power of each of the received BFT packets; transmitting, to the initiating device, feedback associated with the received BFT packet having the highest signal power among the measured signal powers; and receiving a PPDU based on the feedback.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

Like reference numbers and designations in the various drawings indicate like elements.

DETAILED DESCRIPTION

Figure 1:
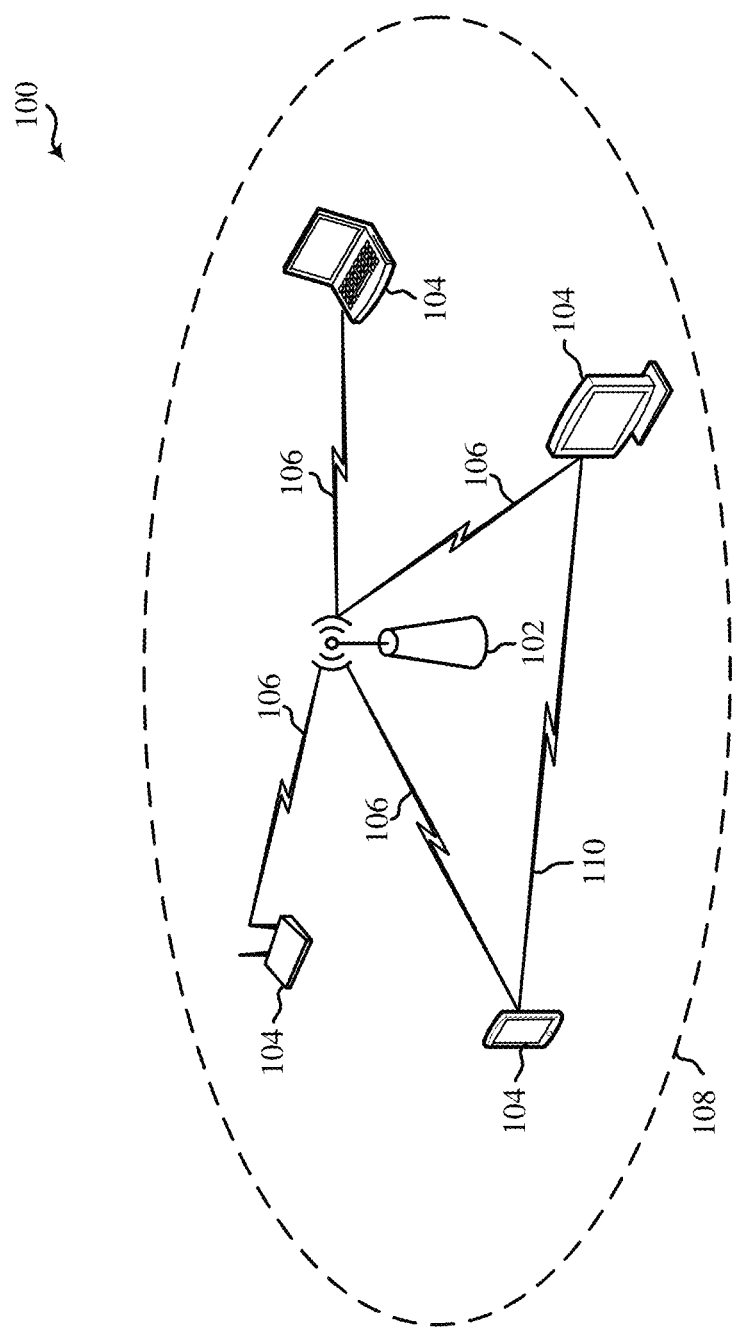
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

As described above, new WLAN communication protocols are being developed to enable enhanced features for wireless communications on carrier frequencies above 7 GHz (such as in the 60 GHz or 45 GHz frequency bands). However, wireless communications on higher carrier frequencies may suffer from greater phase noise and path loss compared to wireless communications on lower carrier frequencies. Aspects of the present disclosure recognize that analog beamforming (using a large number of antenna elements) can mitigate the effects of path loss and achieve greater wireless communication range on carrier frequencies above 7 GHz. Analog beamforming is a wireless communication technique by which a transmitting device and a receiving device can adjust the gains and phases of their transmit (TX) and receive (RX) antenna elements to achieve directionality in wireless communications. For example, the transmitting device may tune a set of TX antennas to focus the energy of transmitted signals in a particular direction (referred to as "TX beamforming"). Similarly, the receiving device may tune a set of RX antennas to focus the energy of received signals in a particular direction (referred to as "RX beamforming"). Optimal beamforming gains can be achieved (such as may be needed to overcome path loss in the 60 GHz frequency band) when TX beamforming is used in combination with RX beamforming. The process by which the transmitting device and the receiving device tune their antennas for beamforming is referred to as "beamforming training."

Various aspects relate generally to increasing carrier frequencies for wireless communications in WLANs, and more particularly, to beamforming training operations that support wireless communications on carrier frequencies above 7 GHz. In some aspects, a beamforming initiator (such as an AP) may initiate a beamforming training operation on a first wireless communication link operating at a carrier frequency above 7 GHz by transmitting a number (N) of beamforming training (BFT) packets in N TX beam directions, respectively, where each of the N BFT packets includes a physical layer (PHY) preamble that carries respective beam management information indicating the TX beam direction in which the BFT packet is transmitted. A beamforming responder (such as a STA) receives one or more of the N BFT packets and provides feedback to the beamforming initiator indicating the TX beam direction associated with the BFT packet having the highest received signal power. In some aspects, the beamforming responder may train its RX antennas for RX beamforming concurrently while the beamforming initiator trains its TX antennas for TX beamforming. In such aspects, the beamforming responder may tune its RX antennas in a number (M) of RX beam directions and the beamforming initiator may retransmit the N BFT packets each time the beamforming responder tunes its RX antennas to a new RX beam direction. In some other aspects, the beamforming responder may train its RX antennas for RX beamforming after the beamforming initiator trains its TX antennas for TX beamforming. In such aspects, the beamforming responder may tune its RX antennas in M RX beam directions as the beamforming initiator transmits M training sequences, respectively, in the TX beam direction indicated by the feedback.

Particular implementations of the subject matter described in this disclosure can be implemented to realize one or more of the following potential advantages. By signaling beam management parameters in the PHY preambles of BFT packets, aspects of the present disclosure can leverage existing WLAN packet formats and hardware to support wireless communications on carrier frequencies above 7 GHz. Concurrently training the TX antennas of the beamforming initiator and the RX antennas of the beamforming responder relaxes the RX sensitivity requirements at the beamforming responder (due to the combined TX and RX beamforming gains) but requires a substantial amount of training overhead (such as N*M BFT packets to train the TX antennas of the beamforming initiator and the RX antennas of the beamforming responder). In contrast, training the RX antennas of the beamforming responder separate from the TX antennas of the beamforming initiator reduces the amount of training overhead (such as N BFT packets to train the TX antennas of the beamforming initiator and M training sequences to train the RX antennas of the beamforming responder) but requires greater RX sensitivity at the beamforming responder when training the TX antennas of the beamforming initiator (due to the lack of RX beamforming).

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2020 specification or amendments thereof including, but not limited to, 802.11ah, 802.11ad, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 106, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network.

Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 700 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
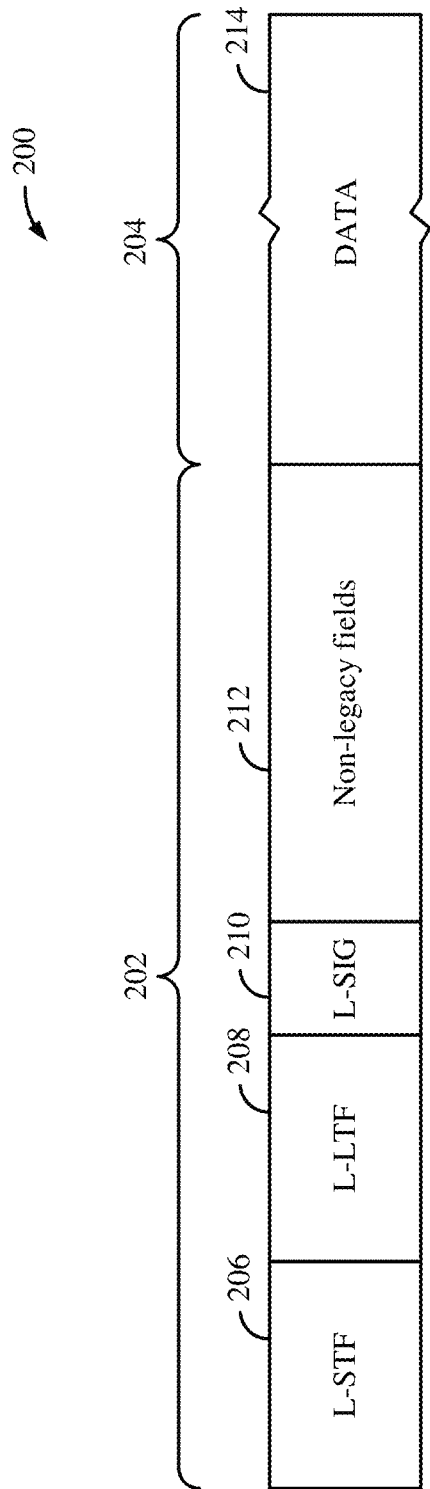
FIG. 2A shows an example protocol data unit (PDU) usable for communications between an access point (AP) and one or more wireless stations (STAs).

FIG. 2A shows an example protocol data unit (PDU) 200 usable for wireless communication between an AP 102 and one or more STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 may also include a non-legacy portion including one or more non-legacy fields 212, for example, conforming to an IEEE wireless communication protocol such as the IEEE 802.11ac, 802.11ax, 802.11be or later wireless communication protocol protocols.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 2B:
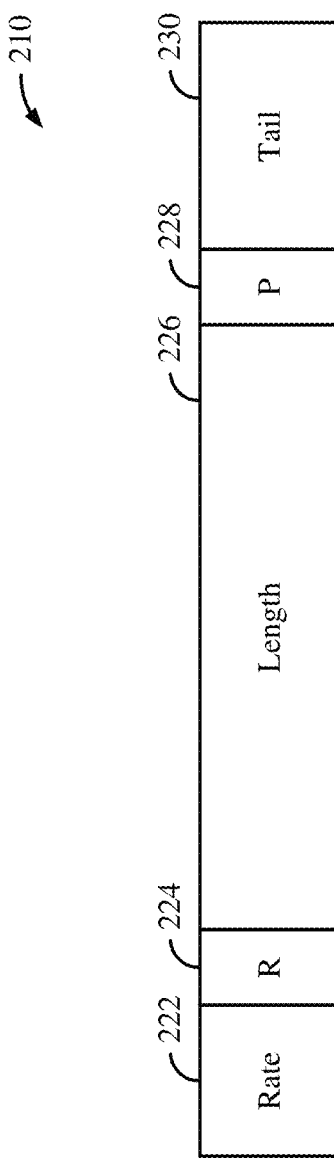
FIG. 2B shows an example field in the PDU of FIG. 2A.

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 212 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (µs) or other time units.

Figure 3:
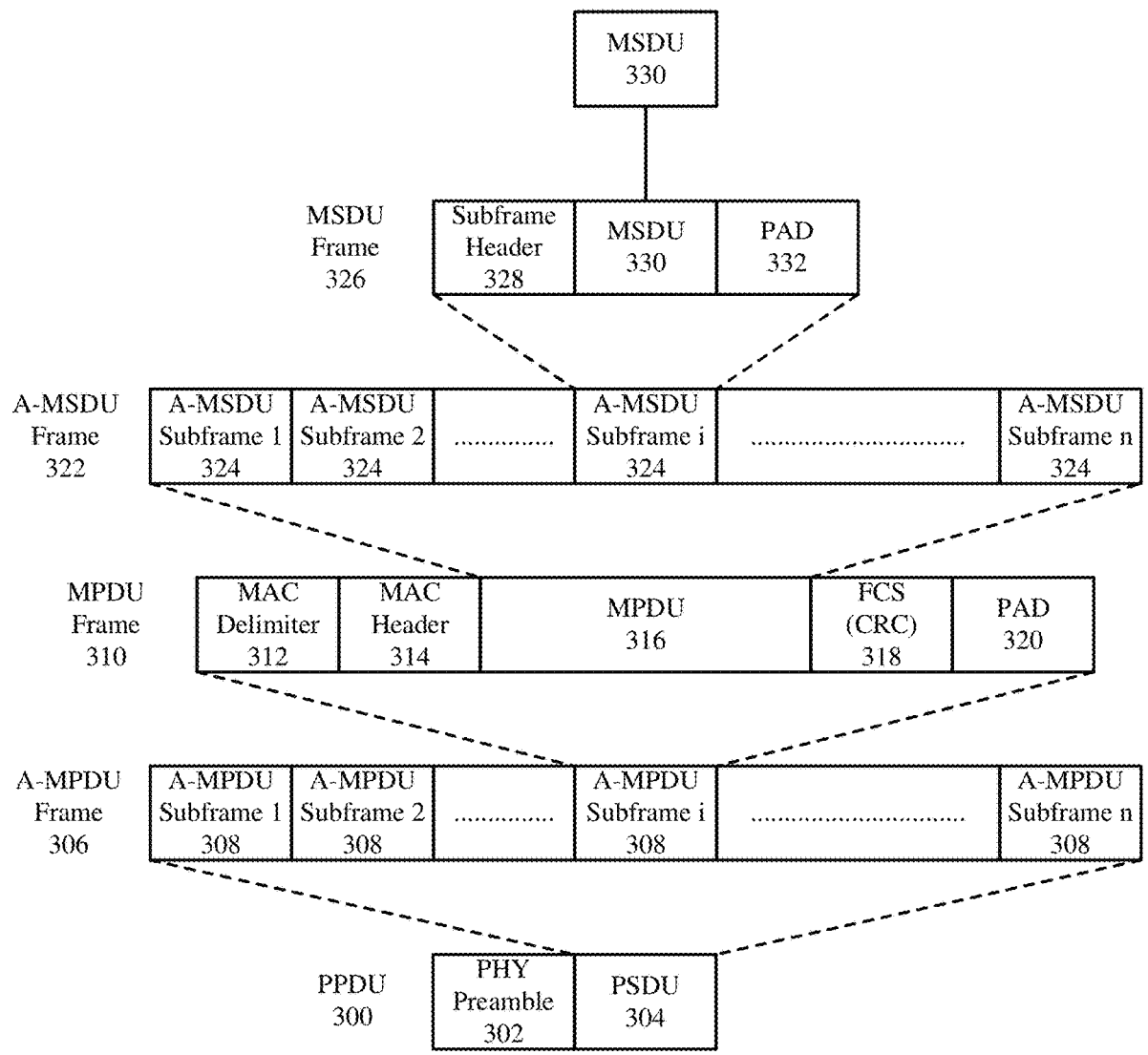
FIG. 3 shows an example physical layer convergence protocol (PLCP) protocol data unit (PPDU) usable for communications between an AP and one or more STAs.

FIG. 3 shows an example PPDU 300 usable for communications between an AP 102 and one or more STAs 104. As described above, each PPDU 300 includes a PHY preamble 302 and a PSDU 304. Each PSDU 304 may represent (or "carry") one or more MAC protocol data units (MPDUs) 316. For example, each PSDU 304 may carry an aggregated MPDU (A-MPDU) 306 that includes an aggregation of multiple A-MPDU subframes 308. Each A-MPDU subframe 306 may include an MPDU frame 310 that includes a MAC delimiter 312 and a MAC header 314 prior to the accompanying MPDU 316, which comprises the data portion ("payload" or "frame body") of the MPDU frame 310. Each MPDU frame 310 may also include a frame check sequence (FCS) field 318 for error detection (for example, the FCS field may include a cyclic redundancy check (CRC)) and padding bits 320. The MPDU 316 may carry one or more MAC service data units (MSDUs) 326. For example, MPDU 316 may carry an aggregated MSDU (A-MSDU) 322 including multiple A-MSDU subframes 324. Each A-MSDU subframe 324 contains a corresponding MSDU 330 preceded by a subframe header 328 and in some cases followed by padding bits 332.

Referring back to the MPDU frame 310, the MAC delimiter 312 may serve as a marker of the start of the associated MPDU 316 and indicate the length of the associated MPDU 316. The MAC header 314 may include multiple fields containing information that defines or indicates characteristics or attributes of data encapsulated within the frame body 316. The MAC header 314 includes a duration field indicating a duration extending from the end of the PPDU until at least the end of an acknowledgment (ACK) or Block ACK (BA) of the PPDU that is to be transmitted by the receiving wireless communication device. The use of the duration field serves to reserve the wireless medium for the indicated duration, and enables the receiving device to establish its network allocation vector (NAV). The MAC header 314 also includes one or more fields indicating addresses for the data encapsulated within the frame body 316. For example, the MAC header 314 may include a combination of a source address, a transmitter address, a receiver address or a destination address. The MAC header 314 may further include a frame control field containing control information. The frame control field may specify a frame type, for example, a data frame, a control frame, or a management frame.

Figure 4:
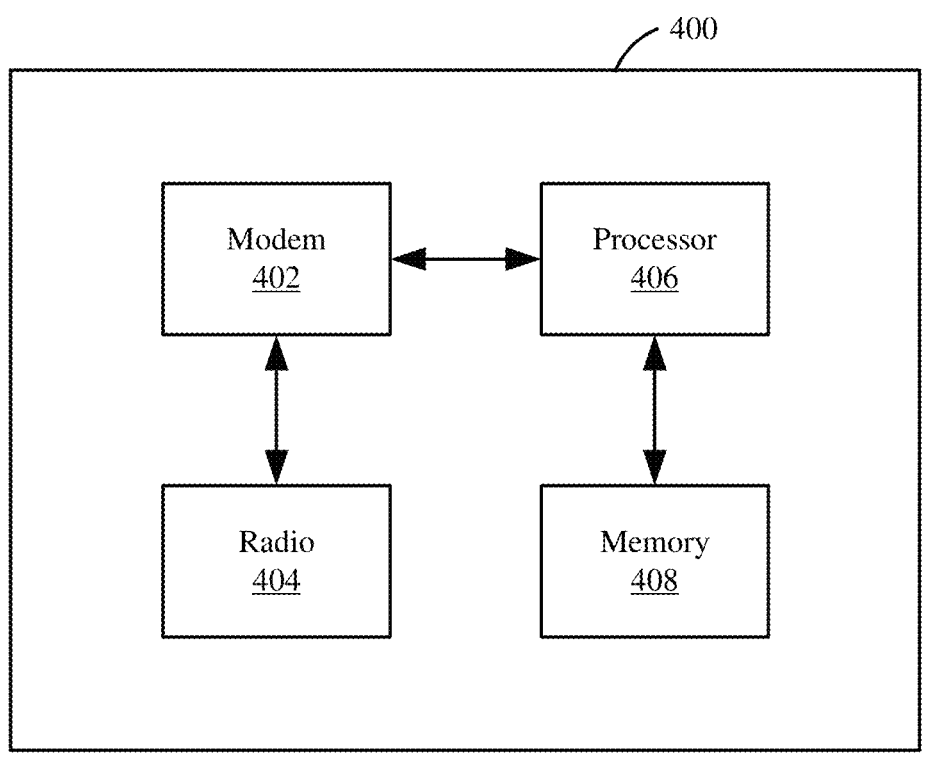
FIG. 4 shows a block diagram of an example wireless communication device.

FIG. 4 shows a block diagram of an example wireless communication device 400. In some implementations, the wireless communication device 400 can be an example of a device for use in a STA such as one of the STAs 104 described with reference to FIG. 1. In some implementations, the wireless communication device 400 can be an example of a device for use in an AP such as the AP 102 described with reference to FIG. 1. The wireless communication device 400 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 400 can be, or can include, a chip, system on chip (SoC), chipset, package or device that includes one or more modems 402, for example, a Wi-Fi (IEEE 802.11 compliant) modem. In some implementations, the one or more modems 402 (collectively "the modem 402") additionally include a WWAN modem (for example, a 3GPP 4G LTE or 5G compliant modem). In some implementations, the wireless communication device 400 also includes one or more radios 404 (collectively "the radio 404"). In some implementations, the wireless communication device 406 further includes one or more processors, processing blocks or processing elements 406 (collectively "the processor 406") and one or more memory blocks or elements 408 (collectively "the memory 408").

The modem 402 can include an intelligent hardware block or device such as, for example, an application-specific integrated circuit (ASIC) among other possibilities. The modem 402 is generally configured to implement a PHY layer. For example, the modem 402 is configured to modulate packets and to output the modulated packets to the radio 404 for transmission over the wireless medium. The modem 402 is similarly configured to obtain modulated packets received by the radio 404 and to demodulate the packets to provide demodulated packets. In addition to a modulator and a demodulator, the modem 402 may further include digital signal processing (DSP) circuitry, automatic gain control (AGC), a coder, a decoder, a multiplexer and a demultiplexer. For example, while in a transmission mode, data obtained from the processor 406 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 404. In implementations involving beamforming, the modulated symbols in the respective spatial streams are precoded via a steering matrix prior to their provision to the IFFT block.

While in a reception mode, digital signals received from the radio 404 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 406) for processing, evaluation or interpretation.

The radio 404 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 400 can include, or be coupled with, multiple transmit antennas (each with a corresponding transmit chain) and multiple receive antennas (each with a corresponding receive chain). The symbols output from the modem 402 are provided to the radio 404, which then transmits the symbols via the coupled antennas. Similarly, symbols received via the antennas are obtained by the radio 404, which then provides the symbols to the modem 402.

The processor 406 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 406 processes information received through the radio 404 and the modem 402, and processes information to be output through the modem 402 and the radio 404 for transmission through the wireless medium. For example, the processor 406 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 406 may generally control the modem 402 to cause the modem to perform various operations described above.

The memory 408 can include tangible storage media such as random-access memory (RAM) or read-only memory (ROM), or combinations thereof. The memory 408 also can store non-transitory processor- or computer-executable software (SW) code containing instructions that, when executed by the processor 406, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 5B:
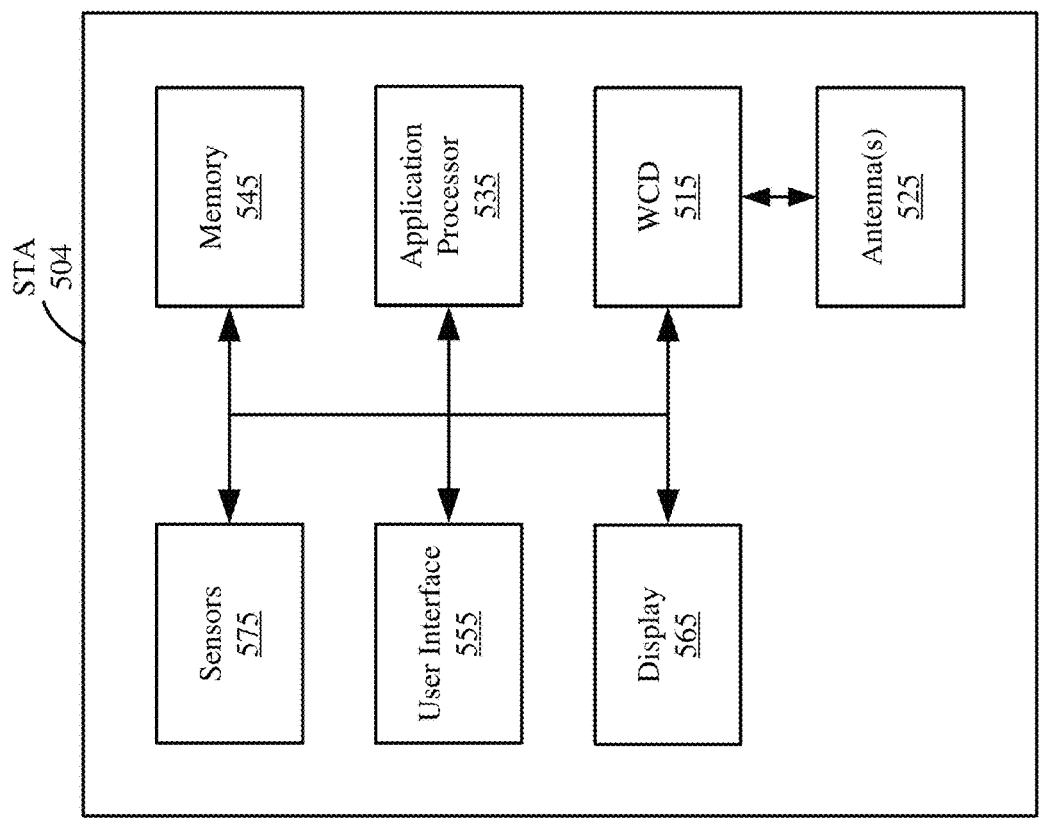
FIG. 5B shows a block diagram of an example STA.
Figure 5A:
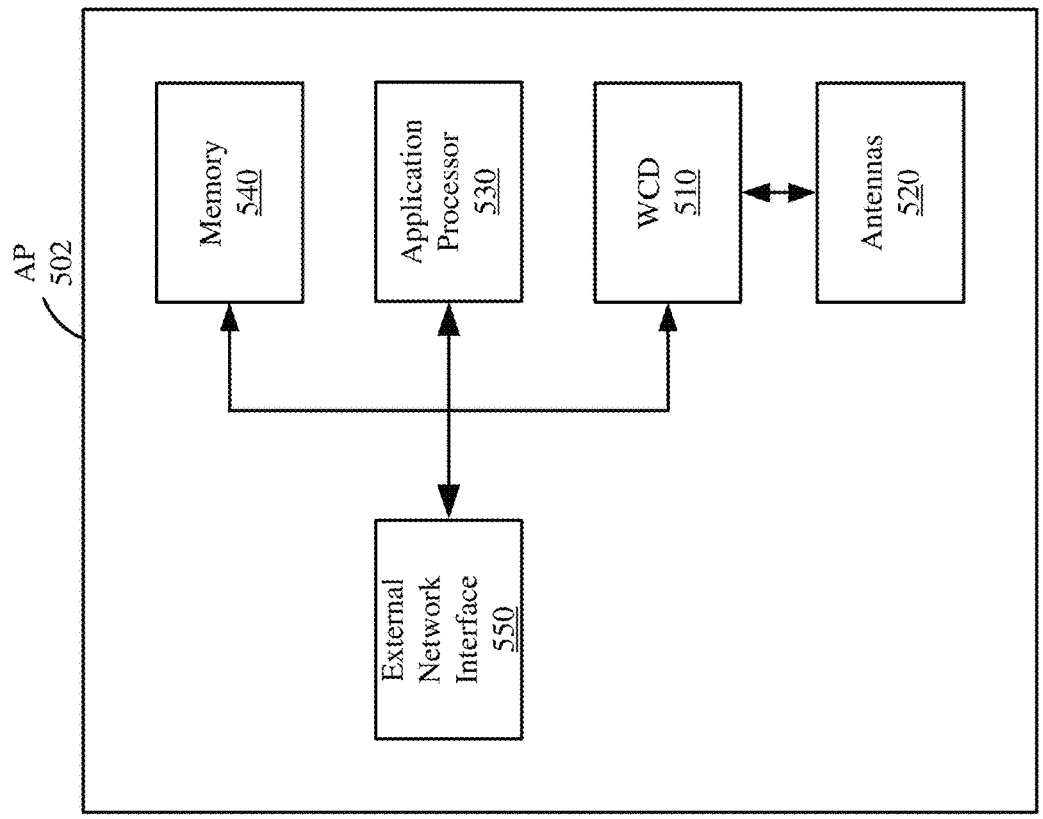
FIG. 5A shows a block diagram of an example AP.

FIG. 5A shows a block diagram of an example AP 502. For example, the AP 502 can be an example implementation of the AP 102 described with reference to FIG. 1. The AP 502 includes a wireless communication device (WCD) 510 (although the AP 502 may itself also be referred to generally as a wireless communication device as used herein). For example, the wireless communication device 510 may be an example implementation of the wireless communication device 400 described with reference to FIG. 4. The AP 502 also includes multiple antennas 520 coupled with the wireless communication device 510 to transmit and receive wireless communications. In some implementations, the AP 502 additionally includes an application processor 530 coupled with the wireless communication device 510, and a memory 540 coupled with the application processor 530. The AP 502 further includes at least one external network interface 550 that enables the AP 502 to communicate with a core network or backhaul network to gain access to external networks including the Internet. For example, the external network interface 550 may include one or both of a wired (for example, Ethernet) network interface and a wireless network interface (such as a WWAN interface). Ones of the aforementioned components can communicate with other ones of the components directly or indirectly, over at least one bus. The AP 502 further includes a housing that encompasses the wireless communication device 510, the application processor 530, the memory 540, and at least portions of the antennas 520 and external network interface 550.

FIG. 5B shows a block diagram of an example STA 504. For example, the STA 504 can be an example implementation of the STA 104 described with reference to FIG. 1. The STA 504 includes a wireless communication device 515 (although the STA 504 may itself also be referred to generally as a wireless communication device as used herein). For example, the wireless communication device 515 may be an example implementation of the wireless communication device 400 described with reference to FIG. 4. The STA 504 also includes one or more antennas 525 coupled with the wireless communication device 515 to transmit and receive wireless communications. The STA 504 additionally includes an application processor 535 coupled with the wireless communication device 515, and a memory 545 coupled with the application processor 535. In some implementations, the STA 504 further includes a user interface (UI) 555 (such as a touchscreen or keypad) and a display 565, which may be integrated with the UI 555 to form a touchscreen display. In some implementations, the STA 504 may further include one or more sensors 575 such as, for example, one or more inertial sensors, accelerometers, temperature sensors, pressure sensors, or altitude sensors. Ones of the aforementioned components can communicate with other ones of the components directly or indirectly, over at least one bus. The STA 504 further includes a housing that encompasses the wireless communication device 515, the application processor 535, the memory 545, and at least portions of the antennas 525, UI 555, and display 565.

As described above, new WLAN communication protocols are being developed to enable enhanced features for wireless communications on carrier frequencies above 7 GHz (such as in the 60 GHz or 45 GHz frequency bands). However, wireless communications on higher carrier frequencies may suffer from greater phase noise and path loss compared to wireless communications on lower carrier frequencies. Aspects of the present disclosure recognize that analog beamforming (using a large number of antenna elements) can mitigate the effects of path loss and achieve greater wireless communication range on carrier frequencies above 7 GHz. Analog beamforming is a wireless communication technique by which a transmitting device and a receiving device can adjust the gains and phases of their TX and RX antenna elements to achieve directionality in wireless communications. For example, the transmitting device may tune a set of TX antennas to focus the energy of transmitted signals in a particular direction (referred to as "TX beamforming"). Similarly, the receiving device may tune a set of RX antennas to focus the energy of received signals in a particular direction (referred to as "RX beamforming"). Optimal beamforming gains can be achieved (such as may be needed to overcome path loss in the 60 GHz frequency band) when TX beamforming is used in combination with RX beamforming. The process by which the transmitting device and the receiving device tune their antennas for beamforming is referred to as "beamforming training."

Various aspects relate generally to increasing carrier frequencies for wireless communications in WLANs, and more particularly, to beamforming training operations that support wireless communications on carrier frequencies above 7 GHz. In some aspects, a beamforming initiator (such as an AP) may initiate a beamforming training operation on a first wireless communication link operating at a carrier frequency above 7 GHz by transmitting a number (N) of beamforming training (BFT) packets in N TX beam directions, respectively, where each of the N BFT packets includes a PHY preamble that carries respective beam management information indicating the TX beam direction in which the BFT packet is transmitted. A beamforming responder (such as a STA) receives one or more of the N BFT packets and provides feedback to the beamforming initiator indicating the TX beam direction associated with the BFT packet having the highest received signal power. In some aspects, the beamforming responder may train its RX antennas for RX beamforming concurrently while the beamforming initiator trains its TX antennas for TX beamforming. In such aspects, the beamforming responder may tune its RX antennas in a number (M) of RX beam directions and the beamforming initiator may retransmit the N BFT packets each time the beamforming responder tunes its RX antennas to a new RX beam direction. In some other aspects, the beamforming responder may train its RX antennas for RX beamforming after the beamforming initiator trains its TX antennas for TX beamforming. In such aspects, the beamforming responder may tune its RX antennas in M RX beam directions as the beamforming initiator transmits M training sequences, respectively, in the TX beam direction indicated by the feedback.

Particular implementations of the subject matter described in this disclosure can be implemented to realize one or more of the following potential advantages. By signaling beam management parameters in the PHY preambles of BFT packets, aspects of the present disclosure can leverage existing WLAN packet formats and hardware to support wireless communications on carrier frequencies above 7 GHz. Concurrently training the TX antennas of the beamforming initiator and the RX antennas of the beamforming responder relaxes the RX sensitivity requirements at the beamforming responder (due to the combined TX and RX beamforming gains) but requires a substantial amount of training overhead (such as N*M BFT packets to train the TX antennas of the beamforming initiator and the RX antennas of the beamforming responder). In contrast, training the RX antennas of the beamforming responder separate from the TX antennas of the beamforming initiator reduces the amount of training overhead (such as N BFT packets to train the TX antennas of the beamforming initiator and M training sequences to train the RX antennas of the beamforming responder) but requires greater RX sensitivity at the beamforming responder when training the TX antennas of the beamforming initiator (due to the lack of RX beamforming).

Figure 6:
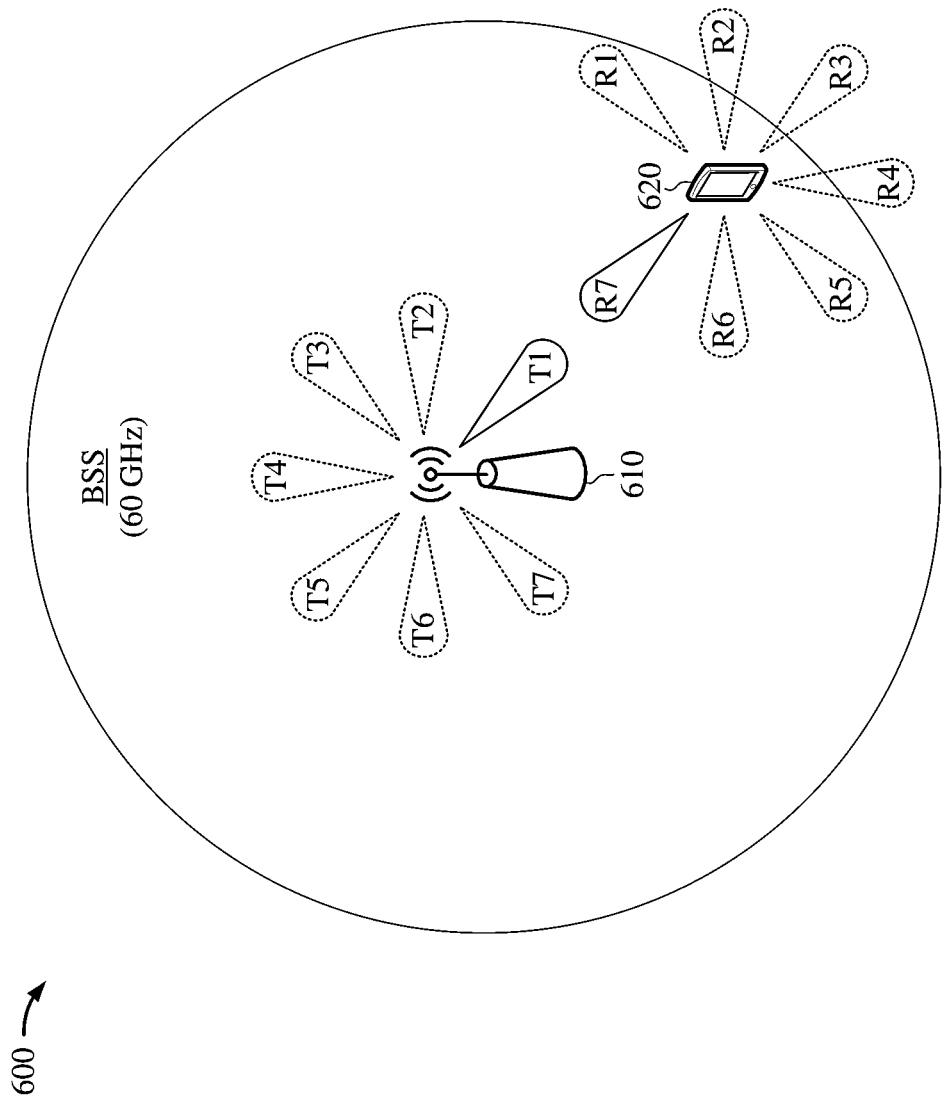
FIG. 6 shows an example communication environment that includes an AP and a STA, according to some implementations.

FIG. 6 shows an example communication environment 600 that includes an AP 610 and a STA 620, according to some implementations. In some implementations, the AP 610 may be one example of any of the APs 102 or 502 of FIGS. 1 and 5A, respectively. In some implementations, the STA 620 may be one example of any of the STAs 104 or 504 of FIGS. 1 and 5B, respectively. In the example of FIG. 6, the AP 610 is associated with a BSS that supports wireless communications at carrier frequencies above 7 GHz (such as in the 60 GHz frequency band).

In some implementations, the AP 610 may use beamforming to communicate over greater distances and mitigate the effects of path loss at carrier frequencies above 7 GHz. For example, the AP 610 may transmit packets or PPDUs via a number of antenna sectors T1-T7 (also referred to as "TX sectors") configured or tuned for TX beamforming. The antenna elements associated with each TX sector are weighted so that the energy radiated by each antenna element combines along a particular beam direction. Accordingly, each of the TX sectors T1-T7 may be tuned to a respective TX beam direction. For simplicity, the AP 610 is shown to include 7 TX sectors T1-T7. However, in actual implementations, the AP 610 may include fewer or more TX sectors than those depicted in FIG. 6.

In some implementations, the STA 620 also may use beamforming to communicate on carrier frequencies above 7 GHz. For example, the STA 620 may receive packets or PPDUs via a number of antenna sectors R1-R7 (also referred to as "RX sectors") configured or tuned for RX beamforming. The antenna elements associated with each RX sector are weighted so that the energy received by each antenna element combines along a particular beam direction. Accordingly, each of the RX sectors R1-R7 may be tuned to a respective RX beam direction. For simplicity, the STA 620 is shown to include 7 RX sectors R1-R7. However, in actual implementations, the STA 620 may include fewer or more RX sectors than those depicted in FIG. 6.

In some aspects, the AP 610 may perform a beamforming training operation with the STA 620 to determine TX and RX beam directions that optimize beamforming gains for wireless communications between the AP 610 and the STA 620. For example, the AP 610 may train its TX antennas for TX beamforming by transmitting a respective beamforming training (BFT) packet via each of the TX sectors T1-T7 and receiving feedback from the STA 620 indicating the TX sector associated with the highest TX beamforming gain. Further, the STA 620 may train its RX antennas for RX beamforming by listening for a respective BFT packet from the AP 610 via each of the RX sectors R1-R7 and determining the RX sector associated with the highest RX beamforming gain based on the received BFT packets. In some implementations, the AP 610 may further train its RX antennas (not shown for simplicity) for RX beamforming and the STA 620 may further train its TX antennas (not shown for simplicity) for TX beamforming.

Although beamforming can help mitigate path loss on carrier frequencies above 7 GHz, the directionality of beamformed signals (or "beams") presents a challenge for BSS discovery and association. As shown in FIG. 6, the AP 610 and the STA 620 may achieve optimized beamforming gains for beams transmitted via the TX sector T1 (of the AP 610) and received via the RX sector R7 (of the STA 620). By contrast, beams transmitted by the AP 610 in other TX beam directions (such as via any of the TX sectors T2-T7) may fail to reach the STA 620. The direction of the STA 620 is generally not known to the AP 610 during BSS discovery and association operations, which rely on packet exchanges between the AP 610 and the STA 620. In some aspects, the AP 610 may transmit beams in each of its TX beam directions, prior to performing a beamforming training operation, so that at least one of the beams reaches the STA 620. In some implementations, such beams may carry management or control information that can be used to establish or maintain communications with the STA 620 (such for BSS discovery or association).

Repeatedly transmitting the same management or control frames via each of the TX sectors T1-T7 may consume significant overhead and may result in inefficient usage of the wireless medium. Existing versions of the IEEE 802.11 standard define a BSS discovery protocol for carrier frequencies below 7 GHz (also referred to as a "sub-7 GHz" frequency band), whereby an AP advertises its BSS in management frames (such as beacons or probe responses) transmitted omnidirectionally. Any STAs within a coverage area of the AP may receive such management frames and request to associate (or maintain association) with the BSS. Thus, aspects of the present disclosure recognize that BSS discovery and association operations can be performed more effectively in sub-7 GHz frequency bands than at carrier frequencies above 7 GHz.

Aspects of the present disclosure further recognize that some wireless communication devices (including APs and STAs) are capable of multi-link operation (MLO). An MLO-capable device may be referred to as a multi-link device (MLD). For example, an AP MLD may include multiple APs each configured to communicate on a respective communication link with a non-AP MLD (also referred to as a "STA MLD"). Similarly, the non-AP MLD may include multiple STAs each configured to communicate on a respective one of the communication link with the AP MLD. In some implementations, the AP 610 and the STA 620 may utilize multiple wireless communication links to support wireless communications at carrier frequencies above 7 GHz. More specifically, the AP 610 and the STA 620 may perform at least some management and control functions (such as BSS discovery or association) via omnidirectional communications on a wireless communication link operating at a carrier frequency below 7 GHz and may communicate via directional beams on a wireless communication link operating at a carrier frequency above 7 GHz.

Figure 7:
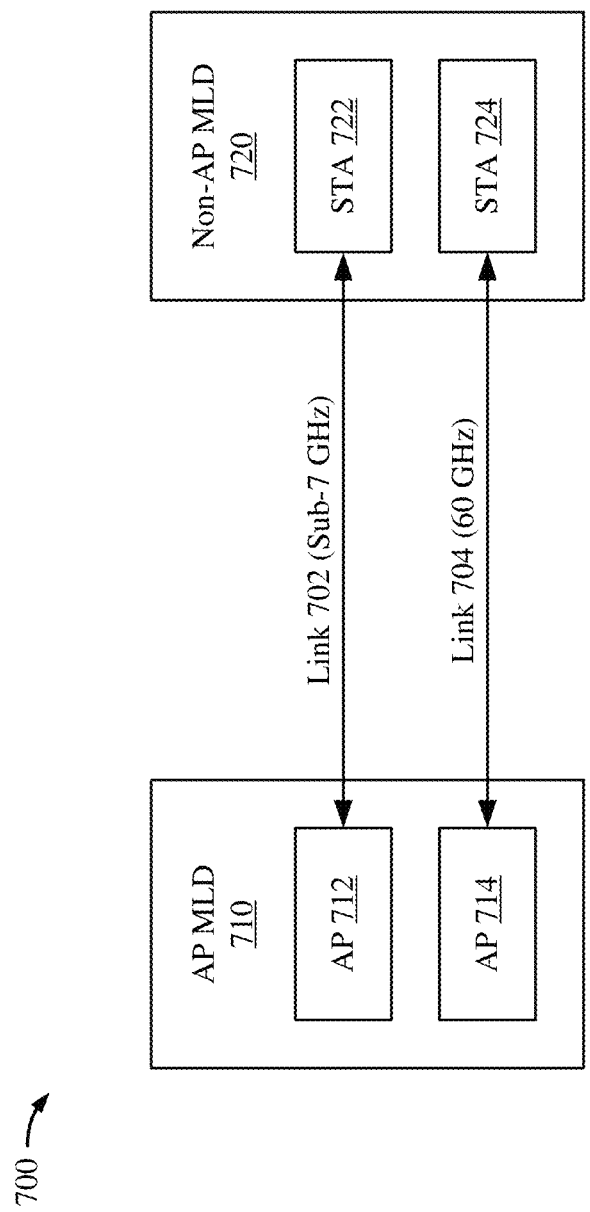
FIG. 7 shows an example communication system that includes an AP multi-link device (MLD) and a non-AP MLD, according to some implementations.

FIG. 7 shows an example communication system 700 that includes an AP MLD 710 and a non-AP MLD 720, according to some implementations. In some implementations, the AP MLD 710 may be one example of any of the APs 102, 502, or 610 of FIGS. 1, 5A, and 6, respectively. In some implementations, the non-AP MLD 720 may be one example of any of the STAs 104, 504, or 620 of FIGS. 1, 5B, and 6, respectively.

The AP MLD 710 includes multiple APs 712 and 714 associated with (or operating on) communication links 702 and 704, respectively. In the example of FIG. 7, the AP MLD 710 is shown to include 2 APs. However, in some implementations, the AP MLD 710 may include fewer or more APs than those depicted in FIG. 7. In some aspects, the APs 712 and 714 may share a common association context (through the AP MLD 710). The APs 712 and 714 also may establish their respective communication links 702 and 704 on different frequency bands. In some implementations, the AP 712 my operate at a carrier frequency below 7 GHz (such as in any of the 2.4 GHz, 5 GHz, or 6 GHz frequency bands) and the AP 714 may operate at a carrier frequency above 7 GHz (such as in the 60 GHz or 45 GHz frequency bands).

The non-AP MLD 720 includes multiple STAs 722 and 724 that may be configured to communicate on the communication links 702 and 704, respectively. In some implementations, the STA 722 may operate at a carrier frequency below 7 GHz (such as in any of the 2.4 GHz, 5 GHz, or 6 GHz frequency bands) and the STA 724 may operate at a carrier frequency above 7 GHz (such as in the 60 GHz or 45 GHz frequency bands). In the example of FIG. 7, the non-AP MLD 720 is shown to include 2 STAs. However, in some implementations, the non-AP MLD 720 may include fewer or more STAs than those depicted in FIG. 7. Existing versions of the IEEE 802.11 standard define several modes in which a non-AP MLD may operate. The various operating modes depend on the number of wireless radios associated with the non-AP MLD and the ability of the non-AP MLD to communicate (such as by transmitting or receiving) concurrently on multiple communication links.

In some implementations, the non-AP MLD 720 may include a single radio or may otherwise be capable of communicating on only one link at a time. In such implementations, the non-AP MLD 720 may operate in a multi-link single-radio (MLSR) mode or an enhanced MLSR (eMLSR) mode. A non-AP MLD operating in the eMLSR mode can listen for specific types of packets (such as buffer status report poll (BSRP) frames or multi-user request-to-send (MU-RTS) frames) on multiple links, concurrently, but can only transmit or receive on one of the links at any given time. For example, the STAs 722 and 724 may concurrently listen on their respective links 702 and 704 during a listen interval. However, if either of the STAs 722 or 724 detects a BSRP frame on its respective link, the non-AP MLD 720 subsequently tunes all of its antennas to the link on which the BSRP frame is detected. By contrast, a non-AP MLD operating in the MLSR mode can only listen to, and transmit or receive on, one communication link at any given time. For example, one of the STAs 722 or 724 must be in a power save mode any time the other STA is active.

In some other implementations, the non-AP MLD 720 may include multiple radios and may be capable of concurrent communications on each of the links 702 and 704. In such implementations, the non-AP MLD 720 may operate in a multi-link multi-radio (MLMR) simultaneous transmit and receive (STR) mode or a multi-link multi-radio non-STR (NSTR) mode. A non-AP MLD operating in the MLMR STR mode can simultaneously transmit and receive on multiple links. For example, the STA 722 may transmit or receive on the link 702 while the STA 724 concurrently transmits or receives on the link 704. More specifically, such communications may be asynchronous. In other words, the STA 722 can be transmitting on the link 702 while the STA 724 is receiving on the link 704. By contrast, a non-AP MLD operating in the MLMR NSTR mode can simultaneously transmit and receive on multiple links only if such communications are synchronous. For example, the STAs 722 and 724 may concurrently transmit on the links 702 and 704 and also may concurrently receive on the links 702 and 704. However, the STA 722 cannot be transmitting on the link 702 while the STA 724 is receiving on the link 704.

Still further, in some implementations, a non-AP MLD may include multiple radios but may be capable of concurrent communications on only a subset of the links. In such implementations, the non-AP MLD 720 may operate in an enhanced MLMR (eMLMR) mode or a hybrid eMLSR mode. A non-AP MLD operating in the eMLMR mode supports MLMR STR operation only between some pairs of links. For example, the STAs 722 and 724 may concurrently communicate on their respective links 502 and 504 in accordance with the MLMR STR mode of operation, whereas other pairs of STAs associated with the non-AP MLD 720 (not shown for simplicity) may not concurrently transmit or receive on their respective links (referred to herein as "eMLMR links"). Accordingly, such other STAs may "pool" their antennas so that each of the STAs can utilize the other STA's antennas when transmitting or receiving on one of the eMLMR links. On the other hand, a non-AP MLD operating in the hybrid eMLSR mode supports MLMR STR operation between some pairs of links and eMLSR operation between some other pairs of links.

In some aspects, the AP MLD 710 and the non-AP MLD 720 may perform various management and control functions (such as BSS discovery or association) on the link 702 and may exchange directional communications on the link 704 based on the management and control functions performed on the link 702. As such, the link 704 may be referred to as a "directional link" and the link 702 may be referred to as "an anchor link" associated with the directional link. In some implementations, the AP MLD 720 may advertise its BSS in management frames (such as beacons or probe responses) transmitted omnidirectionally on the anchor link 702. The AP MLD 710 may further associate with the non-AP MLD 720 over the anchor link 702 based on BSS information carried in the beacons or probe responses. In some implementations, the AP MLD 710 may communicate with the non-AP MLD 720 on the directional link 704 based on the association context established on the anchor link 702. More specifically, the AP MLD 710 and the non-AP MLD 720 may communicate on the directional link 704 using beamforming techniques (such as described with reference to FIG. 6).

Figure 8:
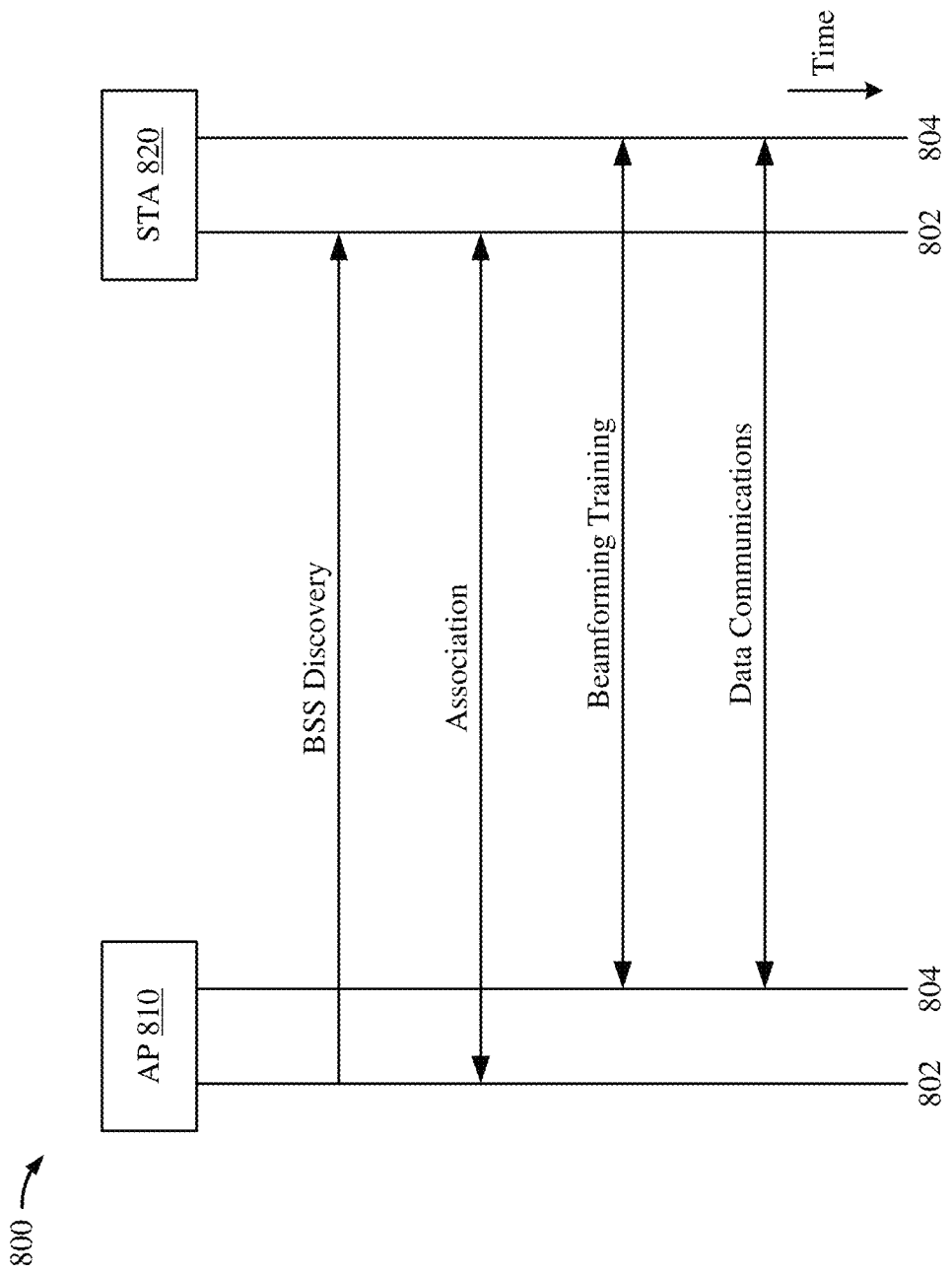
FIG. 8 shows a sequence diagram depicting example multi-link communications between an AP and a STA, according to some implementations.

FIG. 8 shows a sequence diagram 800 depicting example multi-link communications between an AP 810 and a STA 820, according to some implementations. In some implementations, the AP 810 and the STA 820 may be examples of the AP MLD 710 and the non-AP MLD 720, respectively, of FIG. 7. Each of the AP 810 and the STA 820 may be configured to communicate on multiple wireless communication links 802 and 804. With reference for example to FIG. 7, the communication links 802 and 804 may be examples of the communication links 702 and 704, respectively. As such, the link 802 may be an anchor link operating at a carrier frequency below 7 GHz and the link 804 may be a directional link operating at a carrier frequency above 7 GHz.

In the example of FIG. 8, the AP 810 and the STA 820 are initially in an unassociated state. Accordingly, the AP 810 and the STA 820 may perform BSS discovery on the anchor link 802. For example, the AP may transmit management frames (such as beacons or probe responses) on the anchor link 802 carrying BSS information advertising its BSS. Such management frames may be transmitted omnidirectionally so that any STAs within a coverage area of the AP 810 can discover the BSS. Upon discovering the BSS, the STA 820 may request to associate with the AP 810. Accordingly, the AP 810 and the STA 820 may perform an association operation over the anchor link 802. For example, the STA 820 may first initiate a low-level authentication exchange with the AP 810 over the anchor link 802. After authentication, the STA 820 may transmit an association request to the AP 810 over the anchor link 802. The AP 810 may complete the association operation by transmitting an association response back to the STA 820 over the anchor link 802.

Once associated, the AP 810 may communicate with the STA 820 over the directional link 804. As such, wireless communications on the directional link 804 (such as for data transmissions) are effectively coupled to wireless communications on the anchor link 802 (such as for BSS discovery and association). In some implementations, the STA 820 (and the AP 810) may switch between the anchor link 802 and the directional link 804 using any of the techniques described with reference to FIG. 7. In some aspects, the AP 810 and the STA 820 may use beamforming techniques when communicating on the directional link 804, for example, to mitigate the effects of path loss on carrier frequencies above 7 GHz. As described with reference to FIG. 6, the AP 810 may perform a beamforming training operation with the STA 820 to determine TX and RX beam directions that optimize beamforming gain.

In some implementations, the AP 810 may initiate the beamforming training operation by transmitting a respective BFT packet on the directional link 804 via each of its TX sectors, and the STA 820 may provide feedback to the AP 810 in response to receiving one or more of the BFT packets. For example, the feedback may indicate which of the BFT packets transmitted by the AP 810 (or which of the TX sectors of the AP 810) is associated with the highest received signal power. In some other implementations, the STA 820 may initiate the beamforming training operation by transmitting a respective BFT packet on the directional link 804 via each of its TX sectors, and the AP 810 may provide feedback to the STA 820 in response to receiving one or more of the BFT packets. For example, the feedback may indicate which of the BFT packets transmitted by the STA 820 (or which of the TX sectors of the STA 820) is associated with the highest received signal power. The device initiating the beamforming training operation is referred to as the "beamforming initiator." By contrast, the device responding (or providing feedback) to the beamforming initiator is referred to as the "beamforming responder."

As a result of the beamforming training operation, the beamforming initiator selects a TX beam direction to be used for directional communications with the beamforming responder and the beamforming responder selects an RX beam direction to be used for directional communications with the beamforming initiator. In some implementations, the beamforming initiator also may select an RX beam direction to be used for directional communications with the beamforming responder and the beamforming responder also may select a TX beam direction to be used for directional communications with the beamforming initiator. Accordingly, the AP 810 may communicate with the STA 820 over the directional link 804 using beams associated with the TX and RX beam directions determined as a result of the beamforming training operation. In some implementations, the AP 810 may further refine its TX or RX beam directions based on real-time communications with the STA 820. In some implementations, the STA 820 may further refine its TX or RX beam directions based on real-time communications with the AP 810.

Figure 9A:
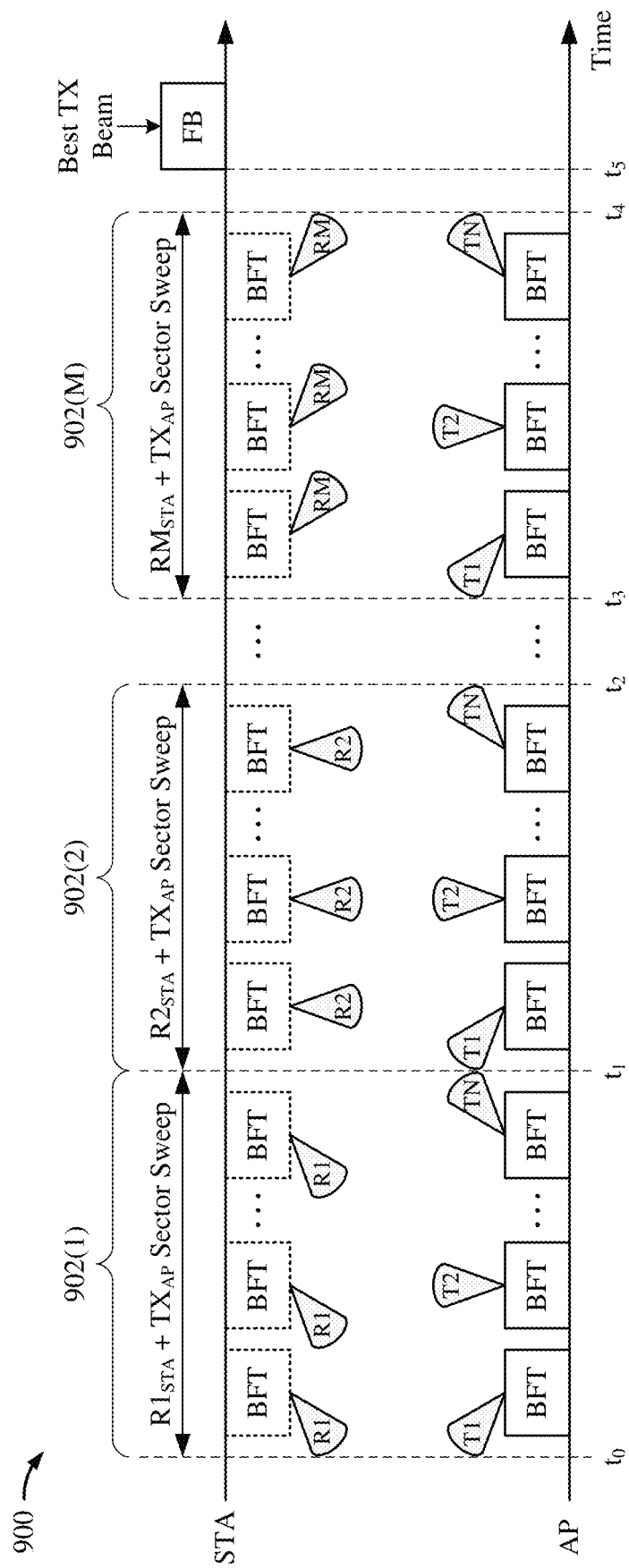
FIG. 9A shows a timing diagram depicting an example process for training an AP and a STA for transmit (TX) beamforming and receive (RX) beamforming, respectively, according to some implementations.

FIG. 9A shows a timing diagram 900 depicting an example process for training an AP and a STA for TX beamforming and RX beamforming, respectively, according to some implementations. In some aspects, the training process of FIG. 9A may represent at least a portion of a beamforming training operation that can be performed on a carrier frequency above 7 GHz (such as a directional link). In some implementations, the AP may be one example of any of the APs 610 or 810 of FIGS. 6 and 8, respectively, or the AP MLD 710 of FIG. 7. In some implementations, the STA may be one example of any of the STAs 620 or 820 of FIGS. 6 and 8, respectively, or the non-AP MLD 720 of FIG. 7.

In the example of FIG. 9A, the AP trains its TX antennas for TX beamforming concurrently while the STA trains its RX antennas for RX beamforming. More specifically, the training process is performed over a number (M) of beam training intervals 902(1)-902(M) equal to a number of RX sectors associated with the STA. During each beam training interval 902, the AP transmits a number (N) of BFT packets in N TX beam directions (T1-TN), respectively, while the STA attempts to receive (or listens for) the N BFT packets by tuning its RX antennas to a particular RX beam direction. More specifically, the RX antennas associated with the STA are tuned to M RX beam directions (R1-RM) across the M training intervals 902(1)-902(M), respectively, and remain tuned to the same RX beam direction for the duration of each beam training interval 902. Each of the TX beam directions may be associated with a respective TX sector of the AP (such as the TX sectors T1-T7 of FIG. 6) and each of the RX beam directions may be associated with a respective RX sector of the STA (such as the RX sectors R1-R7 of FIG. 6).

The first beam training interval 902(1) occurs between times $t_0$ and $t_1$. During the first beam training interval 902(1), the AP performs a TX sector sweep while the STA listens in the R1 beam direction. More specifically, the AP transmits N BFT packets in the T1-TN beam directions, respectively, and the STA attempts to receive each of the N BFT packets via the RX sector associated with the R1 beam direction. In some implementations, each of the N BFT packets may carry beam management information that can be used to train the TX or RX sectors of the AP. Example beam management information may include a PPDU type, a training direction (TX or RX), a beam tracking request, the number (N) of BFT packets, a sector identifier (ID), an antenna ID, or a number of RX antennas or sectors associated with the AP, among other examples. Due to various pairings of the R1 and T1-TN beam directions, the STA may receive zero or more of the BFT packets transmitted by the AP between times $t_0$ and $t_1$. In some implementations, the STA may measure a signal power of each of the received BFT packets (if any) during the first beam training interval 902(1).

The second beam training interval 902(2) occurs between times $t_1$ and $t_2$. During the second beam training interval 902(2), the AP performs a TX sector sweep while the STA listens in the R2 beam direction. More specifically, the AP transmits N BFT packets in the T1-TN beam directions, respectively, and the STA attempts to receive each of the N BFT packets via the RX sector associated with the R2 beam direction. In some implementations, each of the N BFT packets may carry beam management information that can be used to train the TX or RX sectors of the AP. Example beam management information may include a PPDU type, a training direction (TX or RX), a beam tracking request, the number (N) of BFT packets, a sector ID, an antenna ID, or a number of RX antennas or sectors associated with the AP, among other examples. Due to various pairings of the R2 and T1-TN beam directions, the STA may receive zero or more of the BFT packets transmitted by the AP between times $t_1$ and $t_2$. In some implementations, the STA may measure a signal power of each of the received BFT packets (if any) during the second beam training interval 902(2).

The $M^{th}$ beam training interval 902(M) occurs between times $t_3$ and $t_4$. During the $M^{th}$ beam training interval 902(M), the AP performs a TX sector sweep while the STA listens in the RM beam direction. More specifically, the AP transmits N BFT packets in the T1-TN beam directions, respectively, and the STA attempts to receive each of the N BFT packets via the RX sector associated with the RM beam direction. In some implementations, each of the N BFT packets may carry beam management information that can be used to train the TX or RX sectors of the AP. Example beam management information may include a PPDU type, a training direction (TX or RX), a beam tracking request, the number (N) of BFT packets, a sector ID, an antenna ID, or a number of RX antennas or sectors associated with the AP, among other examples. Due to various pairings of the RM and T1-TN beam directions, the STA may receive zero or more of the BFT packets transmitted by the AP between times $t_3$ and $t_4$. In some implementations, the STA may measure a signal power of each of the received BFT packets (if any) during the $M^{th}$ beam training interval 902(M).

The STA compares the measured signal powers of the received BFT packets across the beam training intervals 902(1)-902(M) and selects a combination of TX and RX beam directions that results in the highest measured signal power. The selected TX beam direction may be referred to herein as the "best TX beam direction" and the selected RX beam direction may be referred to herein as the "best RX beam direction." At time $t_5$, the STA provides feedback (FB) to the AP indicating the best TX beam direction. For example, the feedback may include a best sector ID (such as the sector ID of the AP associated with the best TX beam direction), a best antenna ID (such as the antenna ID of the AP associated with the best TX beam direction), or a signal-to-noise ratio (SNR) report, among other examples. Thereafter, the AP may tune its TX antennas in the best TX beam direction and the STA may tune its RX antennas in the best RX beam direction to exchange directional communications over the directional link.

In some implementations, the AP and the STA may support antenna reciprocity. In other words, the sector ID (or antenna ID) associated with the best TX beam direction is the same as the sector ID (or antenna ID) associated with the best RX beam direction for a given wireless communication device. In such implementations, the beamforming training operation may be terminated after the STA provides the feedback to the AP at time $t_5$. In some other implementations, at least one of the AP or the STA may not support antenna reciprocity. In other words, the sector ID (or antenna ID) associated with the best TX beam direction may be different than the sector ID (or antenna ID) associated with the best RX beam direction for a given wireless communication device. In such implementations, the AP and the STA must perform additional training to determine the best RX beam direction for the AP and the best TX beam direction for the STA.

Figure 9B:
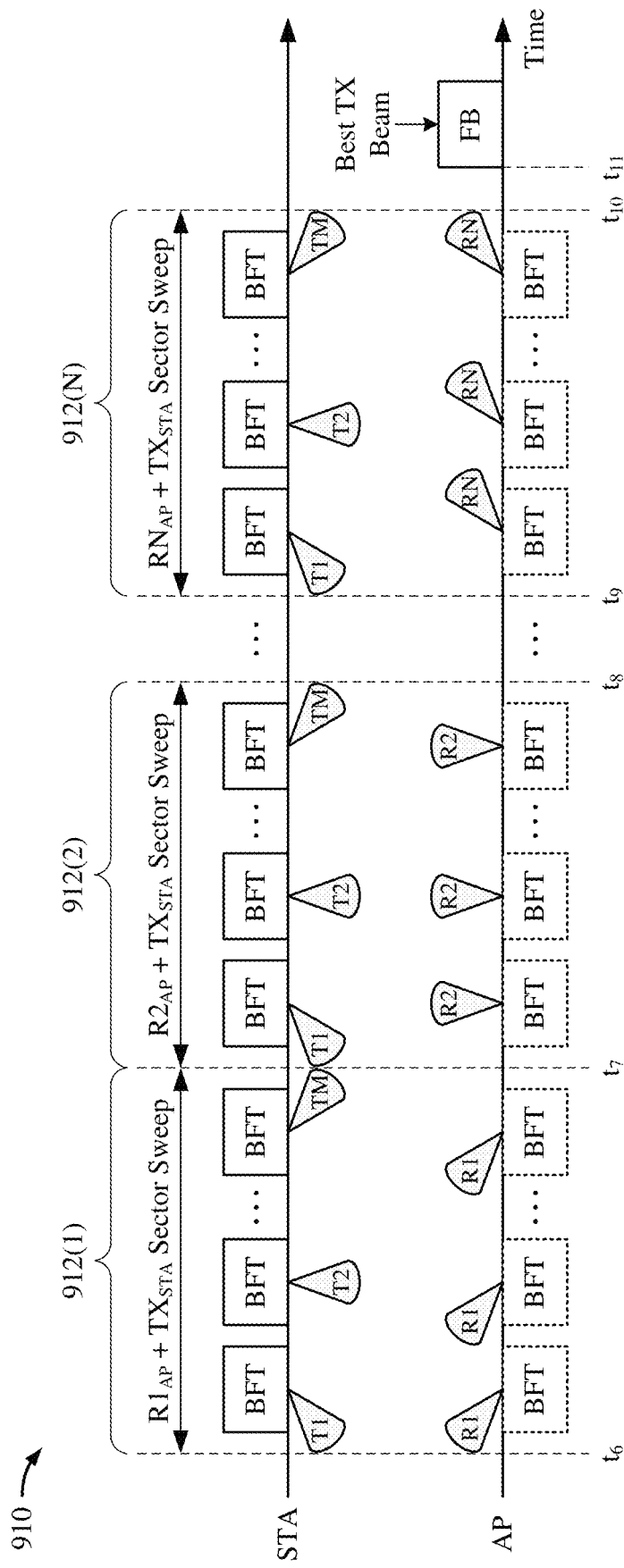
FIG. 9B shows a timing diagram depicting an example process for training an AP and a STA for RX beamforming and TX beamforming, respectively, according to some implementations.

FIG. 9B shows a timing diagram 910 depicting an example process for training an AP and a STA for TX beamforming and RX beamforming, respectively, according to some implementations. In some aspects, the training process of FIG. 9B may represent at least a portion of a beamforming training operation that can be performed on a carrier frequency above 7 GHz (such as a directional link). In some implementations, the training process of FIG. 9B may follow the training process of FIG. 9A (where at least one of the AP or the STA does not support antenna reciprocity). In some implementations, the AP may be one example of any of the APs 610 or 810 of FIGS. 6 and 8, respectively, or the AP MLD 710 of FIG. 7. In some implementations, the STA may be one example of any of the STAs 620 or 820 of FIGS. 6 and 8, respectively, or the non-AP MLD 720 of FIG. 7.

In the example of FIG. 9B, the AP trains its RX antennas for RX beamforming concurrently while the STA trains its TX antennas for TX beamforming. More specifically, the training process is performed over a number (N) of beam training intervals 912(1)-912(N) equal to a number of RX sectors associated with the AP. During each beam training interval 912, the STA transmits a number (M) of BFT packets in M TX beam directions (T1-TM), respectively, while the AP attempts to receive (or listens for) the M BFT packets by tuning its RX antennas to a particular RX beam direction. More specifically, the RX antennas associated with the AP are tuned to N RX beam directions (R1-RN) across the N training intervals 912(1)-912(N), respectively, and remain tuned to the same RX beam direction for the duration of each beam training interval 912. Each of the TX beam directions may be associated with a respective TX sector of the STA and each of the RX beam directions may be associated with a respective RX sector of the AP.

The first beam training interval 912(1) occurs between times $t_6$ and $t_7$. During the first beam training interval 912(1), the STA performs a TX sector sweep while the AP listens in the R1 beam direction. More specifically, the STA transmits M BFT packets in the T1-TM beam directions, respectively, and the AP attempts to receive each of the M BFT packets via the RX sector associated with the R1 beam direction. In some implementations, each of the M BFT packets may carry beam management information that can be used to train the TX or RX sectors of the STA. Example beam management information may include a PPDU type, a training direction (TX or RX), a beam tracking request, the number (M) of BFT packets, a sector ID, an antenna ID, or a number of RX antennas or sectors associated with the STA, among other examples. Due to various pairings of the R1 and T1-TM beam directions, the AP may receive zero or more of the BFT packets transmitted by the STA between times $t_6$ and $t_7$. In some implementations, the AP may measure a signal power of each of the received BFT packets (if any) during the first beam training interval 912(1).

The second beam training interval 912(2) occurs between times $t_7$ and $t_8$. During the second beam training interval 912(2), the STA performs a TX sector sweep while the AP listens in the R2 beam direction. More specifically, the STA transmits M BFT packets in the T1-TM beam directions, respectively, and the AP attempts to receive each of the M BFT packets via the RX sector associated with the R2 beam direction. In some implementations, each of the M BFT packets may carry beam management information that can be used to train the TX or RX sectors of the STA. Example beam management information may include a PPDU type, a training direction (TX or RX), a beam tracking request, the number (M) of BFT packets, a sector ID, an antenna ID, or a number of RX antennas or sectors associated with the STA, among other examples. Due to various pairings of the R2 and T1-TM beam directions, the AP may receive zero or more of the BFT packets transmitted by the STA between times $t_7$ and $t_8$. In some implementations, the AP may measure a signal power of each of the received BFT packets (if any) during the second beam training interval 912(2).

The $N^{th}$ beam training interval 912(N) occurs between times $t_9$ and $t_{10}$. During the $N^{th}$ beam training interval 912(N), the STA performs a TX sector sweep while the AP listens in the RN beam direction. More specifically, the STA transmits M BFT packets in the T1-TM beam directions, respectively, and the AP attempts to receive each of the M BFT via the RX sector associated with the RN beam direction. In some implementations, each of the M BFT packets may carry beam management information that can be used to train the TX or RX sectors of the STA. Example beam management information may include a PPDU type, a training direction (TX or RX), a beam tracking request, the number (M) of BFT packets, a sector ID, an antenna ID, or a number of RX antennas or sectors associated with the STA, among other examples. Due to various pairings of the RN and T1-TM beam directions, the AP may receive zero or more of the M BFT packets transmitted by the STA between times $t_9$ and $t_{10}$. In some implementations, the AP may measure a signal power of each of the received BFT packets (if any) during the $N^{th}$ beam training interval 912(N).

The AP compares the measured signal powers of the received BFT packets across the beam training intervals 912(1)-912(N) and selects the best TX beam direction and the best RX beam direction (such as the TX and RX beam directions that results in the highest measured signal power). At time $t_{11}$, the AP provides feedback (FB) to the STA indicating the best TX beam direction. For example, the feedback may include a best sector ID (such as the sector ID of the STA associated with the best TX beam direction), a best antenna ID (such as the antenna ID of the STA associated with the best TX beam direction), or an SNR report, among other examples. Thereafter, the STA may tune its TX antennas in the best TX beam direction and the AP may tune its RX antennas in the best RX beam direction to exchange directional communications over the directional link.

Figure 10A:
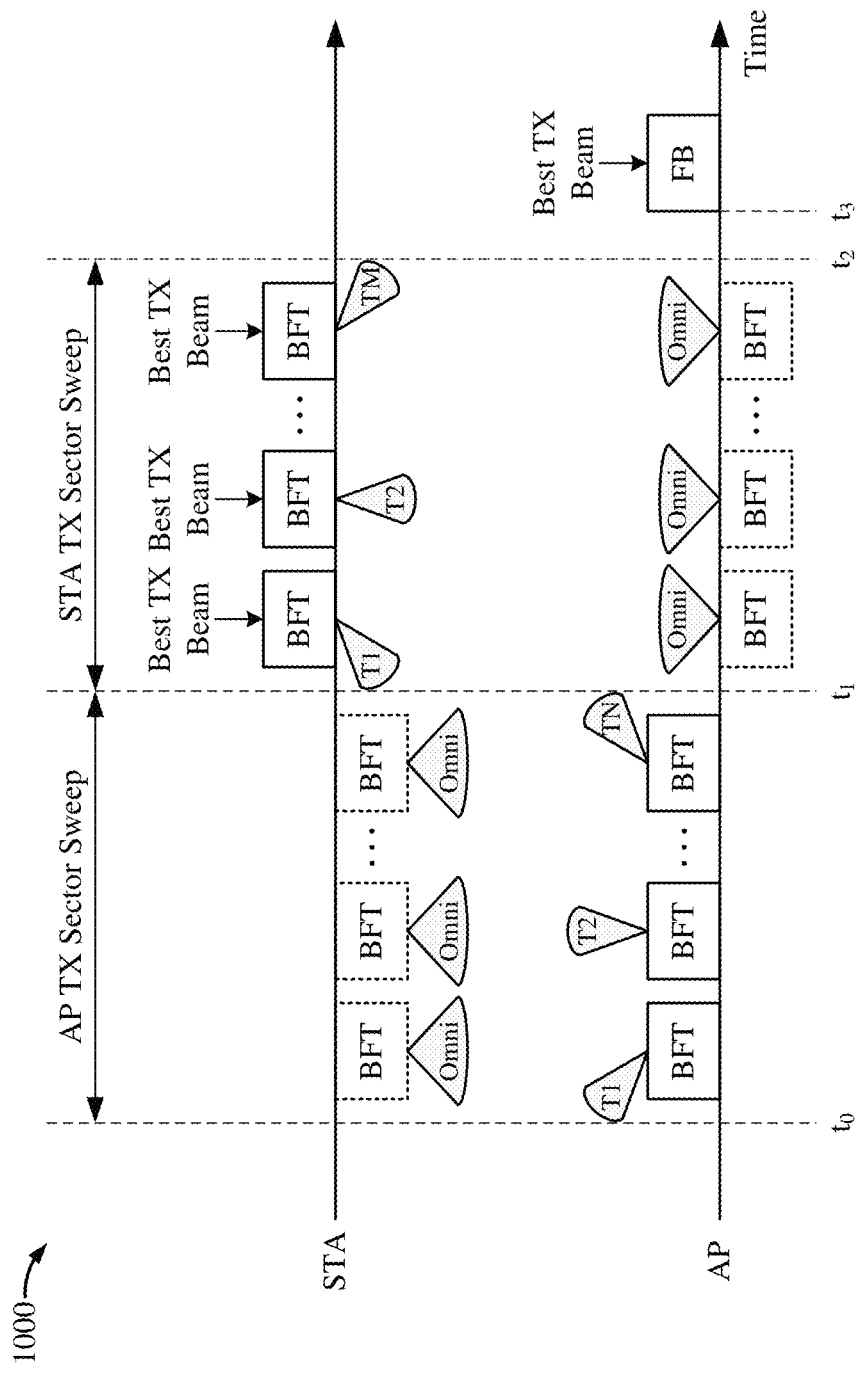
FIG. 10A shows a timing diagram depicting an example process for training an AP and a STA for TX beamforming, according to some implementations.

FIG. 10A shows a timing diagram 1000 depicting an example process for training an AP and a STA for TX beamforming, according to some implementations. In some aspects, the training process of FIG. 10A may represent at least a portion of a beamforming training operation that can be performed on a carrier frequency above 7 GHz (such as a directional link). In some implementations, the AP may be one example of any of the APs 610 or 810 of FIGS. 6 and 8, respectively, or the AP MLD 710 of FIG. 7. In some implementations, the STA may be one example of any of the STAs 620 or 820 of FIGS. 6 and 8, respectively, or the non-AP MLD 720 of FIG. 7.

The AP performs a TX sector sweep between times $t_0$ and $t_1$ while the STA listens in an omnidirectional mode. More specifically, the AP transmits a number (N) of BFT packets in N TX beam directions (T1-TN), respectively, and the STA receives one or more of the N BFT packets without tuning its RX antennas for RX beamforming. Each of the T1-TN beam directions may be associated with a respective TX sector of the AP. In some implementations, each of the N BFT packets may carry beam management information that can be used to train the TX or RX sectors of the AP. Example beam management information may include a PPDU type, a training direction (TX or RX), a beam tracking request, the number (N) of BFT packets, a number (K) of remaining BFT packets to be transmitted, a sector ID, an antenna ID, or a number of RX antennas or sectors associated with the AP, among other examples. The STA measures a signal power of each of the BFT packets received from the AP and selects the best TX beam direction associated therewith (such as the TX beam direction resulting in the highest measured signal power).

The STA performs a TX sector sweep between times $t_1$ and $t_2$ while the AP listens in an omnidirectional mode. More specifically, the STA transmits a number (M) of BFT packets in M TX beam directions (T1-TM), respectively, and the AP receives one or more of the M BFT packets without tuning its RX antennas for RX beamforming. Each of the T1-TM beam directions may be associated with a respective TX sector of the STA. In some implementations, each of the M BFT packets may carry beam management information that can be used to train the TX or RX sectors of the STA. In some implementations, the beam management information also may indicate the best TX beam direction associated with the BFT packets transmitted by the AP between times $t_0$ and $t_1$. Example beam management information may include a PPDU type, a training direction (TX or RX), a beam tracking request, the number (M) of BFT packets, a number (L) of remaining BFT packets to be transmitted, a sector ID, an antenna ID, a best sector ID, a best antenna ID, an SNR report, or a number of RX antennas or sectors associated with the STA, among other examples.

The AP measures a signal power of each of the BFT packets received from the STA, between times $t_1$ and $t_2$, and selects the best TX beam direction associated therewith (such as the TX beam direction resulting in the highest measured signal power). At time $t_3$, the AP provides feedback (FB) to the STA indicating the best TX beam direction associated with the BFT packets transmitted by the STA between times $t_1$ and $t_2$. For example, the feedback may include a best sector ID, a best antenna ID, or an SNR report, among other examples. Thereafter, the AP may tune its TX antennas in the best TX beam direction indicated by the STA (such as via the BFT packets transmitted between times $t_1$ and $t_2$) to transmit beams to the STA on the directional link. Similarly, the STA may tune its TX antennas in the best TX beam direction indicated by the AP (such as via the feedback provided at time $t_3$) to transmit beams to the AP on the directional link.

In some implementations, the AP and the STA may support antenna reciprocity (where the best TX beam direction is the same as the best RX beam direction for a given wireless communication device). In such implementations, the beamforming training operation may be terminated after the AP provides the feedback to the STA at time $t_3$. In some other implementations, at least one of the AP or the STA may not support antenna reciprocity (where the best TX beam direction may be different than the best RX beam direction for a given wireless communication device). In such implementations, the AP and the STA must perform additional training to determine the best RX beam direction for the AP and the best RX beam direction for the STA.

Figure 10B:
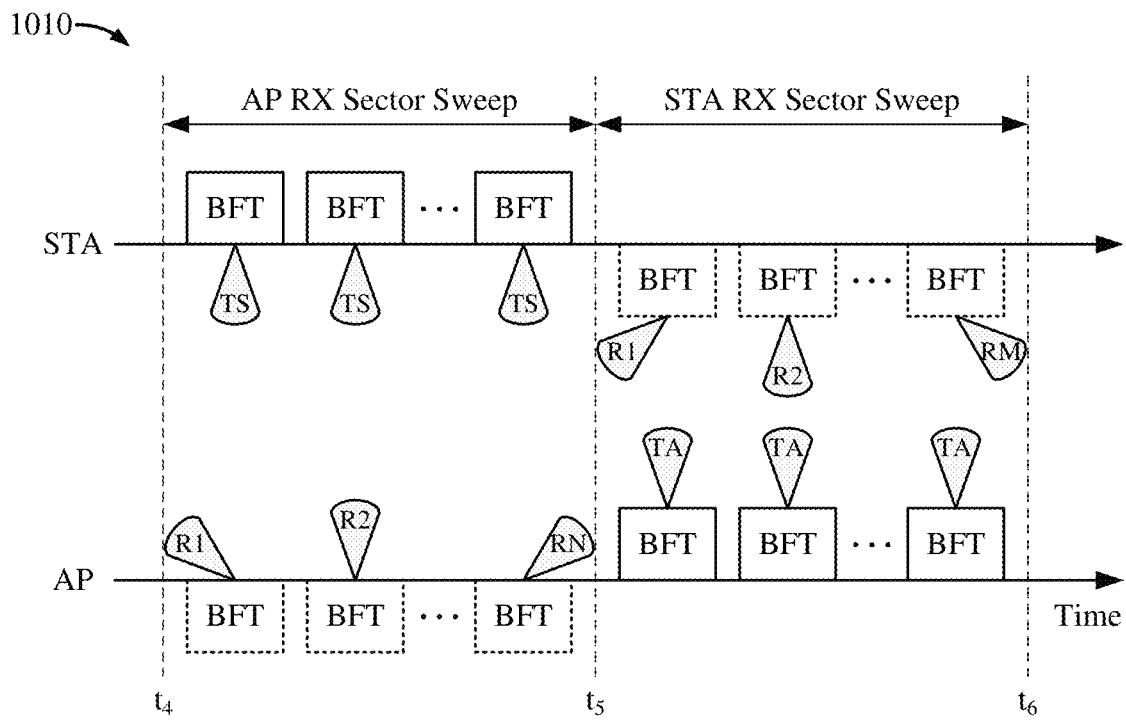
FIG. 10B shows a timing diagram depicting an example process for training an AP and a STA for RX beamforming, according to some implementations.

FIG. 10B shows a timing diagram 1010 depicting an example process for training an AP and a STA for RX beamforming, according to some implementations. In some aspects, the training process of FIG. 10B may represent at least a portion of a beamforming training operation that can be performed on a carrier frequency above 7 GHz (such as a directional link). In some implementations, the training process of FIG. 10B may follow the training process of FIG. 10A (where at least one of the AP or the STA does not support antenna reciprocity). In some implementations, the AP may be one example of any of the APs 610 or 810 of FIGS. 6 and 8, respectively, or the AP MLD 710 of FIG. 7. In some implementations, the STA may be one example of any of the STAs 620 or 820 of FIGS. 6 and 8, respectively, or the non-AP MLD 720 of FIG. 7.

The AP performs an RX sector sweep between times $t_4$ and $t_5$ while the STA transmits a number (N) of training signals in a best TX beam direction (TS) associated with the STA (such as the best TX beam direction indicated by the feedback at time $t_3$ of FIG. 10A). In the example of FIG. 10B, each of the N training signals is transmitted as a respective BFT packet (or PPDU). More specifically, the STA transmits N BFT packets in the TS beam direction and the AP attempts to receive the N BFT packets by tuning its RX antennas in N RX beam directions (R1-RN), respectively. For example, each of the R1-RN beam directions may be associated with a respective RX sector of the AP. In some implementations, each of the N BFT packets may carry beam management information (such as any of the beam management information described with reference to FIG. 10A). The AP measures a signal power of each received BFT packet and selects the best RX beam direction associated therewith (such as the RX beam direction resulting in the highest measured signal power).

The STA performs an RX sector sweep between times $t_5$ and $t_6$ while the AP transmits a number (M) of training signals in a best TX beam direction (TA) associated with the AP (such as the best TX beam direction indicated by the BFT packets between times $t_1$ and $t_2$ of FIG. 10A). In the example of FIG. 10B, each of the M training signals is transmitted as a respective BFT packet (or PPDU). More specifically, the AP transmits M BFT packets in the TA beam direction and the STA attempts to receive the M BFT packets by tuning its RX antennas in M RX beam directions (R1-RM), respectively. For example, each of the R1-RM beam directions may be associated with a respective RX sector of the STA. In some implementations, each of the M BFT packets may carry beam management information (such as any of the beam management information described with reference to FIG. 10A). The STA measures a signal power of each received BFT packet and selects the best RX beam direction associated therewith (such as the RX beam direction resulting in the highest measured signal power).

After time $t_6$, the AP may tune its RX antennas in the best RX beam direction determined as a result of its RX sector sweep (between times $t_4$ and $t_5$) to receive beams transmitted by the STA on the directional link. Similarly, the STA may tune its RX antennas in the best RX beam direction determined as a result of its RX sector sweep (between times $t_5$ and $t_6$) to receive beams transmitted by the AP on the directional link. In some aspects, the training signals used for training the RX antennas of the AP and the STA may be combined into a single packet or PPDU. For example, each training signal may be transmitted as a respective training field (TRN) of the same PPDU. In some implementations, such PPDUs also may carry data intended for the AP or the STA. The process of using TRNs to train the TX or RX antennas of a wireless communication device for beamforming is referred to herein as "beam refinement."

Figure 10C:
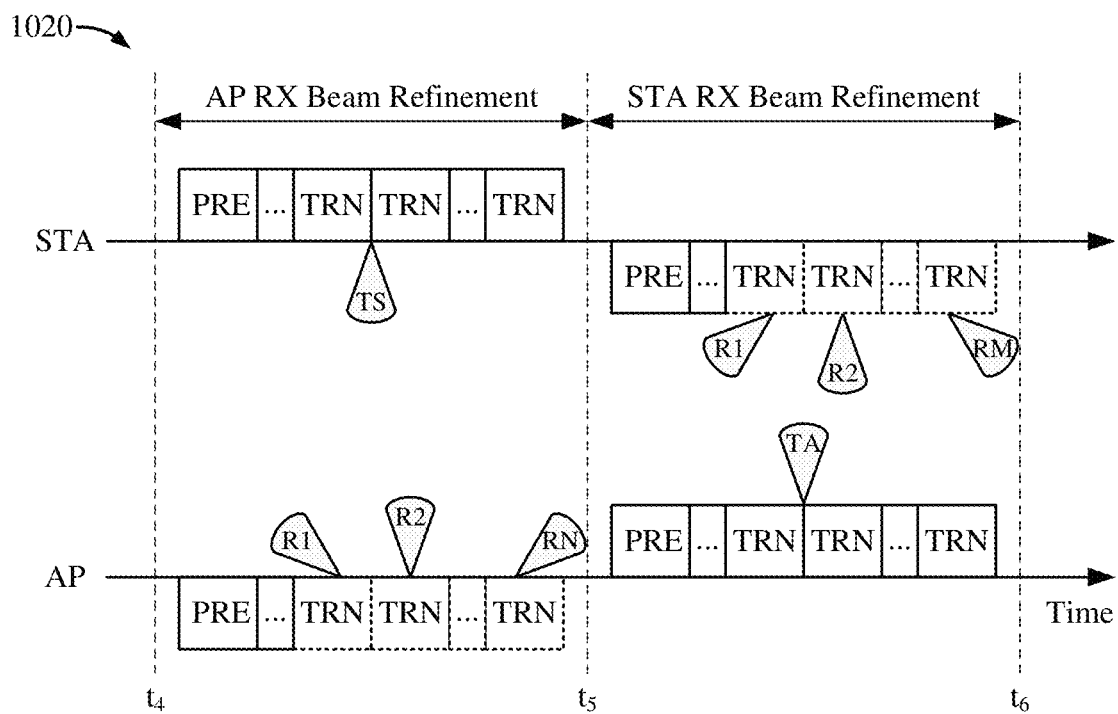
FIG. 10C shows another timing diagram depicting an example process for training an AP and a STA for RX beamforming, according to some implementations.

FIG. 10C shows another timing diagram 1020 depicting an example process for training an AP and a STA for RX beamforming, according to some implementations. In some aspects, the training process of FIG. 10C may represent at least a portion of a beamforming training operation that can be performed on a carrier frequency above 7 GHz (such as a directional link). In some implementations, the training process of FIG. 10C may follow the training process of FIG. 10A (where at least one of the AP or the STA does not support antenna reciprocity). In some implementations, the AP may be one example of any of the APs 610 or 810 of FIGS. 6 and 8, respectively, or the AP MLD 710 of FIG. 7. In some implementations, the STA may be one example of any of the STAs 620 or 820 of FIGS. 6 and 8, respectively, or the non-AP MLD 720 of FIG. 7.

The AP performs RX beam refinement between times $t_4$ and $t_5$ while the STA transmits a series of training signals in a best TX beam direction (TS) associated with the STA (such as the best TX beam direction indicated by the feedback at time $t_3$ of FIG. 10A). In the example of FIG. 10C, each of the training signals is transmitted as a respective training field (TRN) of a PPDU. In other words, the series of training signals share the same PHY preamble (PRE). In some implementations, the STA may transmit a number (N) of TRNs in the TS beam direction while the AP attempts to receive the N TRNs by tuning its RX antennas in N RX beam directions (R1-RN), respectively, where each of the R1-RN beam directions is associated with a respective RX sector of the AP (such as shown in FIG. 10C). In some other implementations, the STA may transmit a number (K) of TRNs in the TS beam direction while the AP attempts to receive each of the K TRNs via a respective antenna element (listening in an omnidirectional mode). In some aspects, the PPDU may carry beam management information associated with the N TRNs (such as any of the beam management information described with reference to FIG. 10A). In some implementations, the AP may measure a signal power of each received TRN and may select the best RX beam direction associated therewith (such as the RX beam direction associated with the RX sector or antenna elements resulting in the highest measured signal power).

The STA performs RX beam refinement between times $t_5$ and $t_6$ while the AP transmits a series of training signals in a best TX beam direction (TA) associated with the AP (such as the best TX beam direction indicated by the BFT packets between times $t_1$ and $t_2$ of FIG. 10A). In the example of FIG. 10C, each of the training signals is transmitted as a respective TRN of a PPDU. In other words, the series of training signals share the same PHY preamble. In some implementations, the AP may transmit a number (M) of TRNs in the TA beam direction while the STA attempts to receive the M TRNs by tuning its RX antennas in M RX beam directions (R1-RM), respectively, where each of the R1-RM beam directions is associated with a respective RX sector of the STA (such as shown in FIG. 10C). In some other implementations, the AP may transmit a number (L) of TRNs in the TA beam direction with the STA attempts to receive each of the L TRNs via a respective antenna element (listening in an omnidirectional mode). In some aspects, the PPDU may carry beam management information associated with the M TRNs (such as any of the beam management information described with reference to FIG. 10A). In some implementations, the STA may measure a signal power of each received TRN and may select the best RX beam direction associated therewith (such as the RX beam direction associated with the RX sector or antenna elements resulting in the highest measured signal power).

After time $t_6$, the AP may tune its RX antennas in the best RX beam direction determined as a result of its RX beam refinement (between times $t_4$ and $t_5$) to receive beams transmitted by the STA on the directional link. Similarly, the STA may tune its RX antennas in the best RX beam direction determined as a result of its RX beam refinement (between times $t_5$ and $t_6$) to receive beams transmitted by the AP on the directional link. In some implementations, the beam refinement protocol can be used in conjunction with data communications. In such implementations, the TRNs may be appended to the end of a PPDU that includes a data portion. With reference for example to FIG. 10C, the PPDU transmitted by the STA (between times $t_4$ and $t_5$) may include a data portion (between the PHY preamble and the TRNs) carrying data intended for the AP. Similarly, the PPDU transmitted by the AP (between times $t_5$ and $t_6$) may include a data portion (between the PHY preamble and the TRNs) carrying data intended for the STA.

Aspects of the present disclosure recognize that the AP and the STA may need to perform multiple beamforming training operations over time to maintain communications over the wireless communication link. For example, the AP and the STA may need to retrain their TX and RX antennas if the directional link is broken or if the STA reassociates with the AP. Further, the best TX or RX beam directions may change due to movements of the STA (or the AP) or changes in the channel conditions (or other environmental factors). In some aspects, the AP and the STA may periodically perform subsequent beamforming training operations to retrain their TX or RX antennas. In some other aspects, the AP and the STA may perform subsequent beamforming training operations if a link quality metric falls below a threshold level. In some implementations, each subsequent beamforming training operation may include a full scan of all TX and RX beam directions associated with the AP and the STA. In some other implementations, each subsequent beamforming training operation (after an initial beamforming training operation) may include only a partial scan of the TX and RX beam directions associated with the AP and the STA (such as a subset of the TX or RX beam directions centered around the best TX or RX beam direction from a previous scan).

In some implementations, the AP and the STA may retrain their TX antennas by performing TX sector sweeps (such as described with reference to any of FIGS. 9A, 9B, and 10A). In some implementations, the AP and the STA may retrain their RX antennas by performing RX sector sweeps (such as described with reference to any of FIGS. 9A, 9B, and 10B). In some other implementations, the AP and the STA may retrain their RX antennas using the beam refinement protocol (such as described with reference to FIG. 10C). Still further, in some implementations, the AP and the STA may use the beam refinement protocol to retrain their TX antennas.

Figure 11:
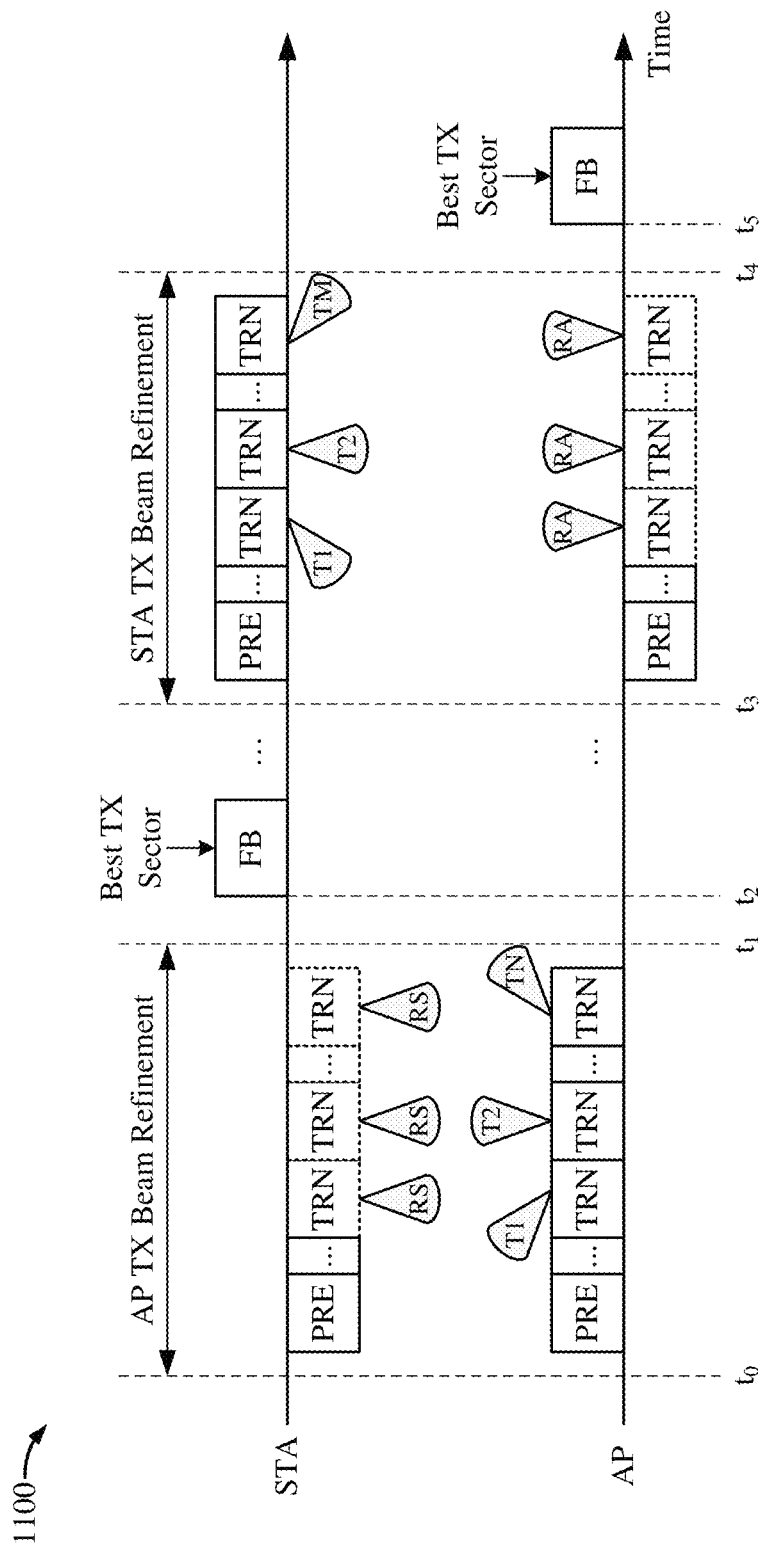
FIG. 11 shows another timing diagram depicting an example process for training an AP and a STA for TX beamforming, according to some implementations.

FIG. 11 shows another timing diagram 1100 depicting an example process for training an AP and a STA for TX beamforming, according to some implementations. In some aspects, the training process of FIG. 11 may represent at least a portion of a beamforming training operation that can be performed on a carrier frequency above 7 GHz (such as a directional link). In some implementations, the AP may be one example of any of the APs 610 or 810 of FIGS. 6 and 8, respectively, or the AP MLD 710 of FIG. 7. In some implementations, the STA may be one example of any of the STAs 620 or 820 of FIGS. 6 and 8, respectively, or the non-AP MLD 720 of FIG. 7.

The AP performs TX beam refinement, between times $t_0$ and $t_1$, by transmitting a PPDU including a number (N) of TRNs while the STA listens in a best RX beam direction (RS) associated with the STA (such as the best RX beam direction determined as a result of the STA RX sector sweep of FIG. 10B or the STA RX beam refinement of FIG. 10C). More specifically, the AP transmits the N TRNs in N TX beam directions (T1-TN), respectively, and the STA attempts to receive each of the N TRNs via the RX sector associated with the RS beam direction. For example, each of the T1-TN beam directions may be associated with a respective TX sector of the AP. In some implementations, the PPDU may carry beam management information associated with the N TRNs (such as any of the beam management information described with reference to FIG. 10A). The STA measures a signal power of each received TRN and selects the best TX beam direction associated therewith (such as the TX beam direction resulting in the highest measured signal power). At time $t_2$, the STA provides feedback to the AP indicating the best TX beam direction (such as the best sector ID or the best element ID).

The STA performs TX beam refinement, between times $t_3$ and $t_4$, by transmitting a PPDU including a number (M) of TRNs while the AP listens in a best RX beam direction (RA) associated with the AP (such as the best RX beam direction determined as a result of the AP RX sector sweep of FIG. 10B or the AP RX beam refinement of FIG. 10C). More specifically, the STA transmits the M TRNs in M TX beam directions (T1-TM), respectively, and the AP attempts to receive each of the M TRNs via the RX sector associated with the RS beam direction. For example, each of the T1-TM beam directions may be associated with a respective TX sector of the STA. In some implementations, the PPDU may carry beam management information associated with the M TRNs (such as any of the beam management information described with reference to FIG. 10A). The AP measures a signal power of each received TRN and selects the best TX beam direction associated therewith (such as the TX beam direction resulting in the highest measured signal power). At time $t_5$, the AP provides feedback to the STA indicating the best TX beam direction (such as the best sector ID or the best element ID).

After time $t_5$, the AP may tune its TX antennas in the best TX beam direction determined as a result of its TX beam refinement (between times $t_0$ and $t_1$) to transmit beams to the STA on the directional link. Similarly, the STA may tune its TX antennas in the best TX beam direction determined as a result of its TX beam refinement (between times $t_3$ and $t_4$) to transmit beams to the AP on the directional link. In some implementations, the beam refinement protocol can be used in conjunction with data communications. In such implementations, the TRNs may be appended to the end of a PPDU that includes a data portion. With reference for example to FIG. 11, the PPDU transmitted by the AP (between times $t_0$ and $t_1$) may include a data portion (between the PHY preamble and the TRNs) carrying data intended for the STA. Similarly, the PPDU transmitted by the STA (between times $t_3$ and $t_4$) may include a data portion (between the PHY preamble and the TRNs) carrying data intended for the AP.

Aspects of the present disclosure recognize that beamforming gains are significantly greater when TX beamforming is used at the transmitting device in combination with RX beamforming at the receiving device (such as when performing any of the training processes described with reference to FIGS. 9A, 9B, 10B, 10C, and 11) than when TX beamforming is used at the transmitting device while the receiving device operates in an omnidirectional mode (such as when performing the training process described with reference to FIG. 10A). In some aspects, a "data PHY" (DPHY) PPDU format may be used when transmitting beams to a receiving device configured for RX beamforming and a "control PHY" (CPHY) PPDU format may be used when transmitting beams to a receiving device operating in an omnidirectional mode. More specifically, the CPHY PPDU format may be designed to overcome one-sided beamforming gains on the directional link than the DPHY PPDU format. In some implementations, the CPHY PPDU format and the DPHY PPDU format may conform to existing PPDU formats associated with a sub-7 GHz frequency band.

As described above, wireless communications on higher carrier frequencies may suffer from greater phase noise compared to wireless communications on lower frequency bands. For example, increasing the carrier frequency from 5.8 GHz to 60 GHz results in a 10× increase in phase noise. Aspects of the present disclosure recognize that the phase noise can be mitigated by increasing the subcarrier spacing (SCS) between modulated subcarriers. As described with reference to FIG. 2A, existing WLAN packet formats include an L-STF that is modulated on every $4^{th}$ subcarrier spanning a given bandwidth to support carrier frequency offset (CFO) estimations up to 2 subcarriers apart. Further, the local oscillators (LOs) implemented by existing WLAN transmitters and receivers are required to be accurate up to ±20 ppm. As such, existing WLAN architectures can support CFOs up to ±40 ppm (between the transmitter and the receiver), which is equivalent to ±2.4 MHz in the 60 GHz frequency band and ±1.8 MHz in the 45 GHz frequency band. To support CFOs up to ±2.4 MHz, the SCS associated with L-STF should be greater than or equal to 1.2 MHz.

In some aspects, a wireless communication device (such as an AP or a STA) may up-clock a PPDU for transmission on carrier frequencies above 7 GHz, where the PPDU conforms to an existing PPDU format associated with a sub-7 GHz frequency band. As used herein, the term "up-clocking" refers to increasing the frequency of a clock signal used to convert the PPDU between the frequency domain and the time domain (beyond a frequency ($f_0$) associated with the existing PPDU format), and the ratio (R) of the up-clocked frequency ($f_s$) to $f_0$ is referred to herein as the "up-clocking ratio" (where $R=f_s/f_0$). For example, the clock signal may be provided to a digital-to-analog converter (DAC) that samples the output of an inverse fast Fourier transform (IFFT). The IFFT transforms a number (n) of modulated subcarriers, representing the PPDU, to n time-domain samples. In some aspects, the ratio of the clock signal frequency $f_s$ to the IFFT size ($n_{IFFT}$) may result in an SCS greater than or equal to 1.2 MHz, where the SCS represents a spacing between the subcarriers on which a PHY preamble (including L-STF) of the PPDU is modulated. More specifically, the SCS as a result of up-clocking ($SCS_U$) may be a multiple of an SCS associated with the existing PPDU format ($SCS_0$), where $SCS_U=R*SCS_0$.

Figure 12:
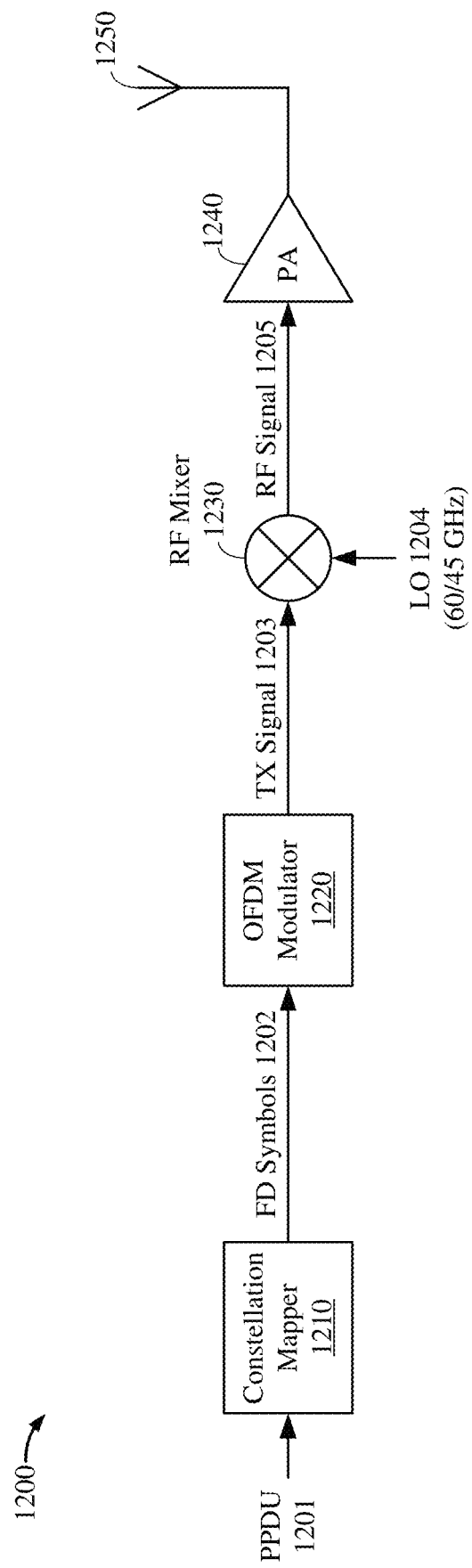
FIG. 12 shows a block diagram of an example TX processing chain for a wireless communication device, according to some implementations.

FIG. 12 shows a block diagram of an example TX processing chain 1200 for a wireless communication device, according to some implementations. The TX processing chain 1200 is configured to process a PPDU 1201 for transmission, as a radio frequency (RF) signal 1205, on a directional link. In some aspects, the PPDU 1201 may be one example of the PPDU 300 of FIG. 3. In some implementations, the wireless communication device may be one example of any of the APs 610 or 810 of FIGS. 6 and 8, respectively, or the AP MLD 710 of FIG. 7. In some other implementations, the wireless communication device may be one example of any of the STAs 620 or 820 of FIGS. 6 and 8, respectively, or the non-AP MLD 720 of FIG. 7. Accordingly, the directional link may be one example of any of the directional links 704 or 804 of FIGS. 7 and 8, respectively. For simplicity, only a single spatial stream of the TX processing chain 1200 is depicted in FIG. 12. In actual implementations, the TX processing chain 1200 may include any number of spatial streams.

The TX processing chain 1200 includes a constellation mapper 1210, an orthogonal frequency-division multiplexing (OFDM) modulator 1220, an RF mixer 1230, and a power amplifier (PA) 1240. The constellation mapper 1210 maps the PPDU 1201 to one or more frequency-domain (FD) symbols 1202 associated with a modulation scheme. Example suitable modulation schemes include binary phase-shift keying (BPSK), quadrature phase-shift keying (QPSK), and quadrature amplitude modulation (QAM). The OFDM modulator 1220 modulates the FD symbols 1202 onto a set of orthogonal subcarriers and converts the modulated subcarriers to a time-varying TX signal 1203. The RF mixer 1230 up-converts the TX signal 1203 to a carrier frequency, and the power amplifier 1240 amplifies the resulting RF signal 1205 for transmission via one or more antennas 1250. For example, the RF mixer 1230 may modulate the TX signal 1203 onto an LO signal 1204 that oscillates at the carrier frequency. In the example of FIG. 12, the carrier frequency associated with the LO signal 1204 is shown to be higher than 7 GHz. In some implementations, the carrier frequency may be in the 60 GHz frequency band. In some other implementations, the carrier frequency may be in the 45 GHz frequency band.

As described above, many existing WLAN architectures are designed for wireless communications on carrier frequencies below 7 GHz (such as in the 2.4 GHz, 5 GHz, or 6 GHz frequency bands). In some aspects, existing WLAN hardware may be repurposed to support wireless communications on carrier frequencies above 7 GHz. For example, the TX processing chain 1200 may receive the LO signal 1204 from a local oscillator that is accurate up to ±20 ppm. As described above, increasing the carrier frequency of the LO signal 1204 also increases the phase noise associated with the RF signal 1205. For example, operating the local oscillator at 60 GHz can result in a CFO of ±2.4 MHz between the transmitter and the receiver. According to existing versions of the IEEE 802.11 standard, the PHY preamble of the PPDU 1201 includes an L-STF having a 1x symbol duration associated with an SCS equal to 312.5 KHz that can support CFO estimations up to 2 subcarriers apart. As used herein, the term "1x SCS" refers to the subcarrier spacing between the subcarriers to which L-STF is mapped. Thus, to support CFOs up to ±2.4 MHz, the 1x SCS associated with the PPDU 1201 should be greater than or equal to 1.2 MHz.

Aspects of the present disclosure recognize that any SCS greater than or equal to 1.2 MHz may not be suitable for wireless communications on sub-7 GHz carrier frequencies. As such, existing WLAN communication protocols for sub-7 GHz wireless communications (such as the IEEE 802.11be, 11ax, 11ac, and earlier amendments of the IEEE 802.11 standard) do not define a PPDU format or tone plan having an SCS greater than or equal to 1.2 MHz. In some aspects, the TX processing chain 1200 may receive a PPDU 1201 that is formatted for transmission on a sub-7 GHz carrier frequency and may up-clock the PPDU 1201 to a wider bandwidth that is suitable for transmission on a carrier frequency above 7 GHz (such as in the 60 GHz or 45 GHz frequency bands). For example, the wider bandwidth is achieved by spreading out the subcarriers to which the PPDU 1201 is mapped. In some implementations, the TX processing chain 1200 may up-clock the PPDU 1201 so that the 1x SCS associated with the PPDU 1201 is greater than or equal to 1.2 MHz.

In some implementations, the PPDU 1201 may conform to a PPDU format defined by the IEEE 802.11ac amendment of the IEEE 802.11 standard (also referred to as an "11ac PPDU format"). For example, the PPDU 1201 may conform to an 11ac PPDU format associated with a 20 MHz, 40 MHz, 80 MHz, 80+80 MHz, or 160 MHz channel bandwidth (in a sub-7 GHz frequency band) and may be up-clocked for transmission over an 80 MHz, 160 MHz, 320 MHz, 480 MHz, 640 MHz, 960 MHz, 1.28 GHz, 1.92 GHz, or 2.56 GHz bandwidth wireless channel in the 60 GHz or 45 GHz frequency band. In some other implementations, the PPDU 1201 may conform to a PPDU format defined by the IEEE 802.11be (or flax) amendment of the IEEE 802.11 standard (also referred to as an "11be PPDU format"). For example, the PPDU 1201 may conform to an 11be PPDU format associated with a 20 MHz, 40 MHz, or 80 MHz channel bandwidth (in a sub-7 GHz frequency band) and may be up-clocked for transmission over an 80 MHz, 160 MHz, 320 MHz, 480 MHz, 640 MHz, 960 MHz, 1.28 GHz, 1.92 GHz, or 2.56 GHz bandwidth wireless channel in the 60 GHz or 45 GHz frequency band.

Figure 13A:
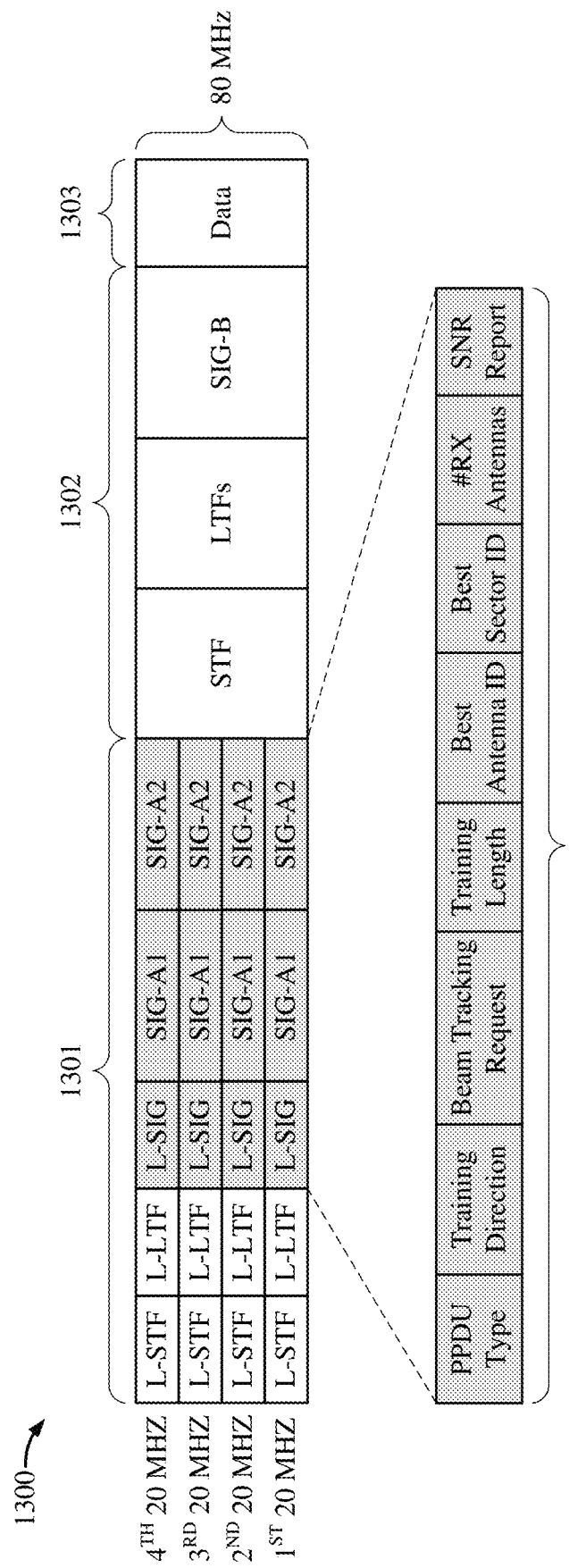
FIG. 13A shows an example PPDU formatted in accordance with a legacy PPDU format.

FIG. 13A shows an example PPDU 1300 formatted in accordance with a legacy PPDU format. In the example of FIG. 13A, the legacy PPDU format is an 11ac PPDU format associated with an 80 MHz channel bandwidth. The PPDU 1300 includes a PHY preamble, having a first portion 1301 and a second portion 1302, followed by a data portion 1303. The first preamble portion 1301 includes an L-STF, an L-LTF, an L-SIG, a first non-legacy signal field (SIG-A) spanning a first symbol (SIG-A1) and a second symbol (SIG-A2). The second preamble portion 1302 includes a non-legacy short training field (STF), one or more non-legacy long training fields (LTFs), and a second non-legacy signal field (SIG-B)

The IEEE 802.11ac amendment of the IEEE 802.11 standard defines the non-legacy fields SIG-A1, SIG-A2, STF, LTFs, and SIG-B as Very High Throughput (VHT) fields VHT-SIG-A1, VHT-SIG-A2, VHT-STF, VHT-LTFs, and VHT-SIG-B, respectively. In some implementations, the PPDU 1300 may be up-clocked as a DPHY PPDU for wireless communications on carrier frequencies above 7 GHz. In such implementations, one or more of the signal fields in the first portion 1301 may be repurposed to carry beam management information 1305. Example beam management information 1305 may include a PPDU type (indicating whether the PPDU 1300 is a regular PPDU or part of a sector sweep or beam refinement training process), a training direction (such as TX or RX), a beam tracking request (signaling a presence of TRNs at the end of the PPDU), a training length (indicating the total number of BFT packets or TRNs to be transmitted), a best antenna ID, a best sector ID, a number of RX antennas of the transmitting device, or an SNR report, among other examples. As shown in FIG. 13A, the first preamble portion 1301 is duplicated on four 20 MHz sub-bands spanning the 80 MHz bandwidth. According to the 11ac PPDU format, the first preamble portion 1301, the second preamble portion 1302, and the data portion 1303 are mapped to the same subcarriers.

Figure 13B:
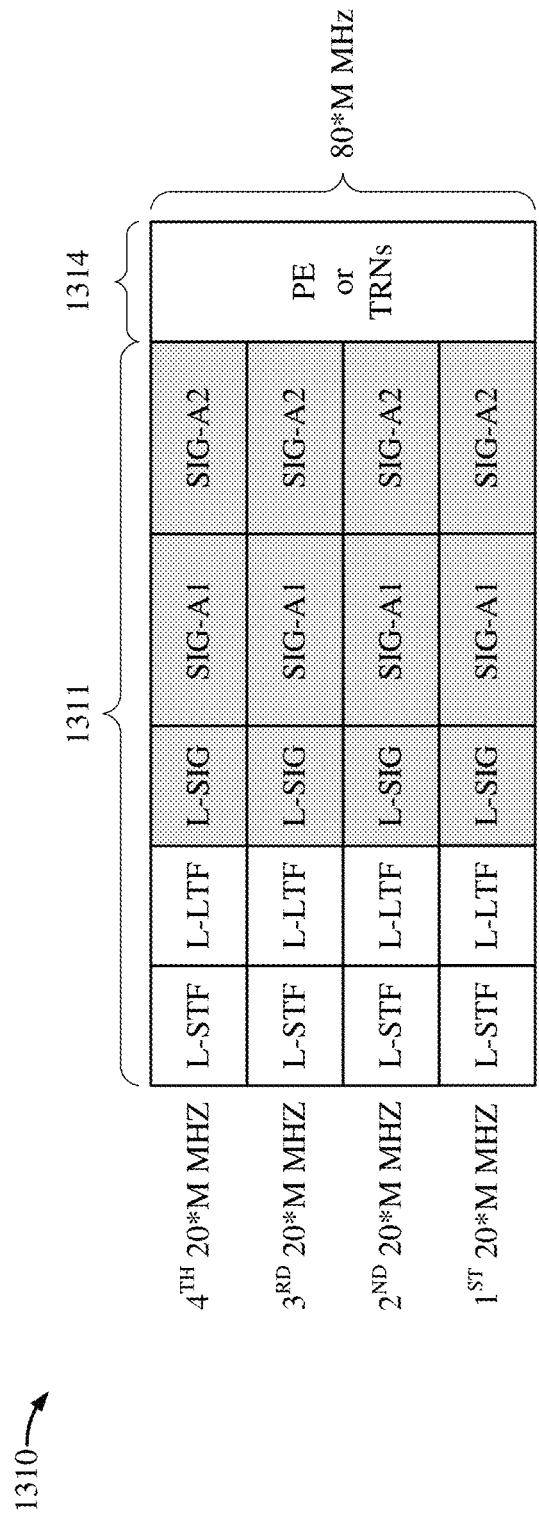
FIG. 13B shows an example up-clocked PPDU based on the PPDU format depicted in FIG. 13A, according to some implementations.

FIG. 13B shows an example up-clocked PPDU 1310 based on the PPDU format depicted in FIG. 13A, according to some implementations. The PPDU 1310 includes a PHY preamble 1311 followed by a packet extension (PE) or one or more TRNs 1314. In some aspects, the PPDU 1310 may represent an up-clocking of the PPDU 1300 by a factor of M. In such aspects, the PHY preamble 1311 may be one example of the first preamble portion 1301 of FIG. 13A.

In some implementations, the PPDU 1310 may be a DPHY PPDU that can used for various beamforming training procedures (such as any of the BFT packets of FIGS. 9A, 9B, and 10B or any of the PPDUs of FIG. 10C). In such implementations, beam management information may be carried in one or more of the signal fields L-SIG, SIG-A1, or SIG-A2. With reference for example to FIG. 13A, the data portion 1303 and the PHY preamble fields associated therewith (such as the second preamble portion 1302) can be omitted from the PPDU 1310 to reduce overhead. In some aspects, the up-clocking may be performed by the OFDM modulator 1220 of FIG. 12. For example, the OFDM modulator 1220 may up-clock the PPDU 1300 by a factor of M to produce the up-clocked PPDU 1310. As a result, the PE or TRNs 1314 are spread over an 80*M MHz bandwidth and the PHY preamble 1311 is duplicated on four 20*M MHz sub-bands spanning the 80*M MHz bandwidth.

Figure 13C:
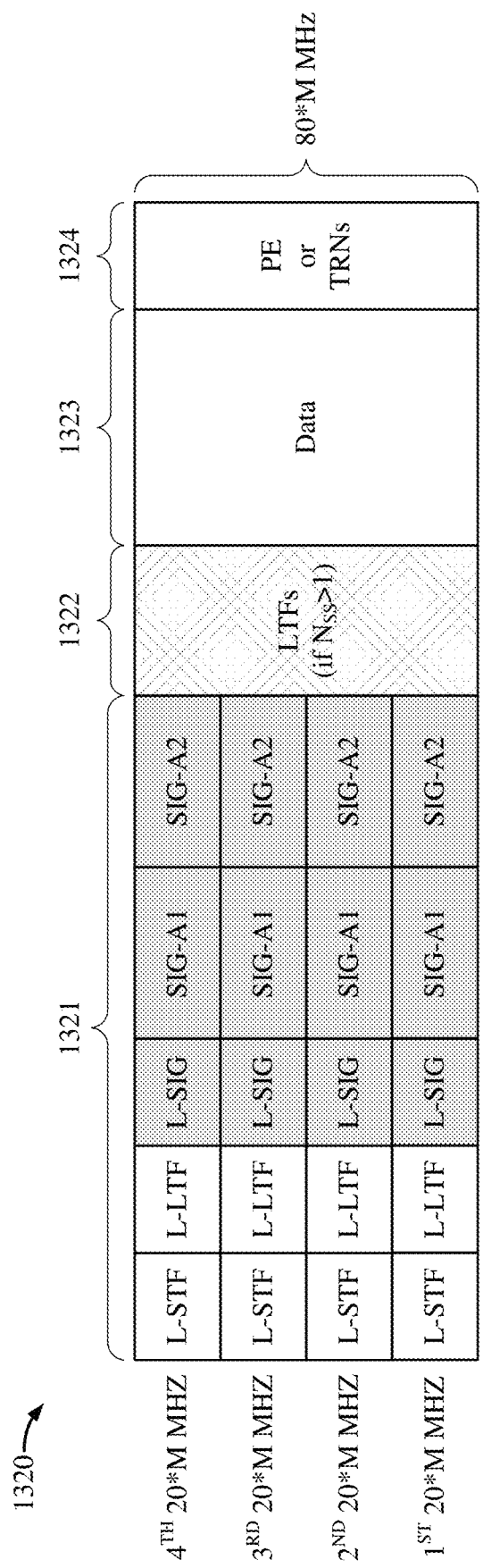
FIG. 13C shows another example up-clocked PPDU based on the PPDU format depicted in FIG. 13A, according to some implementations.

FIG. 13C shows another example up-clocked PPDU 1320 based on the PPDU format depicted in FIG. 13A, according to some implementations. The PPDU 1320 includes a PHY preamble 1321, a data portion 1323, and a PE or one or more TRNs 1324. In some aspects, the PPDU 1320 may represent an up-clocking of the PPDU 1300 by a factor of M. In such aspects, the PHY preamble 1321 and the data portion 1323 may be examples of the first preamble portion 1301 and the data portion 1303, respectively, of FIG. 13A.

In some implementations, the PPDU 1320 may be a DPHY PPDU that can be used for beam refinement (such as any of the PPDUs of FIGS. 10C and 11). In such implementations, beam management information may be carried in one or more of the signal fields L-SIG, SIG-A1, or SIG-A2, and the data portion 1323 may carry data intended for the receiving device (such as an AP or a STA). In some implementations, the second preamble portion 1302 of FIG. 13A may be omitted from the PPDU 1320. In some other implementations, the PPDU 1320 may further include one or more non-legacy LTFs 1322, for example, to support data transmissions over multiple spatial streams ($N_{SS}>1$). In some aspects, the up-clocking may be performed by the OFDM modulator 1220 of FIG. 12. For example, the OFDM modulator 1220 may up-clock the PPDU 1300 by a factor of M to produce the up-clocked PPDU 1320. As a result, the LTFs 1322 (if any), the data portion 1323, and the PE or TRNs 1324 are spread over an 80*M MHz bandwidth and the PHY preamble 1321 (not including the LTFs 1322) is duplicated on four 20*M MHz sub-bands spanning the 80*M MHz bandwidth.

Figure 14A:
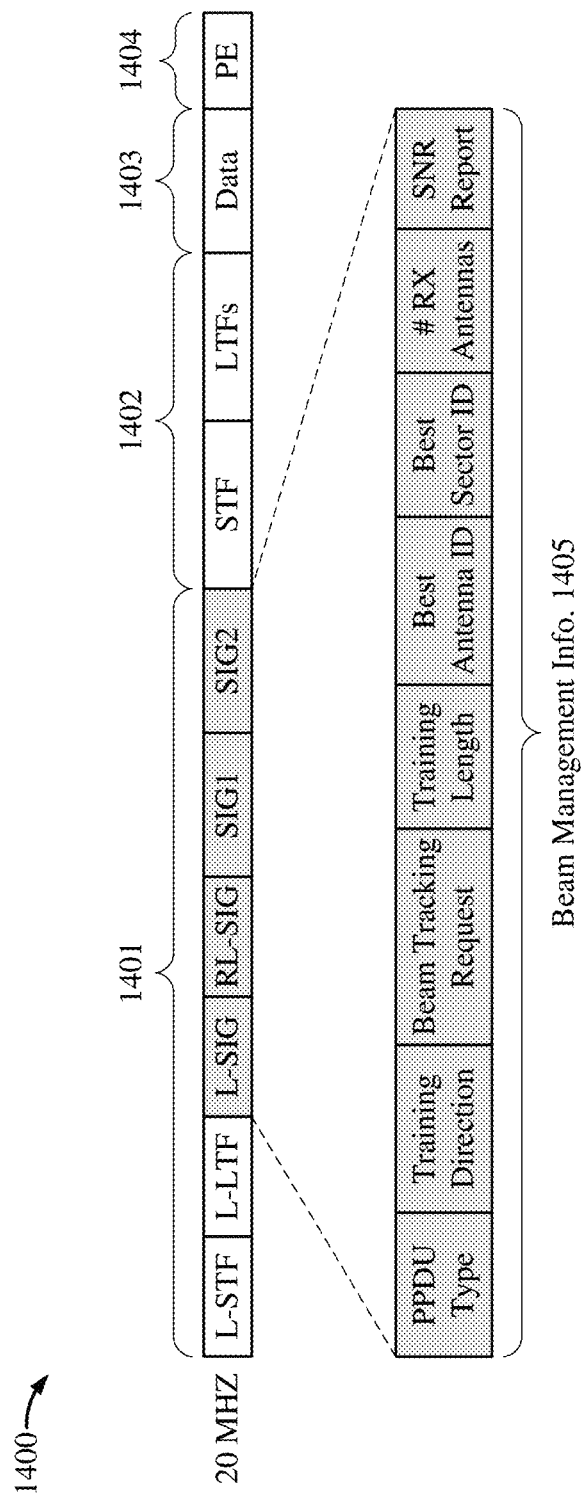
FIG. 14A shows an example PPDU formatted in accordance with a legacy PPDU format.

FIG. 14A shows an example PPDU 1400 formatted in accordance with a legacy PPDU format. In the example of FIG. 14A, the legacy PPDU format is an 11be PPDU format associated with a 20 MHz channel bandwidth. The PPDU 1400 includes a PHY preamble, having a first portion 1401 and a second portion 1402, followed by a data portion 1403 and a PE 1404. The first preamble portion 1401 includes an L-STF, an L-LTF, an L-SIG, an RL-SIG, a first non-legacy signal field (SIG1), and a second non-legacy signal field (SIG2). The second preamble portion 1402 includes a non-legacy short training field (STF) and one or more non-legacy long training fields (LTFs).

The IEEE 802.11be amendment of the IEEE 802.11 standard defines the first non-legacy signal field SIG1 as a universal signal field (U-SIG) and defines the remaining non-legacy fields SIG2, STF, and LTFs as Extremely High Throughput (EHT) fields EHT-SIG, EHT-STF, and EHT-LTFs, respectively. In some implementations, the PPDU 1400 may be up-clocked as a DPHY PPDU for wireless communications on carrier frequencies above 7 GHz. In such implementations, one or more of the signal fields in the first portion 1401 may be repurposed to carry beam management information 1405. Example beam management information 1305 may include a PPDU type, a training direction, a beam tracking request, a training length, a best antenna ID, a best sector ID, a number of RX antennas of the transmitting device, or an SNR report, among other examples. According to the 11be PPDU format, the data portion 1403 (and the PE 1404) is mapped to each contiguous data subcarrier associated with a 256-subcarrier tone plan (which includes 234 data subcarriers and 8 pilot subcarriers). In contrast, L-STF is mapped to every $4^{th}$ data subcarrier associated with a 64-subcarrier tone plan while the remainder of the first preamble portion 1401 is mapped to each contiguous data subcarrier associated with the 64-subcarrier tone plan. As such, the SCS associated with L-STF is 4× larger than the SCS associated with the data portion 1403.

Figure 14B:
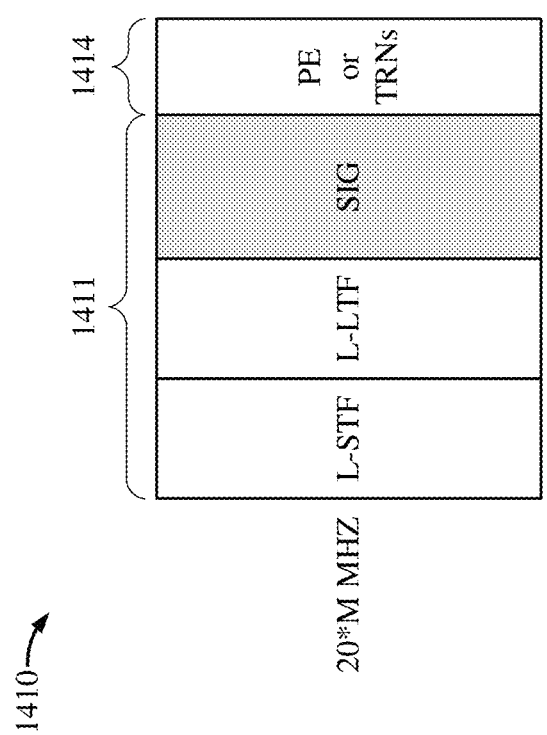
FIG. 14B shows an example up-clocked PPDU based on the PPDU format depicted in FIG. 14A, according to some implementations.

FIG. 14B shows an example up-clocked PPDU based on the PPDU format depicted in FIG. 14A, according to some implementations. The PPDU 1410 includes a PHY preamble 1411 followed by a PE or one or more TRNs 1414. In some aspects, the PPDU 1410 may represent an up-clocking of the PPDU 1400 by a factor of M. In such aspects, the PHY preamble 1411 and the PE or TRNs 1414 may be examples of the first preamble portion 1401 and the PE 1404, respectively, of FIG. 14A.

In some implementations, the PPDU 1410 may be a DPHY PPDU that can be used for various beamforming training procedures (such as any of the BFT packets of FIGS. 9A, 9B, and 10B or any of the PPDUs of FIG. 10C). In such implementations, the signal fields L-SIG, RL-SIG, SIG1, and SIG2 of FIG. 14A may be condensed or aggregated as a single DPHY signal field (SIG) in the PHY preamble 1411 for carrying beam management information. With reference for example to FIG. 14A, the data portion 1403 and the PHY preamble fields associated therewith (such as the second preamble portion 1402) can be omitted from the PPDU 1410 to reduce overhead. In some aspects, the up-clocking may be performed by the OFDM modulator 1220 of FIG. 12. For example, the OFDM modulator 1220 may up-clock the PPDU 1400 by a factor of M to produce the up-clocked PPDU 1410. As described with reference to FIG. 14A, the SCS associated with L-STF is 4× larger than the SCS associated with the PE 1404. In other words, the symbol duration associated with the PHY preamble 1411 is equal to ¼ the symbol duration associated with the PE or TRNs 1414. Thus, the PHY preamble 1411 may span a significantly shorter duration than the PHY preamble 1311 of FIG. 13B (given the same PPDU bandwidth).

Figure 14C:
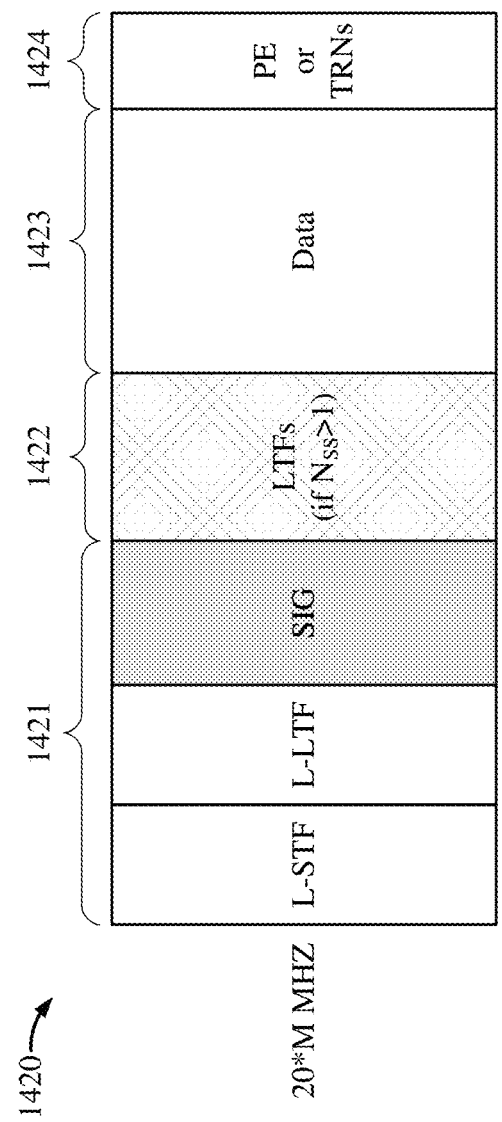
FIG. 14C shows another example up-clocked PPDU based on the PPDU format depicted in FIG. 14A, according to some implementations.

FIG. 14C shows another example up-clocked PPDU 1420 based on the PPDU format depicted in FIG. 14A, according to some implementations. The PPDU 1420 includes a PHY preamble 1421, a data portion 1423, and a PE or one or more TRNs 1424. In some aspects, the PPDU 1420 may represent an up-clocking of the PPDU 1400 by a factor of M. In such aspects, the PHY preamble 1421, the data portion 1423, and the PE or TRNs 1414 may be examples of the first preamble portion 1401, the data portion 1403, and the PE 1404, respectively, of FIG. 14A.

In some implementations, the PPDU 1410 may be a DPHY PPDU that can be used for beam refinement (such as any of the PPDUs of FIGS. 10C and 11). In such implementations, the signal fields L-SIG, RL-SIG, SIG1, and SIG2 of FIG. 14A may be condensed or aggregated as a single DPHY signal field (SIG) in the PHY preamble 1421 for carrying beam management information, and the data portion 1423 may carry data intended for the receiving device (such as an AP or a STA). In some implementations, the second preamble portion 1402 of FIG. 14A may be omitted from the PPDU 1420. In some other implementations, the PPDU 1420 may further include one or more non-legacy LTFs 1422, for example, to support data transmissions over multiple spatial streams ($N_{SS}>1$). In some aspects, the up-clocking may be performed by the OFDM modulator 1220 of FIG. 12. For example, the OFDM modulator 1220 may up-clock the PPDU 1400 by a factor of M to produce the up-clocked PPDU 1420. As described with reference to FIG. 14B, the PHY preamble 1421 may span a significantly shorter duration than the PHY preamble 1321 of FIG. 13C (given the same PPDU bandwidth).

Figure 15A:
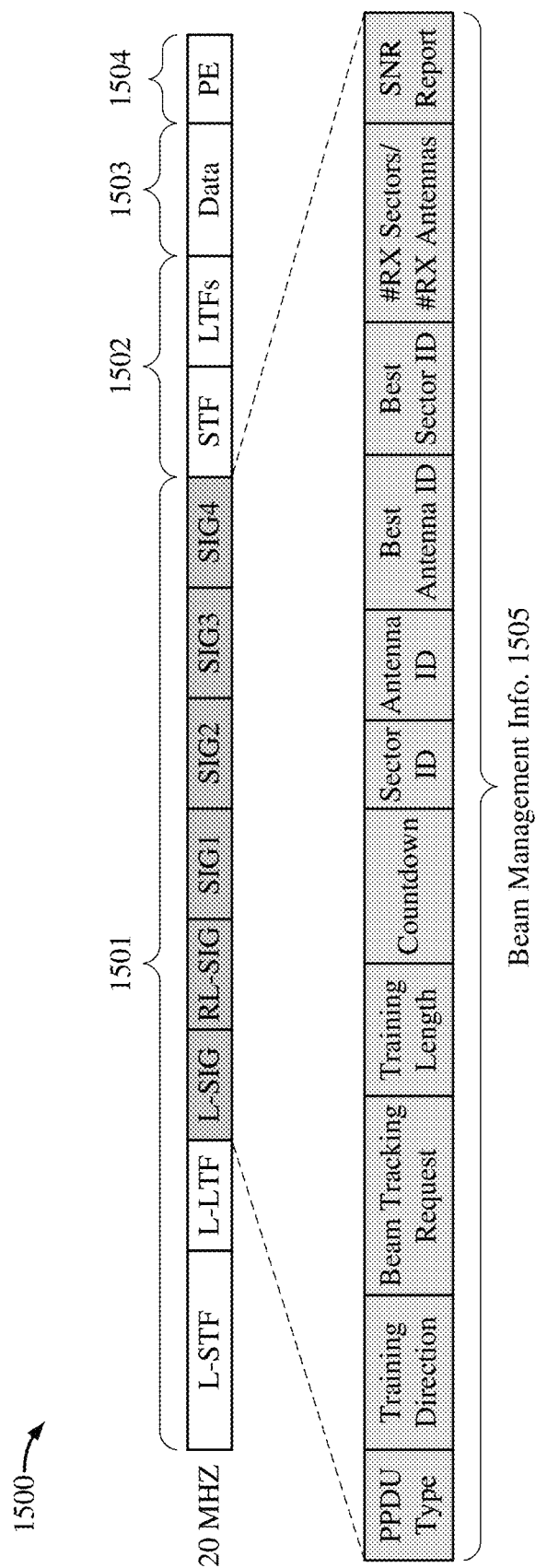
FIG. 15A shows an example PPDU formatted in accordance with a legacy PPDU format.

FIG. 15A shows an example PPDU 1500 formatted in accordance with a legacy PPDU format. In the example of FIG. 15A, the legacy PPDU format is an 11be PPDU format associated with a 20 MH channel bandwidth. More specifically, PPDU 1500 conforms to an extended range (ER) single-user (SU) PPDU format. The PPDU 1500 includes a PHY preamble, having a first portion 1501 and a second portion 1502, followed by a data portion 1503 and a PE 1504. The first preamble portion 1501 includes an L-STF, an L-LTF, an L-SIG, a repetition of L-SIG (RL-SIG), and four non-legacy signal fields (SIG1-SIG4). The second preamble portion 1502 includes a non-legacy short training field (STF) and one or more non-legacy long training fields (LTFs).

The IEEE 802.11be amendment of the IEEE 802.11 standard defines each of the non-legacy signal fields SIG1-SIG4 as a U-SIG and defines the remaining non-legacy fields STF and LTFs as EHT fields EHT-STF and EHT-LTFs, respectively. Further, the STF sequence associated with L-STF is repeated (2×) in the time domain to produce an "extended L-STF." In some implementations, the PPDU 1500 may be up-clocked as a CPHY PPDU for wireless communications on carrier frequencies above 7 GHz. In such implementations, one or more of the signal fields in the first portion 1501 may be repurposed to carry beam management information 1505. Example beam management information 1505 may include a PPDU type, a training direction, a beam tracking request, a training length, a countdown (indicating a number of remaining training signals to be transmitted), a sector ID, an antenna ID, a best antenna ID, a best sector ID, a number of RX sectors or RX antennas of the transmitting device, or an SNR report, among other examples. According to the 11be PPDU format, the data portion 1503 (and the PE 1504) is mapped to each contiguous data subcarrier associated with a 256-subcarrier tone plan. In contrast, L-STF is mapped to every 4th data subcarrier associated with a 64-subcarrier tone plan while the remainder of the first preamble portion 1501 is mapped to each contiguous data subcarrier associated with the 64-subcarrier tone plan. As such, the SCS associated with L-STF is 4× larger than the SCS associated with the data portion 1503.

Figure 15B:
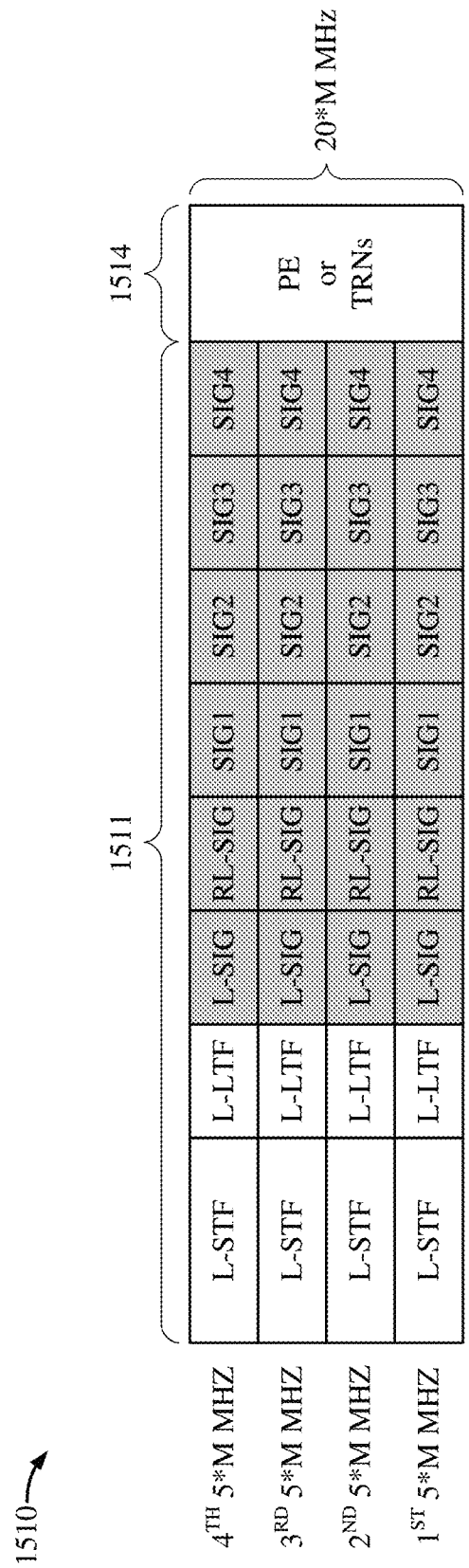
FIG. 15B shows an example up-clocked PPDU based on the PPDU format depicted in FIG. 15A, according to some implementations.

FIG. 15B shows an example up-clocked PPDU 1510 based on the PPDU format depicted in FIG. 15A, according to some implementations. The PPDU 1510 includes a PHY preamble 1511 followed by a PE or one or more TRNs 1514. In some aspects, the PPDU 1510 may represent an up-clocking of the PPDU 1500 by a factor of M. In such aspects, the PHY preamble 1511 and the PE or TRNs 1514 may be examples of the first preamble portion 1501 and the PE 1504, respectively, of FIG. 15A.

In some implementations, the PPDU 1510 may be a CPHY PPDU that can be used for various beamforming training procedures (such as any of the BFT packets of FIG. 10A and BRP-Rx with single element measurement). In such implementations, beam management information may be carried in one or more of the signal fields L-SIG, RL-SIG, or SIG1-SIG4. With reference for example to FIG. 15A, the data portion 1503 and the PHY preamble fields associated therewith (such as the second preamble portion 1502) can be omitted from the PPDU 1510 to reduce overhead. As described with reference to FIG. 15A, the SCS associated with L-STF is 4× larger than the SCS associated with the PE 1504. Thus, the first preamble portion 1501 can be up-clocked by a factor of M/4, and duplicated 4× in the frequency domain, to achieve the same SCS in L-STF as in the PE 1504. In some aspects, the up-clocking may be performed by the OFDM modulator 1220 of FIG. 12. In some implementations, the OFDM modulator 1220 may up-clock the first preamble portion 1501 by a factor of M/4 and may up-clock the remainder of the PPDU 1500 by a factor of M to produce the PPDU 1510. As a result, the PE or TRNs 1514 are spread over a 20*M MHz bandwidth and the PHY preamble 1511 is duplicated on four 5*M MHz sub-bands spanning the 20*M MHz bandwidth.

As described with reference to FIGS. 13A-15B, the overhead associated with beamforming training can be reduced by repurposing various fields of a PHY preamble to carry beam management information (and thus, omitting the data portion of the PPDU). Aspects of the present disclosure recognize that the overhead associated with beamforming training can be reduced even further by offloading, onto an anchor link, at least some of the signaling overhead associated with the beamforming training operation.

Figure 16:
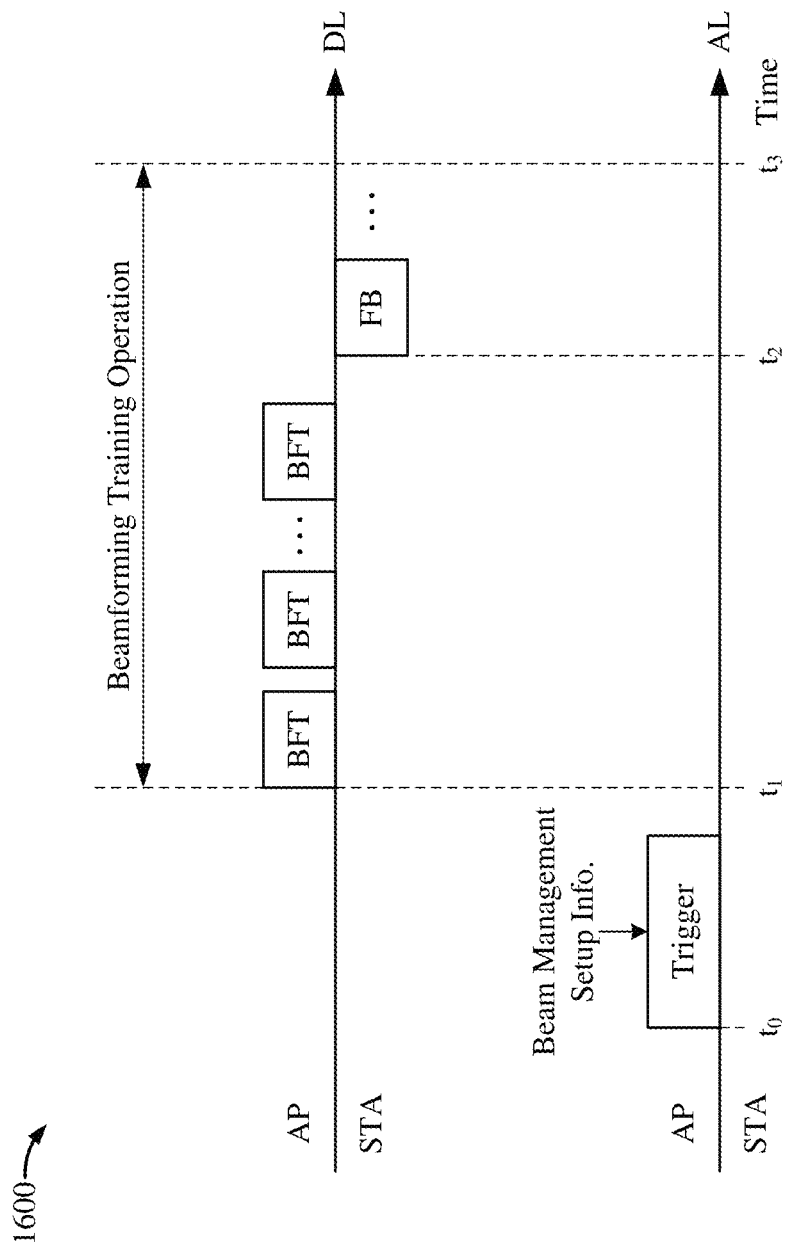
FIG. 16 shows a timing diagram depicting an example beamforming training operation between an AP and a STA over an anchor link and a directional link, according to some implementations.

FIG. 16 shows a timing diagram 1600 depicting an example beamforming training operation between an AP and a STA over an anchor link (AL) and a directional link (DL), according to some implementations. In some implementations, the AP may be one example of any of the APs 610 or 810 of FIGS. 6 and 8, respectively, or the AP MLD 710 of FIG. 7. In some implementations, the STA may be one example of any of the STAs 620 or 820 of FIGS. 6 and 8, respectively, or the non-AP MLD 720 of FIG. 7. With reference for example to FIGS. 7 and 8, the anchor link may be one example of any of the anchor links 702 or 802 and the directional link may be one example of any of the directional links 704 or 804.

At time $t_0$, the AP (as the beamforming initiator) transmits a trigger frame on the anchor link signaling the start of a beamforming training operation to be performed on the directional link. In some implementations, the trigger frame may carry beam management setup information indicating one or more control parameters associated with the beamforming training operation. In the example of FIG. 10, the beamforming training operation is scheduled to occur from times $t_1$ to $t_3$. In some aspects, the trigger frame may provide a timing reference for wireless communications on the directional link. For example, the STA knows that a beamforming training operation will be performed, on the directional link, within a threshold duration of receiving the trigger frame on the anchor link. As such, the STA may operate in a power save mode on the directional link until it receives the trigger frame from the AP.

In some implementations, the beam management setup information may include a subset of the beam management information that would otherwise be included in BFT packets transmitted during the beamforming training operation (such as any of the beam management information 1305, 1405, or 1505 of FIGS. 13A, 14A, and 15A, respectively). More specifically, the beam management setup information may include any information that is common to each of the BFT packets. Example beam management setup information may include, among other examples, a total number (N) of BFT packets to be transmitted by the AP, a number of TX and RX antennas or sectors associated with the AP, or a total number (K) of BFT packets allowed to be transmitted by the STA.

At time $t_1$, the AP initiates the beamforming training operation by transmitting N BFT packets in various TX beam directions on the directional link (such as described with reference to FIG. 9A or 10A). More specifically, at least one BFT packet may be transmitted by each TX sector associated with the AP (such as the TX sectors T1-T7 of FIG. 6). In some implementations, each of the BFT packets may carry beam management information that can be used to train the TX or RX sectors of the AP. More specifically, the beam management information may include any information not already signaled via the trigger frame. Example beam management information may include a PPDU type, a training direction (TX or RX), a beam tracking request, a number (L) of remaining BFT packets to be transmitted, a sector ID, or an antenna ID, among other examples. Thus, transmitting a trigger frame on the anchor link further reduces the overhead associated with each of the BFT packets.

The STA receives one or more of the BFT packets and compares the signal powers of the received BFT packets. At time $t_2$, the STA provides feedback (FB) on the directional link indicating which of the BFT packets has the highest received signal power. For example, the feedback may include a best sector ID, a best antenna ID, or an SNR report, among other examples. In some implementations, the STA may further train its RX antennas for RX beamforming based on the BFT packets transmitted by the AP between times $t_1$ and $t_2$ (such as described with reference to FIG. 9A). In some other implementations, the STA may perform additional packet exchanges with the AP, between times $t_2$ and $t_3$, to train its RX antennas (such as described with reference to FIG. 10B or 10C). In some aspects, the AP may train its RX antennas for RX beamforming based on the additional packet exchanges (such as described with reference to FIG. 9B, 10B, or 10C). In some other aspects, the STA may train its TX antennas for TX beamforming based on the additional packet exchanges (such as described with reference to FIG. 9B or 10A).

As described with reference to FIG. 16, the trigger frame transmitted on the anchor link (at time $t_0$) may provide a timing reference for communications on the directional link.

In some implementations, the trigger frame may further provide a frequency reference for the communications on the directional link. In such implementations, the same local oscillator of the AP may drive the carrier frequencies used for wireless communications by the AP on each of the anchor link and the directional link, and the same local oscillator of the STA may drive the carrier frequencies used for wireless communications by the STA on each of the anchor link and the directional link. As a result, the STA may estimate the CFO on the anchor link based on the trigger frame received at time to and may use the CFO estimate associated with the anchor link to narrow the range of possible CFO estimates for the directional link (such as to within a few kilohertz). As such, the anchor link and the directional link are "synchronized in frequency."

In some implementations, the AP may include a clock that controls a timing of wireless communications by the AP on the directional link and the anchor link, and the STA may include a clock that controls a timing of wireless communications by the STA on the directional link and the anchor link. For example, the same clock may control the times at which the trigger frame is transmitted on the anchor link and the times at which the BFT packets are transmitted on the directional link. As such, the anchor link and the directional link are "synchronized in time." In some aspects, the anchor link and the directional link may be synchronized in both time and frequency. In such aspects, a receiving device can determine the timing and CFO associated with BFT packets transmitted on the directional link based on the timing and CFO associated with the trigger frame transmitted on the anchor link. As a result, the BFT packets can carry significantly less overhead than BFT packets otherwise transmitted without a timing and frequency reference on the anchor link.

Figure 17A:
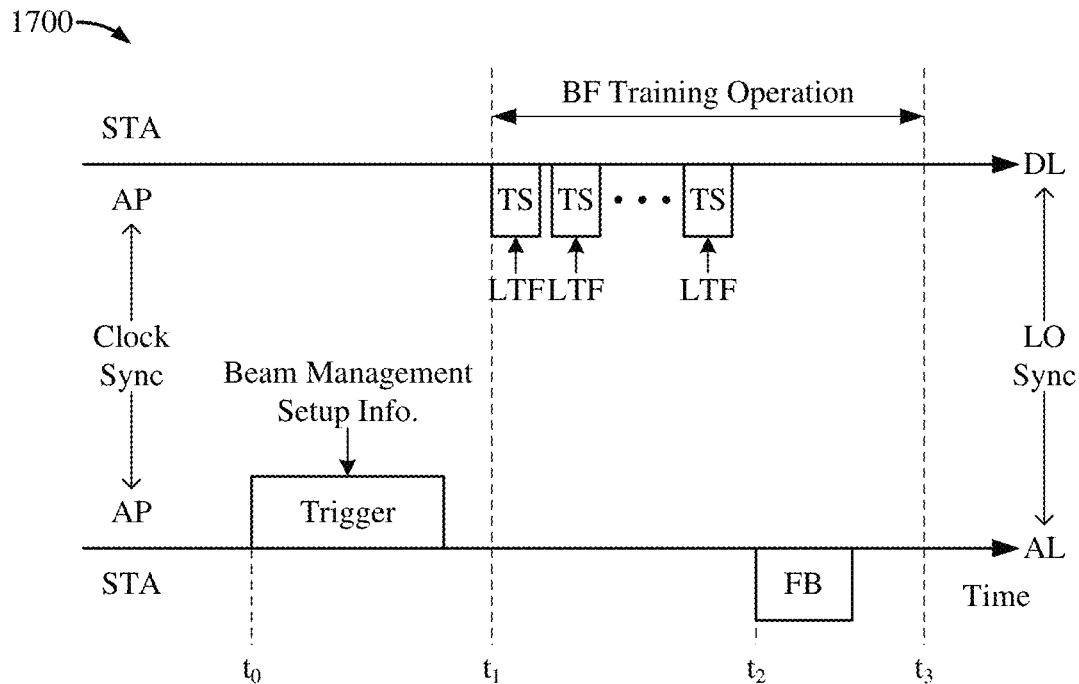
FIG. 17A shows a timing diagram depicting an example beamforming training operation between an AP and a STA over an anchor link and a directional link, according to some implementations.

FIG. 17A shows a timing diagram 1700 depicting an example beamforming training operation between an AP and a STA over an anchor link (AL) and a directional link (DL), according to some implementations. In some implementations, the AP may be one example of any of the APs 610 or 810 of FIGS. 6 and 8, respectively, or the AP MLD 710 of FIG. 7. In some implementations, the STA may be one example of any of the STAs 620 or 820 of FIGS. 6 and 8, respectively, or the non-AP MLD 720 of FIG. 7. With reference for example to FIGS. 7 and 8, the anchor link may be one example of any of the anchor links 702 or 802 and the directional link may be one example of any of the directional links 704 or 804.

In the example of FIG. 17A, the directional link and the anchor link are synchronized in both time and frequency. In other words, the same local oscillator drives the carrier frequencies used for wireless communications by the AP on each of the anchor link and the directional link and the same clock controls the timing of wireless communications by the AP on each of the anchor link and the directional link. Similarly, the same local oscillator drives the carrier frequencies used for wireless communications by the STA on each of the anchor link and the directional link and the same clock controls the timing of wireless communications by the STA on each of the anchor link and the directional link.

At time to, the AP (as the beamforming initiator) transmits a trigger frame on the anchor link signaling the start of a beamforming training operation to be performed on the directional link. In the example of FIG. 17A, the beamforming training operation is scheduled to occur from times $t_1$ to $t_3$. In some implementations, the trigger frame may carry beam management setup information indicating one or more parameters associated with the beamforming training operation. For example, the beam management setup information may include a subset of the beam management information that would otherwise be included in BFT packets transmitted during the beamforming training operation (such as any of the beam management information 1305, 1405, or 1505 of FIGS. 13A, 14A, and 15A, respectively). More specifically, the beam management setup information may include any information that is common to each of the BFT packets. Example beam management setup information may include, among other examples, a total number (N) of BFT packets to be transmitted by the AP, a number of TX and RX antennas or sectors associated with the AP, or a total number (K) of BFT packets allowed to be transmitted by the STA.

In some aspects, the trigger frame may further provide a timing and frequency reference for wireless communications on the directional link. For example, the beam management setup information may include timing and frequency information indicating a timing of wireless communications on the directional link and a CFO associated therewith. In other words, the STA knows that a beamforming training operation will be performed on the directional link at time $t_1$ based on the timing information included in or derived from receiving the trigger frame. Further, the STA may estimate a CFO associated with wireless communications on the directional link based on the frequency information included in the trigger frame (such as an L-STF). Accordingly, L-STF can be omitted from each BFT packet transmitted on the directional link due to the beam management setup information carried in the trigger frame. In the example of FIG. 17A, each of the BFT packets is depicted as a short training sequence (TS).

At time $t_1$, the AP initiates the beamforming training operation by transmitting N training sequences in various TX beam directions on the directional link (such as described with reference to FIG. 9A or 10A). More specifically, at least one training sequence may be transmitted by each TX sector associated with the AP (such as the TX sectors T1-T7 of FIG. 6). In some aspects, the STA may determine the sector IDs (of the AP) from which the training sequences are transmitted based on the trigger frame received on the anchor link (at time $t_0$) and a timing of each training sequence (such as indicated by a timestamp). In some other aspects, each of the training sequences may carry beam management information explicitly signaling one or more training parameters. More specifically, the beam management information may include any information not already signaled via the trigger frame. In some implementations, each of the training sequences may consist of a single LTF (such as a non-legacy LTF) designed to indicate one or more beam management parameters (such as a sector ID). In some other implementations, each of the training sequences may consist of an LTF and a signal field (such as a non-legacy SIG) to carry additional beam management information (such as a training direction, a beam tracking request, sector ID, a number (L) of remaining training sequences to be transmitted, or an antenna ID).

The STA receives one or more of the training sequences and compares the signal powers of the received training sequences. At time $t_2$, the STA provides feedback (FB) on the anchor link indicating which of the training sequences has the highest received signal power. For example, the feedback may include a best sector ID, a best antenna ID, or an SNR report, among other examples. In some implementations, the STA may further train its RX antennas for RX beamforming based on the training sequences transmitted by the AP between times $t_1$ to $t_2$ (such as described with reference to FIG. 9A). In some other implementations, the STA may perform additional packet exchanges with the AP, between times $t_2$ and $t_3$, to train its RX antennas (such as described with reference to FIG. 10B or 10C). In some aspects, the AP may train its RX antennas for RX beamforming based on the additional packet exchanges (such as described with reference to FIG. 9B, 10B, or 10C). In some other aspects, the STA may train its TX antennas for TX beamforming based on the additional packet exchanges (such as described with reference to FIG. 9B or 10A).

Figure 17B:
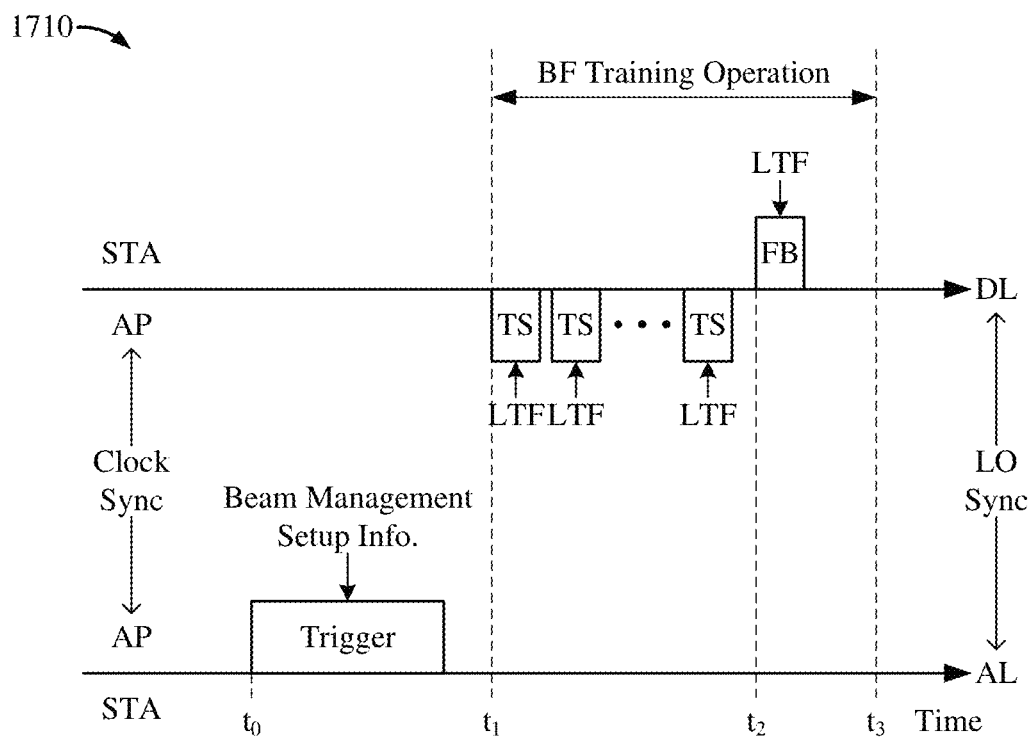
FIG. 17B shows another timing diagram depicting an example beamforming training operation between an AP and a STA over an anchor link and a directional link, according to some implementations.

FIG. 17B shows another timing diagram 1710 depicting an example beamforming training operation between an AP and a STA over an anchor link (AL) and a directional link (DL), according to some implementations. In some implementations, the AP may be one example of any of the APs 610 or 810 of FIGS. 6 and 8, respectively, or the AP MLD 710 of FIG. 7. In some implementations, the STA may be one example of any of the STAs 620 or 820 of FIGS. 6 and 8, respectively, or the non-AP MLD 720 of FIG. 7. With reference for example to FIGS. 7 and 8, the anchor link may be one example of any of the anchor links 702 or 802 and the directional link may be one example of any of the directional links 704 or 804.

In the example of FIG. 17B, the directional link and the anchor link are synchronized in both time and frequency. In other words, the same local oscillator drives the carrier frequencies used for wireless communications by the AP on each of the anchor link and the directional link and the same clock controls the timing of wireless communications by the AP on each of the anchor link and the directional link. Similarly, the same local oscillator drives the carrier frequencies used for wireless communications by the STA on each of the anchor link and the directional link and the same clock controls the timing of wireless communications by the STA on each of the anchor link and the directional link.

At time to, the AP (as the beamforming initiator) transmits a trigger frame on the anchor link signaling the start of a beamforming training operation to be performed on the directional link. In the example of FIG. 17B, the beamforming training operation is scheduled to occur from times $t_1$ to $t_3$. In some implementations, the trigger frame may carry beam management setup information indicating one or more parameters associated with the beamforming training operation. For example, the beam management setup information may include a subset of the beam management information that would otherwise be included in BFT packets transmitted during the beamforming training operation (such as any of the beam management information 1305, 1405, or 1505 of FIGS. 13A, 14A, and 15A, respectively). More specifically, the beam management setup information may include any information that is common to each of the BFT packets. Example beam management setup information may include, among other examples, a total number (N) of BFT packets to be transmitted by the AP, a number of TX and RX antennas or sectors associated with the AP, or a total number (K) of BFT packets allowed to be transmitted by the STA.

In some aspects, the trigger frame may further provide a timing and frequency reference for wireless communications on the directional link. For example, the beam management setup information may include timing and frequency information indicating a timing of wireless communications on the directional link and a CFO associated therewith. In other words, the STA knows that a beamforming training operation will be performed on the directional link at time $t_1$ based on the timing information included in or derived from receiving the trigger frame. Further, the STA may estimate a CFO associated with wireless communications on the directional link based on the frequency information included in the trigger frame (such as an L-STF). Accordingly, L-STF can be absent from each BFT packet transmitted on the directional link due to the beam management setup information carried in the trigger frame. In the example of FIG. 17A, each of the BFT packets is depicted as a short training sequence (TS).

At time $t_1$, the AP initiates the beamforming training operation by transmitting N training sequences in various TX beam directions on the directional link (such as described with reference to FIGS. 9A and 10A). More specifically, at least one training sequence may be transmitted by each TX sector associated with the AP (such as the TX sectors T1-T7 of FIG. 6). In some aspects, the STA may determine the sector IDs (of the AP) from which the training sequences are transmitted based on the trigger frame received on the anchor link (at time $t_0$) and a timing of each training sequence (such as indicated by a timestamp). In some other aspects, each of the training sequences may carry beam management information explicitly signaling one or more training parameters. More specifically, the beam management information may include any information not already signaled via the trigger frame. In some implementations, each of the training sequences may consist of a single LTF (such as a non-legacy LTF) designed to indicate one or more beam management parameters (such as a sector ID). In some other implementations, each of the training sequences may consist of an LTF and a signal field (such as a non-legacy SIG) to carry additional beam management information (such as a training direction, a beam tracking request, sector ID, a number (L) of remaining training sequences to be transmitted, or an antenna ID).

The STA receives one or more of the training sequences and compares the signal powers of the received training sequences. At time $t_2$, the STA provides feedback (FB) on the directional link indicating which of the training sequences has the highest received signal power. In some implementations, the feedback may consist of a single LTF (such as a non-legacy LTF) designed to indicate the best sector ID. In some other implementations, the feedback may consist of an LTF and a signal field (such as a non-legacy SIG) to carry additional information, such as a best antenna ID or an SNR report. In some implementations, the STA may further train its RX antennas for RX beamforming based on the training sequences transmitted by the AP between times $t_1$ to $t_2$ (such as described with reference to FIG. 9A). In some other implementations, the STA may perform additional packet exchanges with the AP, between times $t_2$ and $t_3$, to train its RX antennas (such as described with reference to FIG. 10B or 10C). In some aspects, the AP may train its RX antennas for RX beamforming based on the additional packet exchanges (such as described with reference to FIG. 9B, 10B, or 10C). In some other aspects, the STA may train its TX antennas for TX beamforming based on the additional packet exchanges (such as described with reference to FIG. 9B or 10A).

Figure 18:
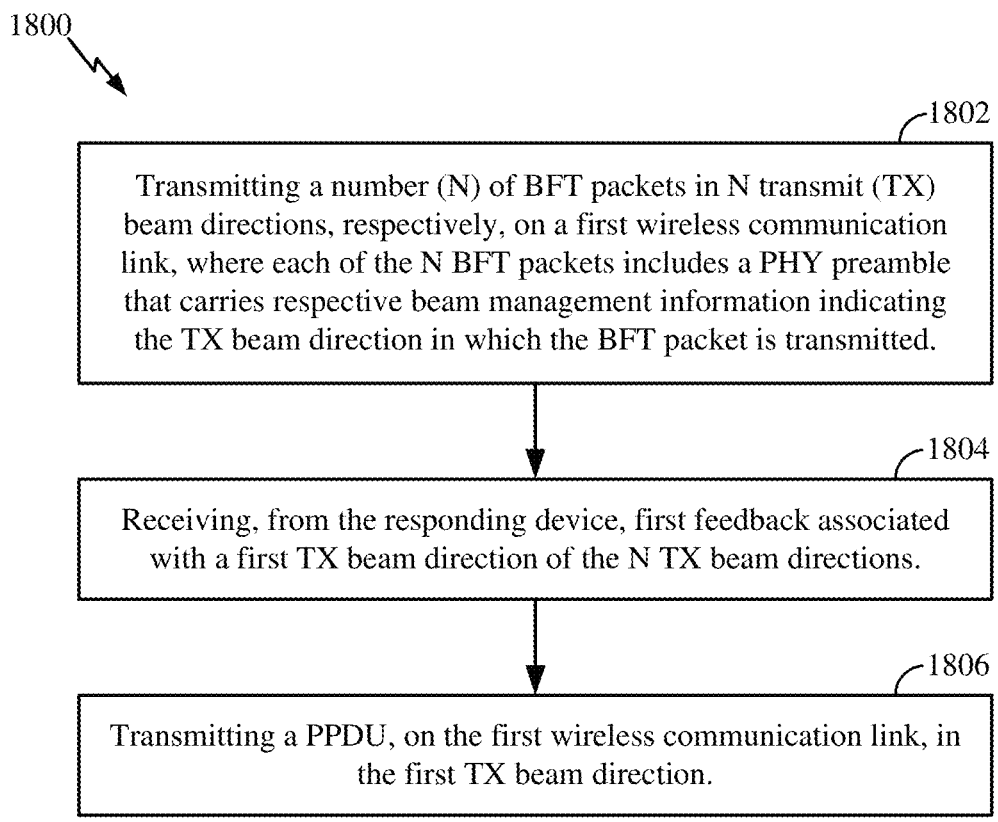
FIG. 18 shows a flowchart illustrating an example process for wireless communication that supports 60 GHz beam management for wireless local area networks (WLANs).

FIG. 18 shows a flowchart illustrating an example process 1800 for wireless communication that supports 60 GHz beam management for WLANs. In some implementations, the process 1800 may be performed by a wireless communication device operating as or within an AP, such as any one of the APs 102 or 502 described above with reference to FIGS. 1 and 5A, respectively. In some other implementations, the process 1800 may be performed by a wireless communication device operating as or within a STA, such as any one of the STAs 104 or 504 described above with reference to FIGS. 1 and 5B, respectively.

In some implementations, the process 1800 begins in block 1802 with transmitting a number (N) of BFT packets in N TX beam directions, respectively, on a first wireless communication link, where each of the N BFT packets includes a PHY preamble that carries respective beam management information indicating the TX beam direction in which the BFT packet is transmitted. In block 1804, the process 1800 proceeds with receiving, from the responding device, first feedback associated with a first TX beam direction of the N TX beam directions. In block 1806, the process 1800 proceeds with transmitting a PPDU, on the first wireless communication link, in the first TX beam direction.

In some aspects, the process 1800 may further include associating with the responding device over a second wireless communication link, where the N BFT packets are transmitted on the first wireless communication link based on associating with the responding device over the second wireless communication. In some implementations, the first wireless communication link may operate at a carrier frequency above 7 GHz and the second wireless communication link may operate at a carrier frequency below 7 GHz.

In some implementations, each of the N BFT packets may consist of only the PHY preamble. In some implementations, the beam management information may include at least one of a PPDU type, a training direction, a beam tracking request, the number N of BFT packets, a number of the BFT packets remaining to be transmitted, a TX sector ID or TX antenna ID associated with the TX beam direction in which the BFT packet is transmitted, or a number of RX sectors or RX antennas associated with the wireless communication device. In some aspects, the first feedback may be carried in a PHY preamble of a PPDU. In some implementations, the first feedback may include the TX sector ID or the TX antenna ID indicated by the BFT packet transmitted in the first TX beam direction, an SNR report, or a number of RX sectors or RX antennas associated with the responding device.

In some aspects, the process 1800 may further include retransmitting the N BFT packets in the N TX beam directions, respectively, on the first wireless communication link based on a number (M) of RX sectors associated with the responding device. In such aspects, each of the N BFT packets may be transmitted M times in the respective TX beam direction. In some aspects, the process 1800 may further include receiving, on the first wireless communication link, a number (K) of BFT packets each carrying beam management information indicating a respective beam direction associated with the received BFT packet; measuring a signal power of each of the K received BFT packets; and transmitting, to the responding device, second feedback associated with the received BFT packet having the highest signal power among the measured signal powers. In such aspects, the first feedback may be carried in the K received BFT packets.

In some aspects, the process 1800 may further include receiving one or more training signals on the first wireless communication link, where each of the one or more training signals is received via a plurality of antennas tuned in a respective RX beam direction; measuring a power of each of the L received training signals; and receiving a PPDU from the responding device via the plurality of antennas tuned in the RX beam direction in which the training signal having the highest signal power, among the measured signal powers, is received. In some implementations, each of the plurality of training signals may represent a respective PPDU. In some other implementations, each of the plurality of training signals may represent a respective TRN of the same PPDU.

Figure 19:
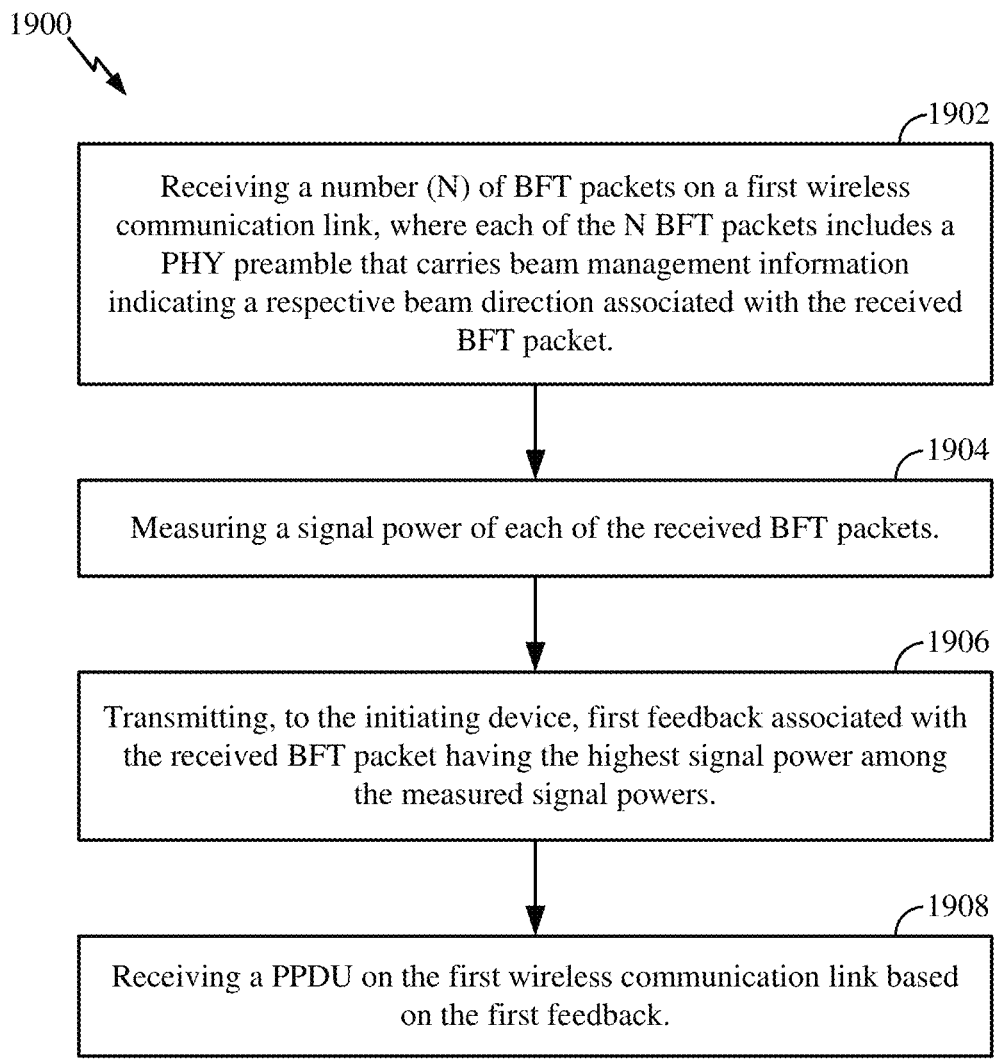
FIG. 19 shows a flowchart illustrating an example process for wireless communication that supports 60 GHz beam management for WLANs.

FIG. 19 shows a flowchart illustrating an example process 1900 for wireless communication that supports 60 GHz beam management for WLANs. In some implementations, the process 1900 may be performed by a wireless communication device operating as or within an AP, such as any one of the APs 102 or 502 described above with reference to FIGS. 1 and 5A, respectively. In some other implementations, the process 1900 may be performed by a wireless communication device operating as or within a STA, such as any one of the STAs 104 or 504 described above with reference to FIGS. 1 and 5B, respectively.

In some implementations, the process 1900 begins in block 1902 with receiving a number (N) of BFT packets on a first wireless communication link, where each of the N BFT packets includes a PHY preamble that carries beam management information indicating a respective beam direction associated with the received BFT packet. In block 1904, the process 1900 proceeds with measuring a signal power of each of the received BFT packets. In block 1906, the process 1900 proceeds with transmitting, to the initiating device, first feedback associated with the received BFT packet having the highest signal power among the measured signal powers. In block 1908, the process 1900 proceeds receiving a PPDU on the first wireless communication link based on the first feedback.

In some aspects, the process 1900 may further include associating with the initiating device over a second wireless communication link, where the N BFT packets are received on the first wireless communication link based on associating with the initiating device over the second wireless communication link. In some implementations, the first wireless communication link may operate at a carrier frequency above 7 GHz and the second wireless communication link may operate at a carrier frequency below 7 GHz.

In some implementations, each of the N BFT packets may consist of only the PHY preamble. In some implementations, the beam management information may include at least one of a PPDU type, a training direction, a beam tracking request, a number of BFT packets being transmitted by the initiating device, a number of the BFT packets remaining to be transmitted, a TX sector ID or TX antenna ID associated with the beam direction, or a number of RX sectors or RX antennas associated with the initiating device. In some aspects, the first feedback may be carried in a PHY preamble of a PPDU. In some implementations, the first feedback may include the TX sector ID or the TX antenna ID indicated by the received BFT packet having the highest signal power, an SNR report, or a number of RX sectors or RX antennas associated with the wireless communication device.

In some aspects, the N BFT packets may be received via a plurality of antennas tuned in a number (M) of RX beam directions. In some implementations, at least one of the N BFT packets is received multiple times based on tuning the plurality of antennas in multiple RX beam directions, respectively, of the M RX beam directions. In some aspects, the process 1900 may further include transmitting a number (K) of BFT packets in K TX beam directions, respectively, on the first wireless communication link; receiving, from the initiating device, second feedback associated with a first TX beam direction of the K TX beam directions; and transmitting a PPDU, on the first wireless communication link, in the first TX beam direction. In some implementations, the first feedback may be carried in the K transmitted BFT packets.

In some aspects, the process 1900 may further include receiving one or more training signals on the first wireless communication link, where each of the one or more training signals is received via a plurality of antennas tuned in a respective RX beam direction; measuring a signal power of each of the one or more received training signals; and receiving a PPDU from the initiating device via the plurality of antennas tuned in the RX beam direction in which the training signal having the highest signal power, among the measured signal powers, is received. In some implementations, each of the plurality of training signals may represent a respective PPDU. In some other implementations, each of the plurality of training signals may represent a respective TRN of the same PPDU.

Figure 20:
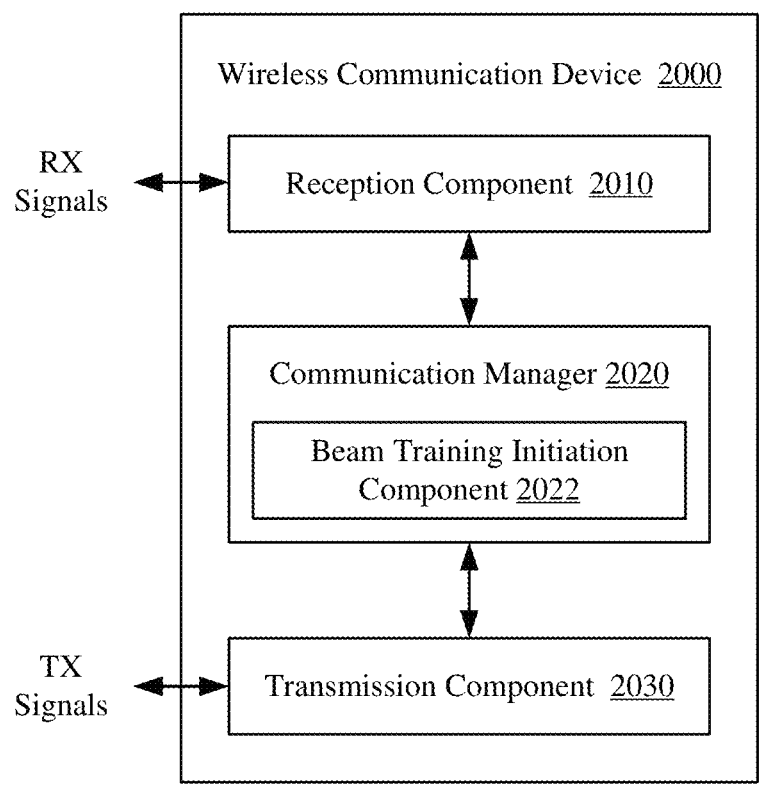
FIG. 20 shows a block diagram of an example wireless communication device according to some implementations.

FIG. 20 shows a block diagram of an example wireless communication device 2000 according to some implementations. In some implementations, the wireless communication device 2000 is configured to perform the process 1800 described above with reference to FIG. 18. The wireless communication device 2000 can be an example implementation of the wireless communication device 400 described above with reference to FIG. 4. For example, the wireless communication device 2000 can be a chip, SoC, chipset, package or device that includes at least one processor and at least one modem (for example, a Wi-Fi (IEEE 802.11) modem or a cellular modem).

The wireless communication device 2000 includes a reception component 2010, a communication manager 2020, and a transmission component 2030. The communication manager 2020 further includes a beam training initiation component 2022. Portions of the beam training initiation component 2022 may be implemented at least in part in hardware or firmware. In some aspects, the beam training initiation component 2022 is implemented at least in part as software stored in a memory (such as the memory 408). For example, portions of the beam training initiation component 2022 can be implemented as non-transitory instructions (or "code") executable by a processor (such as the processor 406) to perform the functions or operations of the respective component.

The reception component 2010 is configured to receive RX signals, over a wireless channel, from one or more other wireless communication devices. The transmission component 2030 is configured to transmit TX signals, over a wireless channel, to one or more other wireless communication devices. The communication manager 2020 is configured to control or manage communications with one or more other wireless communication devices. In some implementations, the beam training initiation component 2022 may transmit a number (N) of BFT packets in N TX beam directions, respectively, on a first wireless communication link, where each of the N BFT packets includes a PHY preamble that carries respective beam management information indicating the TX beam direction in which the BFT packet is transmitted. In some implementations, the reception component 2010 may receive, from the responding device, feedback associated with a first TX beam direction of the N TX beam directions. In some implementations, the transmission component 2030 may transmit a PPDU, on the first wireless communication link, in the first TX beam direction.

Figure 21:
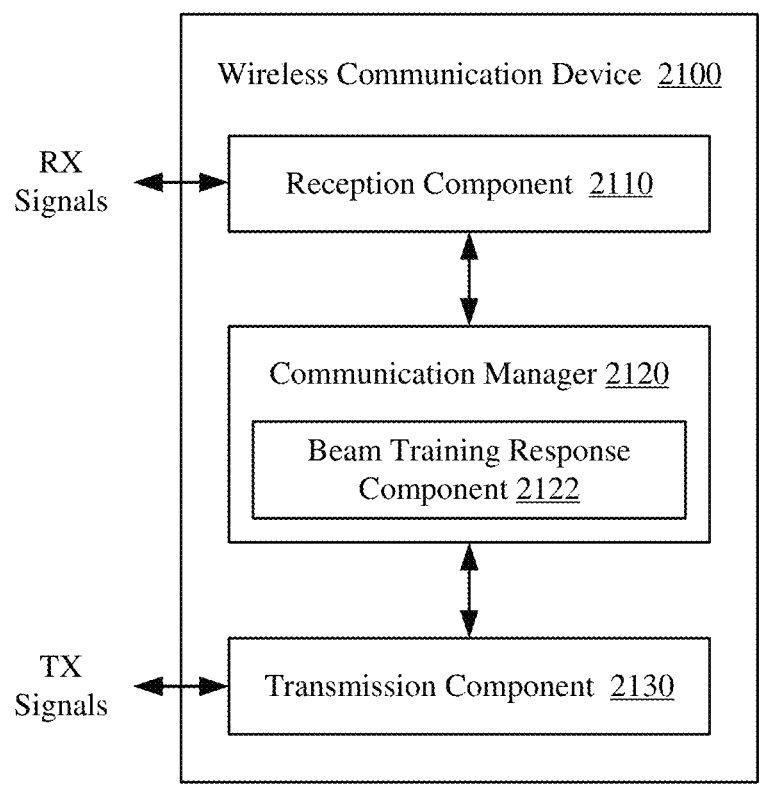
FIG. 21 shows a block diagram of an example wireless communication device according to some implementations.

FIG. 21 shows a block diagram of an example wireless communication device 2100 according to some implementations. In some implementations, the wireless communication device 2100 is configured to perform the process 1900 described above with reference to FIG. 19. The wireless communication device 2100 can be an example implementation of the wireless communication device 400 described above with reference to FIG. 4. For example, the wireless communication device 2100 can be a chip, SoC, chipset, package or device that includes at least one processor and at least one modem (for example, a Wi-Fi (IEEE 802.11) modem or a cellular modem).

The wireless communication device 2100 includes a reception component 2110, a communication manager 2120, and a transmission component 2130. The communication manager 2120 further includes a beam training response component 2122. Portions of the beam training response component 2122 may be implemented at least in part in hardware or firmware. In some aspects, the beam training response component 2122 is implemented at least in part as software stored in a memory (such as the memory 408). For example, portions of the beam training response component 2122 can be implemented as non-transitory instructions (or "code") executable by a processor (such as the processor 406) to perform the functions or operations of the respective component.

The reception component 2110 is configured to receive RX signals, over a wireless channel, from one or more other wireless communication devices. The transmission component 2130 is configured to transmit TX signals, over a wireless channel, to one or more other wireless communication devices. The communication manager 2120 is configured to control or manage communications with one or more other wireless communication devices. In some implementations, the beam training response component 2122 may receive a number (N) of BFT packets on a first wireless communication link and may measure a signal power of each of the received BFT packets, where each of the N BFT packets includes a PHY preamble that carries beam management information indicating a respective beam direction associated with the received BFT packet. In some implementations, the transmission component 2130 may transmit, to the initiating device, feedback associated with the received BFT packet having the highest signal power among the measured signal powers. In some implementations, the reception component 2110 may receive a PPDU on the first wireless communication link based on the first feedback.

Implementation examples are described in the following numbered clauses:

1. A method for wireless communication by a wireless communication device, including:
    transmitting a number (N) of beamforming training (BFT) packets in N transmit (TX) beam directions, respectively, on a first wireless communication link, each of the N BFT packets including a PHY preamble that carries respective beam management information indicating the TX beam direction in which the BFT packet is transmitted;
    receiving, from the responding device, first feedback associated with a first TX beam direction of the N TX beam directions; and
    transmitting a physical layer convergence protocol (PLCP) protocol data unit (PPDU), on the first wireless communication link, in the first TX beam direction.

2. The method of clause 1, further including:
    associating with the responding device over a second wireless communication link, the N BFT packets being transmitted on the first wireless communication link based on associating with the responding device over the second wireless communication link.

3. The method of any of clauses 1 or 2, where the first wireless communication link operates at a carrier frequency above 7 GHz and the second wireless communication link operates at a carrier frequency below 7 GHz.

4. The method of any of clauses 1-3, where each of the N BFT packets consists of only the PHY preamble.

5. The method of any of clauses 1-4, where the beam management information includes at least one of a PPDU type, a training direction, a beam tracking request, the number N of BFT packets, a number of the BFT packets remaining to be transmitted, a TX sector identifier (ID) or TX antenna ID associated with the TX beam direction in which the BFT packet is transmitted, or a number of receive (RX) sectors or RX antennas associated with the wireless communication device.

6. The method of any of clauses 1-5, where the first feedback is carried in a PHY preamble of a PPDU.

7. The method of any of clauses 1-6, where the first feedback includes the TX sector ID or the TX antenna ID indicated by the BFT packet transmitted in the first TX beam direction, a signal-to-noise ratio (SNR) report, or a number of RX sectors or RX antennas associated with the responding device.

8. The method of any of clauses 1-7, further including:
retransmitting the N BFT packets in the N TX beam directions, respectively, on the first wireless communication link based on a number (M) of RX sectors associated with the responding device.

9. The method of any of clauses 1-8, where each of the N BFT packets is transmitted M times in the respective TX beam direction.

10. The method of any of clauses 1-9, further including:
receiving, on the first wireless communication link, a number (K) of BFT packets each carrying beam management information indicating a respective beam direction associated with the received BFT packet;
measuring a signal power of each of the K received BFT packets; and
transmitting, to the responding device, second feedback associated with the received BFT packet having the highest signal power among the measured signal powers.

11. The method of any of clauses 1-10, where the first feedback is carried in the K received BFT packets.

12. The method of any of clauses 1-11, further including:
receiving one or more training signals on the first wireless communication link, each of the one or more training signals being received via a plurality of antennas tuned in a respective RX beam direction;
measuring a signal power of each of the L received training signals; and
receiving a PPDU from the responding device via the plurality of antennas tuned in the RX beam direction in which the training signal having the highest signal power, among the measured signal powers, is received.

13. The method of any of clauses 1-12, where each of the plurality of training signals represents a respective PPDU.

14. The method of any of clauses 1-12, where each of the plurality of training signals represents a respective training (TRN) field of the same PPDU.

15. A wireless communication device including:
at least one memory; and
at least one processor communicatively coupled with the at least one memory, the at least one processor configured to cause the wireless communication device to perform the method of any one or more of clauses 1-14.

16. A method for wireless communication by a wireless communication device, including:
receiving a number (N) of beamforming training (BFT) packets on a first wireless communication link, each of the N BFT packets including a physical layer (PHY) preamble that carries beam management information indicating a respective beam direction associated with the received BFT packet;
measuring a signal power of each of the received BFT packets;
transmitting, to the initiating device, first feedback associated with the received BFT packet having the highest signal power among the measured signal powers; and
receiving a physical layer convergence protocol (PLCP) protocol data unit (PPDU) on the first wireless communication link based on the first feedback.

17. The method of clause 16, further including:
associating with the initiating device over a second wireless communication link, the N BFT packets being received on the first wireless communication link based on associating with the initiating device over the second wireless communication link.

18. The method of any of clauses 16 or 17, where the first wireless communication link operates at a carrier frequency above 7 GHz and the second wireless communication link operates at a carrier frequency below 7 GHz.

19. The method of any of clauses 16-18, where each of the N BFT packets consists of only the PHY preamble.

20. The method of any of clauses 16-19, where the beam management information includes at least one of a PPDU type, a training direction, a beam tracking request, a number of BFT packets being transmitted by the initiating device, a number of the BFT packets remaining to be transmitted, a transmit (TX) sector identifier (ID) or TX antenna ID associated with the beam direction, or a number of receive (RX) sectors or RX antennas associated with the initiating device.

21. The method of any of clauses 16-20, where the first feedback is carried in a PHY preamble of a PPDU.

22. The method of any of clauses 16-21, where the first feedback includes the TX sector ID or the TX antenna ID indicated by the received BFT packet having the highest signal power, a signal-to-noise ratio (SNR) report, or a number of RX sectors or RX antennas associated with the wireless communication device.

23. The method of any of clauses 16-22, where the N BFT packets are received via a plurality of antennas tuned in a number (M) of RX beam directions.

24. The method of any of clauses 16-23, where at least one of the N BFT packets is received multiple times based on tuning the plurality of antennas in multiple RX beam directions, respectively, of the M RX beam directions.

25. The method of any of clauses 16-24, further including:
transmitting a number (K) of BFT packets in K TX beam directions, respectively, on the first wireless communication link;
receiving, from the initiating device, second feedback associated with a first TX beam direction of the K TX beam directions; and
transmitting a PPDU, on the first wireless communication link, in the first TX beam direction.

26. The method of any of clauses 16-25, where the first feedback is carried in the K transmitted BFT packets.

27. The method of any of clauses 16-26, further including:
receiving one or more training signals on the first wireless communication link, each of the one or more training signal being received via a plurality of antennas tuned in a respective RX beam direction;
measuring a signal power of each of the one or more received training signals; and
receiving a PPDU from the initiating device via the plurality of antennas tuned in the RX beam direction in which the training signal having the highest signal power, among the measured signal powers, is received.

28. The method of any of clauses 16-27, where each of the plurality of training signals represents a respective PPDU.

29. The method of any of clauses 16-27, where each of the plurality of training signals represents a respective training (TRN) field of the same PPDU.

30. A wireless communication device including:
   at least one memory; and
   at least one processor communicatively coupled with the at least one memory, the at least one processor configured to cause the wireless communication device to perform the method of any one or more of clauses 16-29.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c. As used herein, "based on" is intended to be interpreted in the inclusive sense, unless otherwise explicitly indicated. For example, "based on" may be used interchangeably with "based at least in part on," unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions, or information.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication performed by a first multi-link wireless communication device, comprising:
   communicating one or more frames to associate with a second multi-link wireless communication device over a first wireless communication link of a plurality of wireless communication links supported by the first multi-link wireless communication device and the second multi-link wireless communication device;
   transmitting a number (N) of beamforming training (BFT) packets in N transmit (TX) beam directions, respectively, on a second wireless communication link of the plurality of wireless communication links in accordance with associating with the second multi-link wireless communication device over the first wireless communication link, each of the N BFT packets including a physical layer (PHY) preamble that carries beam management information indicating a respective TX beam direction in which that BFT packet is transmitted;
   receiving, from the second multi-link wireless communication device, first feedback associated with a first TX beam direction of the N TX beam directions; and
   transmitting a physical layer convergence protocol (PLCP) protocol data unit (PPDU), on the second wireless communication link, in the first TX beam direction in accordance with the first feedback.

2. The method of claim 1, wherein the first wireless communication link operates at a first carrier frequency below 7 GHz and the second wireless communication link operates at a second carrier frequency above 7 GHz.

3. The method of claim 1, wherein each of the N BFT packets consists of only the PHY preamble.

4. The method of claim 1, wherein the beam management information includes at least one of a PPDU type, a training direction, a beam tracking request, the number N of BFT packets, a number of the BFT packets remaining to be transmitted, a TX sector identifier (ID) or TX antenna ID associated with the respective TX beam direction in which that BFT packet is transmitted, or a number of receive (RX) sectors or RX antennas associated with the first multi-link wireless communication device.

5. The method of claim 4, wherein the first feedback is carried in a PHY preamble of a PPDU.

6. The method of claim 5, wherein the first feedback includes the TX sector ID or the TX antenna ID indicated by a BFT packet transmitted in the first TX beam direction, a signal-to-noise ratio (SNR) report, or a number of RX sectors or RX antennas associated with the second multi-link wireless communication device.

7. The method of claim 1, further comprising:
retransmitting the N BFT packets in the N TX beam directions, respectively, on the second wireless communication link in accordance with a number (M) of RX sectors associated with the second multi-link wireless communication device.

8. The method of claim 7, wherein each of the N BFT packets is transmitted M times in the respective TX beam direction.

9. The method of claim 1, further comprising:
receiving, on the second wireless communication link, a number (K) of BFT packets each carrying beam management information indicating a respective beam direction associated with that BFT packet;
measuring a signal power of each of the K BFT packets; and
transmitting, to the second multi-link wireless communication device, second feedback associated with a received BFT packet having a highest signal power among the measured signal powers.

10. The method of claim 9, wherein the first feedback is carried in the K BFT packets.

11. The method of claim 1, further comprising:
receiving one or more training signals on the second wireless communication link, each of the one or more training signals being received via a plurality of antennas tuned in a respective RX beam direction;
measuring a signal power of each of the one or more received training signals; and
receiving a PPDU from the second multi-link wireless communication device via the plurality of antennas tuned in an RX beam direction in which a training signal having a highest signal power, among the measured signal powers, is received.

12. The method of claim 11, wherein each of the one or more training signals represents a respective PPDU.

13. The method of claim 11, wherein each of the one or more training signals represents a respective training (TRN) field of a same PPDU.

14. A first multi-link wireless communication device for wireless communication, comprising:
at least one memory; and
at least one processor communicatively coupled with the at least one memory, the at least one processor configured to cause the first multi-link wireless communication device to:
communicate one or more frames to associate with a second multi-link wireless communication device over a first wireless communication link of a plurality of wireless communication links supported by the first multi-link wireless communication device and the second multi-link wireless communication device;
transmit a number (N) of beamforming training (BFT) packets in N transmit (TX) beam directions, respectively, on a second wireless communication link of the plurality of wireless communication links in accordance with associating with the second multi-link wireless communication device over the first wireless communication link, each of the N BFT packets including a physical layer (PHY) preamble that carries respective beam management information indicating a TX beam direction in which that BFT packet is transmitted;
receive, from the second multi-link wireless communication device, first feedback associated with a first TX beam direction of the N TX beam directions; and
transmit a physical layer convergence protocol (PLCP) protocol data unit (PPDU), on the second wireless communication link, in the first TX beam direction in accordance with the first feedback.

15. A method for wireless communication performed by a first multi-link wireless communication device, comprising:
communicating one or more frames to associate with a second multi-link wireless communication device over a first wireless communication link of a plurality of wireless communication links supported by the first multi-link wireless communication device and the second multi-link wireless communication device;
receiving a number (N) of beamforming training (BFT) packets on a first second wireless communication link of the plurality of wireless communication links in accordance with associating with the second multi-link wireless communication device over the first wireless communication link, each of the N BFT packets including a physical layer (PHY) preamble that carries beam management information indicating a respective beam direction associated with that BFT packet;
measuring a signal power of each of the N BFT packets;
transmitting, to the second multi-link wireless communication device, first feedback associated with a received BFT packet having a highest signal power among the measured signal powers; and
receiving a physical layer convergence protocol (PLCP) protocol data unit (PPDU) on the first wireless communication link in accordance with the first feedback.

16. The method of claim 15, wherein the first wireless communication link operates at a first carrier frequency below 7 GHz and the second wireless communication link operates at a second carrier frequency above 7 GHz.

17. The method of claim 15, wherein each of the N BFT packets consists of only the PHY preamble.

18. The method of claim 15, wherein the beam management information includes at least one of a PPDU type, a training direction, a beam tracking request, a number of BFT packets being transmitted by the second multi-link wireless communication device, a number of the N BFT packets remaining to be transmitted, a transmit (TX) sector identifier (ID) or TX antenna ID associated with the respective beam direction, or a number of receive (RX) sectors or RX antennas associated with the second multi-link wireless communication device.

19. The method of claim 18, wherein the first feedback is carried in a PHY preamble of a PPDU.

20. The method of claim 19, wherein the first feedback includes the TX sector ID or the TX antenna ID indicated by the received BFT packet having the highest signal power, a signal-to-noise ratio (SNR) report, or a number of RX sectors or RX antennas associated with the first multi-link wireless communication device.

21. The method of claim 15, wherein the N BFT packets are received via a plurality of antennas tuned in a number (M) of RX beam directions.

22. The method of claim 21, wherein at least one of the N BFT packets is received multiple times in accordance with tuning the plurality of antennas in multiple RX beam directions, respectively, of the M RX beam directions.

23. The method of claim 15, further comprising:
transmitting a number (K) of BFT packets in K TX beam directions, respectively, on the second wireless communication link;

receiving, from the second multi-link wireless communication device, second feedback associated with a first TX beam direction of the K TX beam directions; and transmitting a PPDU, on the second wireless communication link, in the first TX beam direction.

24. The method of claim 23, wherein the first feedback is carried in the K BFT packets.

25. The method of claim 15, further comprising:

receiving one or more training signals on the second wireless communication link, each of the one or more training signals being received via a plurality of antennas tuned in a respective RX beam direction;

measuring a signal power of each of the one or more training signals; and receiving a PPDU from the second multi-link wireless communication device via the plurality of antennas tuned in an RX beam direction in which a training signal having a highest signal power, among the measured signal powers, is received.

26. The method of claim 25, wherein each of the one or more training signals represents a respective PPDU.

27. The method of claim 25, wherein each of the one or more training signals represents a respective training (TRN) field of a same PPDU.

28. A first multi-link wireless communication device for wireless communication, comprising:

at least one memory; and at least one processor communicatively coupled with the at least one memory, the at least one processor configured to cause the first multi-link wireless communication device to:

communicate one or more frames to associate with a second multi-link wireless communication device over a first wireless communication link of a plurality of wireless communication links supported by the first multi-link wireless communication device and the second multi-link wireless communication device;

receive a number (N) of beamforming training (BFT) packets on a second wireless communication link of the plurality of wireless communication links in accordance with associating with the second multi-link wireless communication device over the first wireless communication link, each including a physical layer (PHY) preamble that carries beam management information indicating a respective beam direction associated with that BFT packet;

measure a signal power of each of the N BFT packets;

transmit, to the second multi-link wireless communication device, first feedback associated with a received BFT packet having a highest signal power among the measured signal powers; and receive a physical layer convergence protocol (PLCP) protocol data unit (PPDU) on the second wireless communication link in accordance with the first feedback.

29. The first multi-link wireless communication device of claim 14, wherein the first wireless communication link operates at a first carrier frequency below 7 GHZ and the second wireless communication link operates at a second carrier frequency above 7 GHz.

30. The first multi-link wireless communication device of claim 28, wherein the first wireless communication link operates at a first carrier frequency below 7 GHz and the second wireless communication link operates at a second carrier frequency above 7 GHz.

* * * * *